United States Patent [19]
Kasagami et al.

[11] Patent Number: 5,596,683
[45] Date of Patent: Jan. 21, 1997

[54] TEACHING CONTROL DEVICE FOR MANUAL OPERATIONS OF TWO INDUSTRIAL ROBOTS

[75] Inventors: Fumio Kasagami, Nara; Yasuhiro Kojina, Osaka, both of Japan

[73] Assignee: Daihen Corporation, Osaka, Japan

[21] Appl. No.: 176,864

[22] Filed: Dec. 30, 1993

[30] Foreign Application Priority Data

Dec. 31, 1992 [JP] Japan ..................... 4-359945

[51] Int. Cl.⁶ .................................... B25J 9/00
[52] U.S. Cl. .................. 395/83; 395/82; 395/97; 901/3; 901/4
[58] Field of Search .................. 395/82, 83, 97; 901/3, 4

[56] References Cited

U.S. PATENT DOCUMENTS

| | | | |
|---|---|---|---|
| 4,639,878 | 1/1987 | Day et al. | 395/94 |
| 4,811,248 | 3/1989 | Senoh et al. | 395/88 |
| 4,831,547 | 5/1989 | Ishiguro et al. | 395/82 |
| 4,837,734 | 6/1989 | Ichikawa et al. | 395/82 |
| 5,243,266 | 9/1993 | Kasagami et al. | 395/97 |
| 5,353,386 | 10/1994 | Kasagami et al. | 395/97 |

FOREIGN PATENT DOCUMENTS

| | | |
|---|---|---|
| 61-42004 | 2/1986 | Japan. |
| 62-114009 | 5/1987 | Japan. |

*Primary Examiner*—George B. Davis
*Attorney, Agent, or Firm*—Lowe, Price, LeBlanc & Becker

[57] ABSTRACT

The teaching procedure is performed so that a relative position of the tool against a workpiece and an attitude of a tool against a ground are maintained constant under a control of a co-acting mode of the manual operation. The position and the attitude of the workpiece and the position and the attitude of the tool are manipulated in response to a co-acting mode signal supplied by a mode changing switch, a robot signal selecting the workpiece handling robot supplied by a robot changing switch and actuating signals supplied by a group of the keys. The manipulation of the position of the tool by the tool handling robot is coordinated with the manipulation of the position and the attitude of the workpiece by the workpiece handling robot maintaining the attitude of the tool against the ground and the relative position of the tool against the workpiece.

3 Claims, 31 Drawing Sheets

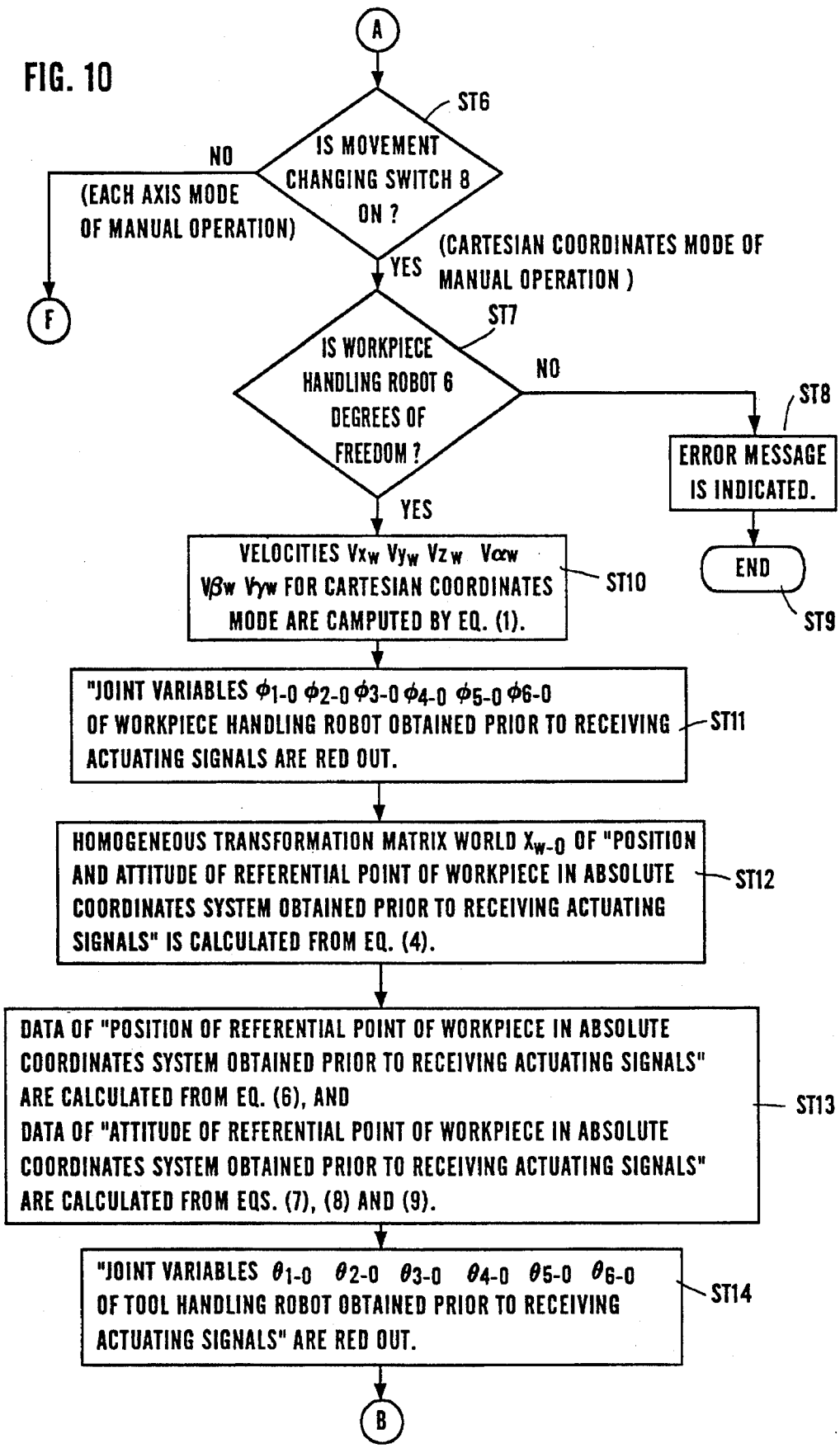

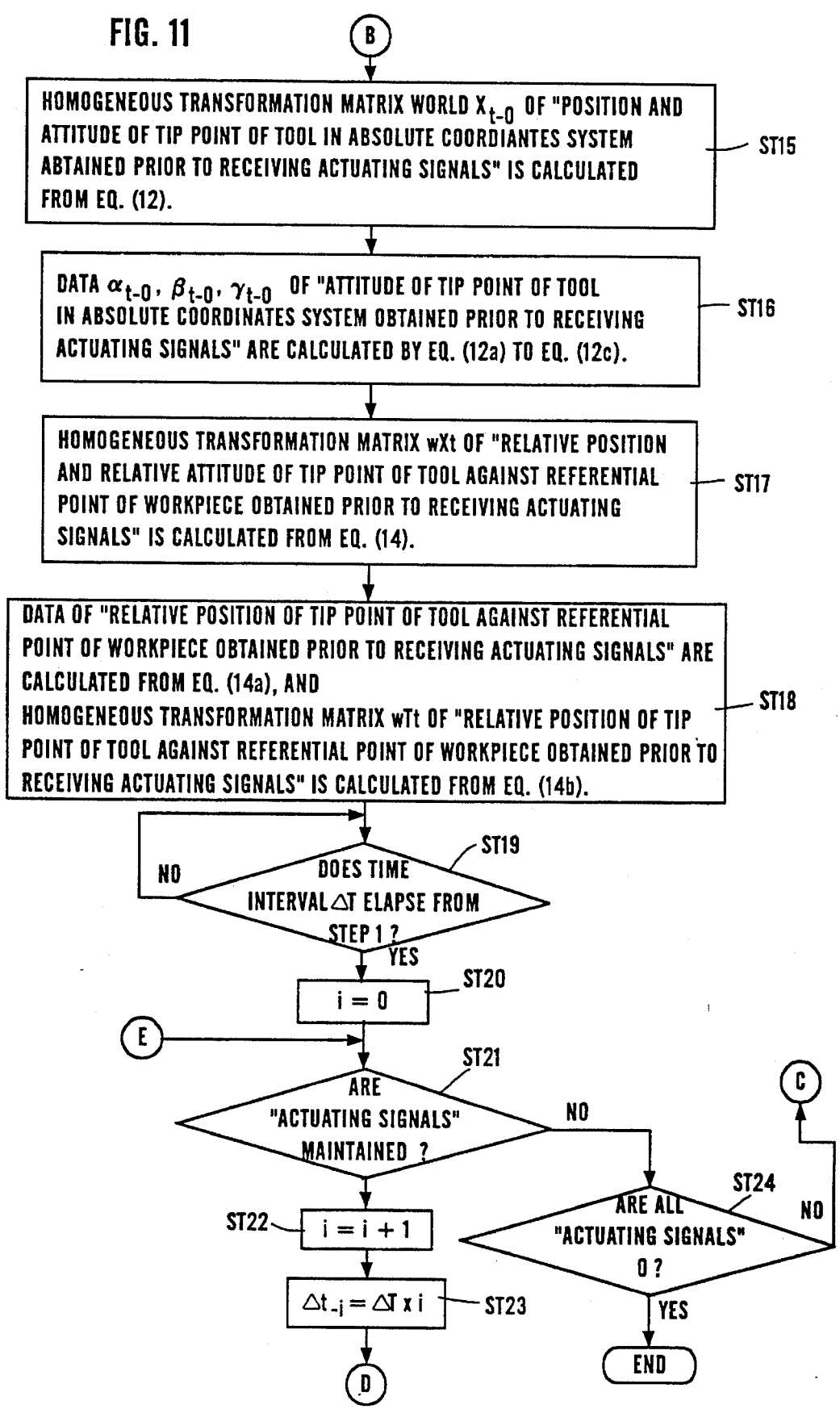

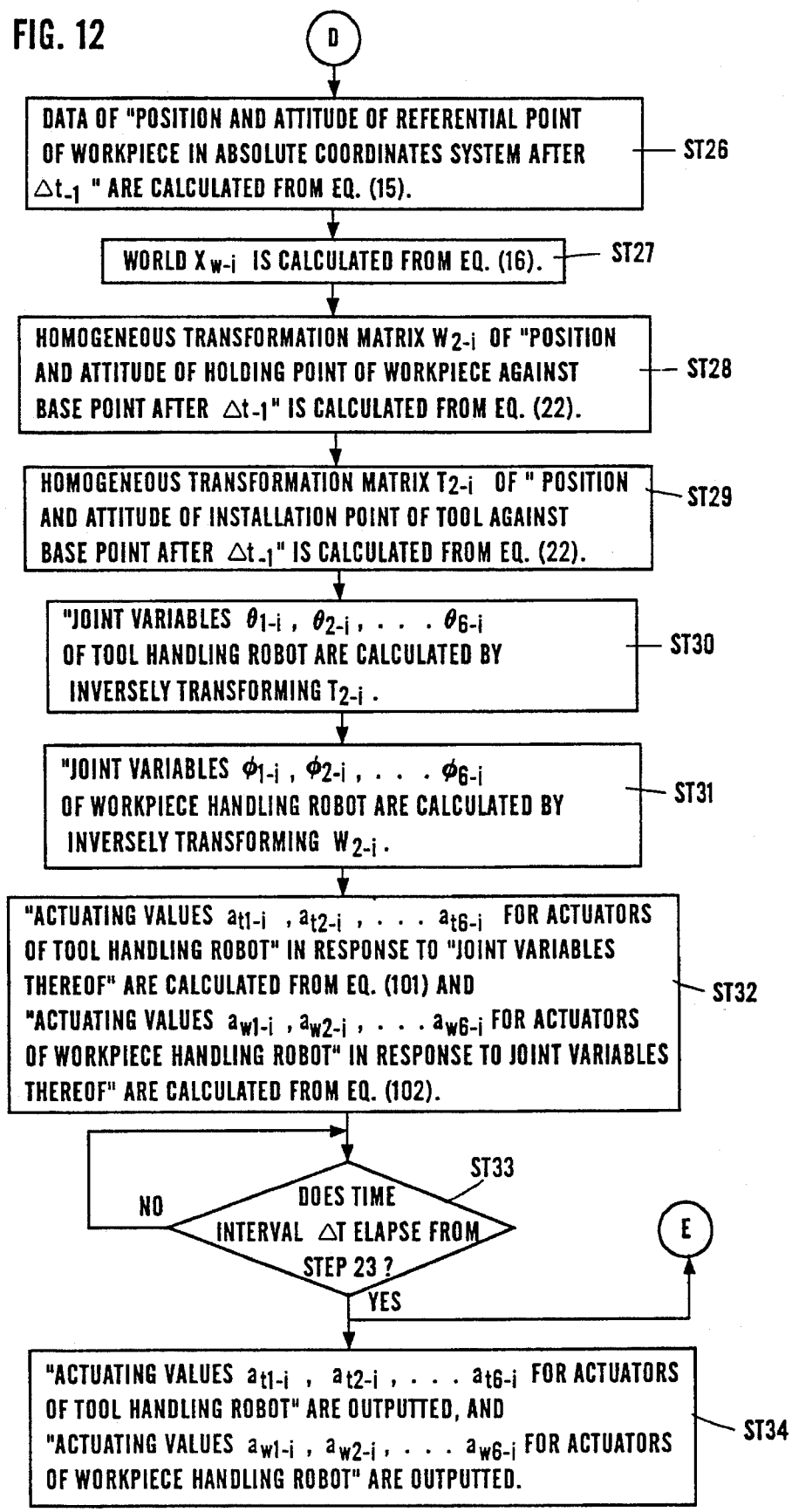

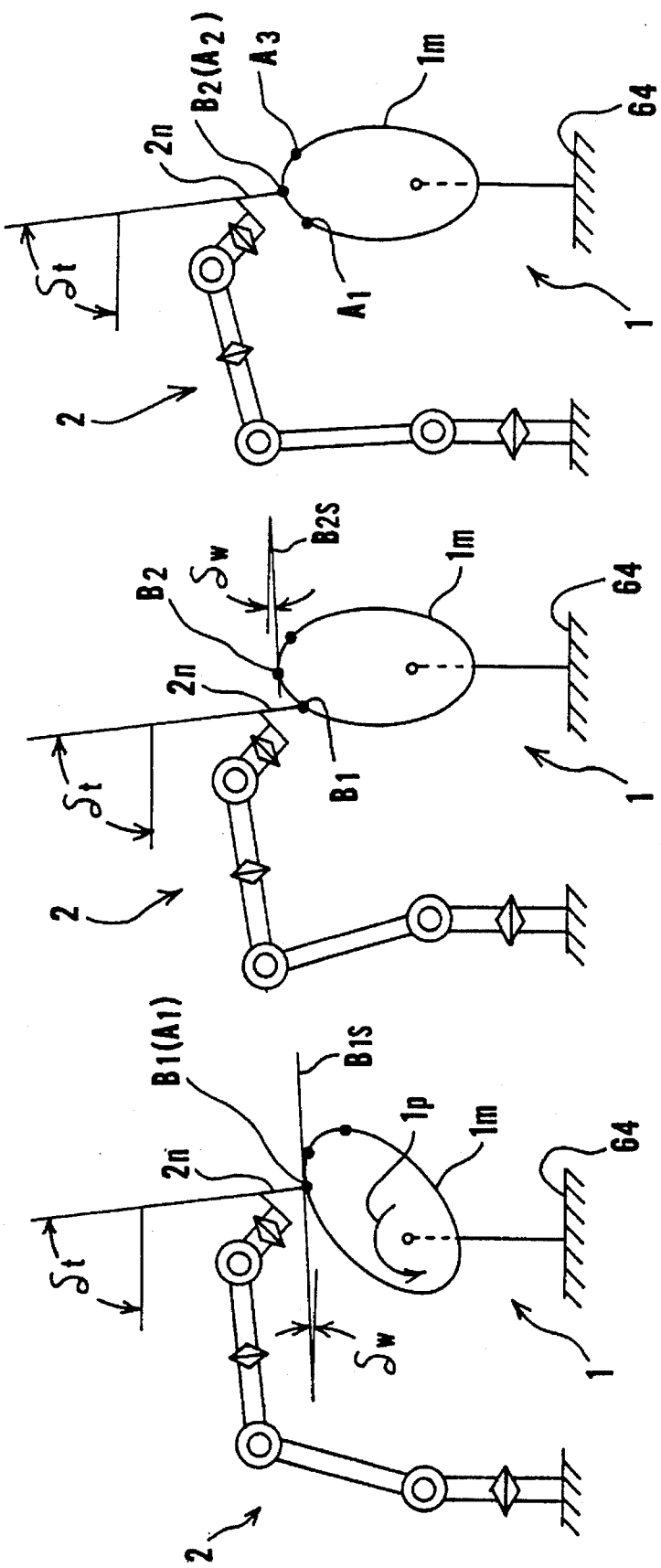

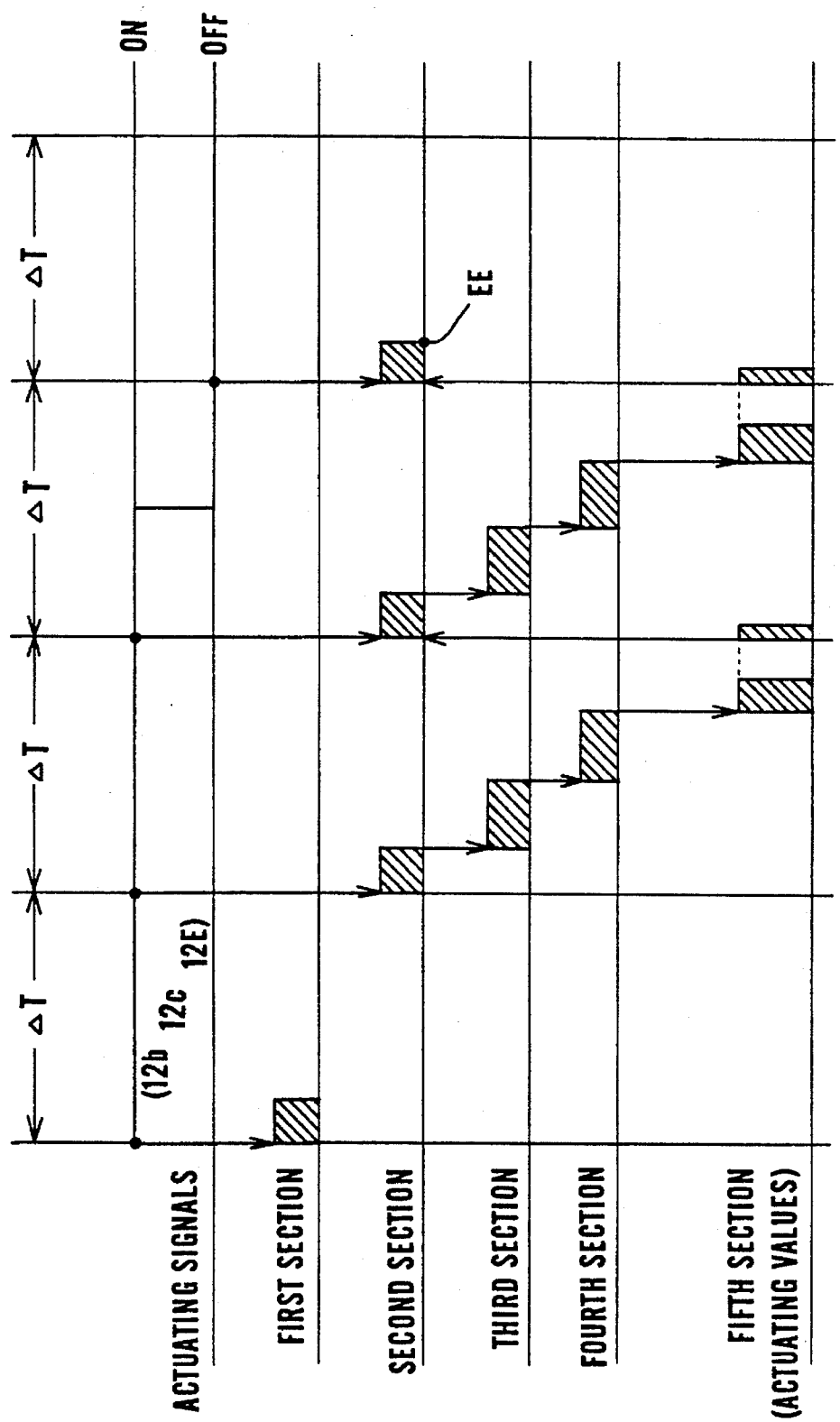

TEACHING CONTROL DEVICE FOR MANUAL OPERATIONS OF TWO INDUSTRIAL ROBOTS

TECHNICAL FIELD OF THE INVENTION

The present invention relates to a teaching control device for manual operations of an industrial robotic system, and more particularly, to an industrial robotic system providing a workpiece handling robot for manipulating a position and an attitude of a workpiece held in an end effector, such as a robot hand etc., and a tool handling robot for manipulating "a position and an attitude" of the tool processing the workpiece.

BACKGROUND OF THE PRIOR ART

The industrial robotic system having a workpiece handling robot for manipulating a workpiece and a tool handling robot for manipulating a tool such as a machining tool, a welding torch or a welding gun etc., is generally controlled by a method of teaching playback so as to simultaneously move both the robots in real processing operations.

In the teaching operations for industrial robots before playback operations there are a method of "the sole-acting mode of the manual operation" and a method of "the co-acting mode of the manual operation". The former is adopted for the manipulation of "a position and an attitude of a workpiece" by a workpiece handling robot independently of the manipulation of a tool by a tool handling robot, or for the manipulation of "a position and an attitude of a tool" by a tool handling robot independently of the manipulation of a workpiece by a workpiece handling robot. The latter is adopted for the manipulation of "a position and an attitude of a tool" by a tool handling robot coordinated with an interdependent on the manipulation of "a position and an attitude of a workpiece" by a workpiece handling robot, or for the manipulation of "a position and an attitude of a workpiece" by a workpiece handling robot coordinated with and interdependent on the manipulation of "a position and an attitude of a tool" by a tool handling robot. One of the above mentioned method only is, however, not adopted in the case that many teaching points are required. In such a case, in general, both methods are mutually performed in the middle of teaching operations.

The above mentioned "sole-acting mode of the manual operation" is not explained here because of a prior art. "The co-acting mode of the manual operation" has been created to solve some problems occurred in "the sole-acting mode of the manual operation":

Referring to FIG. 28(a), initially, "a position and an attitude of a workpiece 1m" are manipulated by "a sole-acting mode of the manual operation" of a workpiece handling robot 1 so that an inclination of the tangent of "an aimed point" $B_1$ regulated on the workpiece 1m comes to a desired inclination $\delta_w$ against the ground 64. And the tip point 57 of a tool is manipulated to "the aimed point" $B_1$ of the workpiece 1m by "a sole-acting mode of the manual operation" of a tool handling robot 2 so that "a position and an attitude of the tool 2n" comes to a desired inclination $\delta_t$ of "the aimed point" $B_1$ regulated on the workpiece 1m. From such first state of the workpiece 1m and the tool 2n, teaching points were taught as follows:

The workpiece 1m often contacts or collides with the tool 2n when the workpiece 1m is manipulated by "the sole-acting mode of the manual operation" of the workpiece handling robot 1 as shown by a broken line. In order to avoid such an interference of the workpiece 1m and with tool 2n, the tool 2n positioned at the first state is retired from the workpiece 1m by "the sole-acting mode of the manual operation of the tool handling robot 2 as shown in FIG. 28(b).

And the workpiece 1m is rotated by "the sole-acting mode of the manual operation" of the workpiece handling robot 1 as shown by an arrow 1p in FIG. 28(c), thereby, "a new position and a new attitude of the workpiece 1m" are established so that an inclination of the tangent of "a following aimed point" $B_2$ regulated on the workpiece 1m comes to the desired inclination $\delta_w$ against the ground 64.

Thereafter, the tip point 57 is returned to "the aimed point" $B_2$ by "the sole-acting mode of the manual operation" of the tool handling robot 2 as shown in FIG. 28(d) so that the desired inclination $\delta_t$ of "the aimed point" $B_2$ of the workpiece 1m is achieved by the manipulation of "the position—and the attitude of the tool 2n". The second state of the workpiece 1m and the tool 2n by such above mentioned procedures is taught as "a teaching point" $A_2$. When "a following teaching point" $A_3$ is required, the same procedure is performed if the workpiece 1m should avoid the tool 2n. Unless the workpiece 1m interferes with the tool 2n during manipulation of the workpiece 1m, the tool 2n is manipulated to "a following teaching point" $A_3$ after manipulating the workpiece 1m without retiring the tool 2n from the workpiece 1m.

It is very inconvenient to retire a tool from a workpiece during teaching operations. Many teaching points forces an increase in number of times for retiring the tool from the workpiece. Because, it takes a lot of times to retire the tool and to return the tool, the teaching time is, on the whole, prolonged. Furthermore, an operator often loses sight of "the previous aimed point" on the workpiece when returning the tool to the workpiece. An operator can not often catch "a following aimed point", i.e., "a following teaching point" if the distance between a teaching point and a following one is too short or if the arrangement of a series of teaching points is complicated.

A Japanese unexamined publication No. 61-42004 discloses a robotic system, wherein the manipulation of the tool is subjected to the manipulation of a workpiece in order to solve above mentioned problems. According to the robotic system "a position and an attitude of a workpiece" are manipulated being a tip point of a tool left at a previous teaching point on the workpiece, i.e., the manipulation of "the position and the attitude of the tool" is subjected to that of "the position and the attitude of the workpiece" achieved before the manipulation of the tool so that "a relative position and a relative attitude of the tool against the workpiece" is maintained substantially constant in spite of manipulating "the position and the attitude of the workpiece".

In such a control following the tool up the workpiece, it takes a long time for "a detected position and a detected attitude of the workpiece" to be reflected in the manipulation of "the position and the attitude of the tool". The workpiece often contacts or collides with the tool when the manipulation of "the position and the attitude" of the workpiece is much rapider than that of the tool followed up the workpiece.

In addition, a calculative error of "the position and the attitude of the workpiece" reflects on a calculation of "the position and the attitude of the tool", thereby, the increase of the calculative error of "the position and the attitude of the tool" is promoted. Therefore, the accuracy maintaining "the relative position and the relative attitude of the tool against the workpiece" is remarkably demoted during teaching operations.

A teaching control device for manual operations was proposed in U.S. Pat. No. 5,243,266, wherein "the relative position and the relative attitude of the tool against the workpiece" are maintained by a different control from the above-mentioned manipulation of the tool subjecting to that of the workpiece. In such a control, "a position and an attitude of a workpiece after a preset infinitesimal time interval" and "a position and an attitude of a tool after a preset infinitesimal time interval" are calculated before actually manipulating "a position and an attitude of a workpiece" when receiving "actuating signals" for changing "a position and an attitude of a workpiece". The manipulation of "the position and the attitude of the workpiece" and the manipulation of "the position and the attitude of the tool" are simultaneously and independently controlled by individually manipulating a workpiece handling robot and a tool handling robot based on the above mentioned calculations. An abstract of the control is described as follows:

Referring to FIG. 29($a$) initially, "an attitude of a workpiece $1m$" is manipulated by "a sole-acting mode of the manual operation" of a workpiece handling robot 1 so that an inclination of the tangent of "an aimed point" $B_1$ regulated on the workpiece $1m$ comes to a desired inclination $\delta_w$ against the ground 64. And "a position and an attitude of a tool $2n$" is manipulated by "a sole-acting mode of the manual operation" of a tool handling robot 1 so that a tip point 57 of the tool is moved to "an aimed point" $B_1$ regulated on the workpiece $1m$ and so that an angle between a tangent $B_{1s}$ of the aimed point $B_1$ and the tool $2n$ comes to $\epsilon$. From such first state of the workpiece $1m$ and the tool $2n$, teaching points are taught as below.

The workpiece $1m$ is rotated in the direction of an arrow $1p$ by "a co-acting mode of the manual operation" of the workpiece handling robot 1 and the tool handling robot 2 so that an inclination of the tangent $B_{2s}$ of "a following aimed point" $B_2$ regulated on the workpiece $1m$ comes to a desired inclination $\delta_w$ against the ground 64 without changing "a relative position and a relative attitude of the tool $2n$ against the workpiece $1m$" at "the aimed point" $B_1$.

The tip point 57 of the tool is, then, kept at "the aimed point" $B_1$ left as shown in FIG. 29($b$), and "a position and an attitude of the tool $2n$" are manipulated so that an angle between the tangent $B_{1s}$ of "the aimed point" $B_1$ and the tool $2n$ is maintained equal to $\epsilon$.

Thereafter, as shown in FIG. 29($c$), the tip point 57 of the tool is manipulated to "the following aimed point" $B_2$ regulated on the workpiece $1m$ by "a sole-acting mode of the manual operation" of the tool handling robot 2. And "the attitude of the tool $2n$" is manipulated by "a sole-acting mode of the manual operation" of the tool handling robot 2 so that the angle between the tangent $B_{2s}$ of "the aimed point" $B_2$ on the workpiece $2m$ and the tool $2n$ comes to $\epsilon$ as shown in FIG. 29($d$). The second state of the workpiece $1m$ and the tool $2n$ by such above mentioned procedures are taught as "a teaching point" $A_2$ of each handling robot, respectively. Incidentally, it is unnecessary to manipulate as FIG. 29($c$) if the manipulation from FIG. 29($b$) to FIG. 29($d$) is directly performable. Naturally, if an angle between the tangent $B_{2s}$ and the tool $2n$ is not required $\epsilon$, any desired different attitude of the tool may be manipulated at the manipulation of FIG. 29($d$).

"A following teaching point" $A_2$ is achieved by the compound procedures of "the co-acting mode of the manual operation" and "the sole-acting mode of the manual operation". If the manipulation of the workpiece $1m$ is not required, the point $A_3$ is taught after the manipulation of "the sole-acting mode of the manual operation" of the tool handling robot 2.

The movement of FIG. 29 is substantially different from that of above mentioned FIG. 28, i.e., the workpiece handling robot 1 and the tool handling robot 2 are simultaneously manipulated from FIG. 29($a$) to FIG. 29($b$). In such "a co-acting mode of the manual operation", the manipulation of "a position and an attitude of the tool $2n$" is not subjected to that of "a position and an attitude of the workpiece $1m$" but the workpiece handling robot 1 and the tool handling robot 2 are simultaneously and independently manipulated after a preset infinitesimal time interval so that "the relative position and the relative attitude of the tool $2n$ against the workpiece $1m$" is successively maintained constant.

The following matters are comprehensible from the above mentioned description. An operator never loses sight of "the aimed point" $B_1$ when "the teaching point" $A_2$ is memorized, since "the relative position and the relative attitude of the tool $2n$ against the workpiece $1m$" is maintained. As the result of keeping the tip point 57 of the tool left at "the aimed point" $B_1$, an operator easily finds "the teaching point" $A_2$ on the workpiece $1m$ when the tip point 57 of the tool is manipulated from "the aimed point" $B_1$ to "the teaching point" $A_2$, so teaching operations are rapidly performed.

The following problems are, however, appeared unless "a relative attitude of the tool $2n$ against the workpiece $1m$" is substantially maintained constant. A side of the tool $2n$, of which tip point 57 is left at "the aimed point" $B_1$, often contacts or collides with any protrusion or any wall formed close to "an aimed point" $B_1$ regulated on the workpiece $1m$. But, since "the relative attitude of the tool $2n$ against the workpiece $1m$" is substantially maintained constant as above mentioned, the tool $2n$ never interferes with the workpiece $1m$ during the control of "the co-acting mode of the manual operation".

In the welding work, it is very important for an inclination of each point on the welding lines of the workpiece $1m$ to be constant against the ground. A welding pond 62 is intentionally moved in the direction of the movement of a torch $2n$, i.e., in the direction of an arrow 63, if a welding line 61 is inclined downward left as shown in FIG. 30. This inclination $\delta_w$ effects on the depth of welding indicating an essential factor to determine the quality weldment, because, a proper inclination of the welding line 61 promotes the quality of weldment in comparison with a horizontal welding line.

Then, it is desirable to keep "the attitude of the workpiece $1m$" so that an inclination $\delta_w$ of the welding line 61 is maintained substantially constant against the ground 64 during the welding work. Naturally, "the attitude of the tool $2n$" is determined according to the inclination $\delta_w$ of the welding line 61, therefore, "the attitude of the tool $2n$" should also maintained substantially constant against the ground 64 if the inclination of above mentioned welding line 61 is maintained substantially constant against the ground 64.

The welding, of which welding line 61 is inclined downward, is called "a downward slope welding", which has an advantage for a thin workpiece to get a homogeneous weldment because of avoiding an over-welding. On the other hand, in the case of "an upward slope welding", where the welding line is inclined upward along the direction of movement of the torch, a stagnation of welding pond is promoted, therefore, a desired strength of weldment is achieved because of increasing the depth of welding in the thick workpiece.

When the above-mentioned "co-acting mode of the manual operation" is adopted for teaching operations, it is advantageous to cut a procedure of retiring the tool 2n from the workpiece 1m. In such a case, "the relative attitude of the tool 2n against the workpiece 1m" after the manipulation of "the relative attitude of the tool 2n against the workpiece 1m" before the manipulation of "the co-acting mode of the manual operation". But "the relative attitude of the tool 2n against the ground 64" manipulated by "the co-acting mode of the manual operation", i.e., an attitude angle $\delta_{tb}$ of the tool 2n, is not always same as "the relative attitude of the tool 2n against the ground 64", i.e., an angle $\delta_{ta}$, prior to the manipulation of "the co-acting mode of the manual operation", which may be comprehensible by comparing FIG. 29(a) with FIG. 29(b).

The movement of FIG. 29(c) or FIG. 29(d) is, therefore, required in the case that "the relative attitude of the tool 2n against the ground 64" at "the aimed point" $B_1$ should be same as "the relative attitude of the tool 2n against the ground 64" at "the teaching point" $A_2$.

As shown in FIG. 29(c), "the position of the tool 2n" are manipulated to "a following aimed point" $B_2$ regulated on the workpiece 1m by "the sole-acting mode of the manual operation" of the tool handling robot 2. Thereafter, "the attitude of the tool 2n" should be manipulated by "the sole-acting mode of the manual operation" of the tool handling robot 2 so that the inclination $\delta_{ta}$ of the tool 2n, shown in FIG. 29(a), prior to "the co-acting mode of the manual operation" is achieved without changing "the position of the tool 2n". Such procedures are also inconvenient, especially, many teaching points forces an increase in number of times for manipulating "the attitude of the tool 2n", and besides, it takes a long time for the teaching operations.

The first object of the present invention is to avoid retiring the tool from the workpiece by the co-acting operations of both the robots in order to simplify and to hasten the manual teaching operations.

The second object is to manipulate "the position and the attitude of the workpiece" and the "the position and the attitude of the tool" simultaneously during the execution of the "co-acting mode of the manual operation" without subjecting the manipulation of "the position and the attitude of the tool" to the manipulation of "the position and the attitude of the workpiece", thereby, the change of "the position and the attitude of the tool" and the change of "the position and the attitude of the workpiece" are rapidly performed.

The third object is to prevent the calculation for controlling "the co-acting mode of the manual operation" from integrating calculative errors occurred in the calculation to manipulate the master robot in order to accurately manipulate the workpiece and the tool.

The fourth object is to maintain "the attitude of the tool against the ground" and "the relative position of the tool against the workpiece" substantially constant in the case of manipulating both the robots by "the co-acting mode of the manual operation".

The fifth object is to avoid an undesired downflow of the welding pond and an undesired stagnation thereof according to gravity in the case of the welding work by using a welding torch so that the high quality of weldment is achieved.

SUMMARY OF THE INVENTION

The present invention relates to a teaching control device for manual operations of an industrial robotic system which has a workpiece handling robot for manipulating a position and an attitude of a workpiece and a tool handling robot for manipulating a position and an attitude of a tool processing the workpiece, and comprising:

designating means of the sole-action/co-action for supplying a mode signal to designate either (i) "the sole-acting mode of the manual operation" of the robotic system wherein manipulation of "the position and the attitude of the workpiece" by the workpiece handling robot are performed independently of the manipulation of "the position and the attitude" of the tool by the tool handling robot, or (ii) "the co-acting mode of the manual operation" wherein the manipulation of "the position and the attitude of the tool" by the tool handling robot are coordinated with and interdependent on the manipulation of "the position and the attitude of the workpiece" by the workpiece handling robot;

selecting means of a handling robot for supplying a robot signal to select either the workpiece handling robot or the tool handling robot;

teaching key means for generating actuating signals to change "the position and the attitude of the workpiece" or "the position and the attitude of the tool"; and control means for controlling the co-acting mode of the manual teaching operations of the robotic system in response to "the co-acting mode signal" supplied by the designating means, "the robot signal selecting the workpiece handling robot" supplied by the selecting means and the actuating signals generated by the teaching key means.

the control means comprising a computer for performing the following steps;

computing "the previous position and the previous attitude of the workpiece in the absolute coordinates system", "an attitude of the tool against the ground" and "a relative position of the tool against the workpiece" in response to "the joint variables of the workpiece handling robot" and "the joint variables of the tool handling robot" obtained just before receiving "the actuating signals" when receiving "the co-acting mode signal"; "robot signal" and "actuating signals";

controlling an execution of a calculating step in response to "the actuating signals" maintained for the preset time interval, controlling a repetition of the computing step in response to "new actuating signals" when "the actuating signals" has already changed during the preset time interval or controlling a termination of the co-acting mode of the manual operation in response to an absence of "the actuating signals" during the preset time interval;

calculating "the position and the attitude of the workpiece after the preset time interval" in response to "the actuating signals" and "the previous position and previous attitude of the workpiece in the absolute coordinates system" obtained by the computing step and calculating "the position and the attitude of the tool after the preset time interval" in response to "the attitude of the tool against the ground" obtained by the computing step, "the relative position of the tool against the workpiece" obtained by the computing step and "the position and attitude of the workpiece after the preset time interval";

calculating "the joint variables of the workpiece handling robot after the present time interval" in response to "the position and attitude of the workpiece after the preset time interval" obtained by the calculating step and calculating "the joint variables of the tool handling robot after the preset time interval" in response to "the position and attitude of the tool after the preset time interval" obtained by the calculating step; and calculating "the actuating values for the actuators of the workpiece handling robot" in response to "the joint variables of the workpiece handling robot after the preset time interval" and calculating "the actuating values for the actuators of the tool handling robot" in response to "the joint variables of the tool handling robot after the preset time interval", and in response, simultaneously and independently supplying "control signals of the actuating values for the actuators of the workpiece handling robot" and "control signals of the actuating values for the actuators of the tool handling robot", and further commanding a repetition of the controlling step and succeeding steps thereto, According to the present invention, "the position and the attitude of the tool" is manipulated by the tool handling robot so that "the relative position of the tool against the workpiece" and "the attitude of the tool against the ground" are maintained constant by coordinating with the manipulation of "the position and the attitude of the workpiece". "The position and the attitude of the workpiece" and "the position and the attitude of the tool" are simultaneously and independently manipulated after the preset infinitesimal time interval, and the calculation for manipulating "the tool handling robot" is not reflected by the calculative errors occurred in the calculating for manipulating "the workpiece handling robot".

The manipulation of the workpiece and that of the tool are, therefore, exactly performed by "the co-acting mode of the manual operation" with high accuracy of the calculation. In a welding robotic system using a welding torch, etc., the high quality welding is attained by the constant attitude of the tool against the ground.

It is unnecessary for the tool to retire from the workpiece when the workpiece is manipulated. The previous teaching point is caught by an operator in spite of the change of the position and the attitude of the workpiece, thereby, the following teaching points can be easily found.

BRIEF DESCRIPTION OF DRAWINGS

FIG. 10 is a flow chart of the "the co-acting cartesian coordinates mode of the manual operation" continued from A of FIG. 9.

FIG. 11 is a flow chart of "the co-acting cartesian coordinates mode of the manual operation" continue from B of FIG. 10.

FIG. 12 is a flow chart of "the co-acting cartesian coordinates mode of the manual operation" continued from D of FIG. 11.

FIGS. 13(a), 13(b), and 13(c) are brief drawings of the manipulation by "the sole-acting mode of the manual operation" and/or "the co-acting mode of the manual operation" of the workpiece handling robot and/or the tool handling robot; FIG. 13(a) shows the state prior to the beginning of the manual teaching operations, FIG. 13(b) shows the tool coordinated with manipulating the position and the attitude of the workpiece has maintained the attitude thereof and FIG. 13(c) shows the state that the tool has been just positioned at the teaching point, maintaining the attitude thereof.

FIG. 14(a) is a movement drawing shows the manipulation of the tool coordinating with the manipulation of the position and the attitude of the workpiece without changing the attitude of the tool, FIG. 14(b) and FIG. 14(c) show a brief drawing of the paths of the workpiece and/or the tool under the manipulation according to "the sole-acting mode of the manual operation".

FIG. 15 is a timing chart shows the control of each step processor under "the co-acting mode of the manual operation" until the keys are released.

FIG. 17(a) shows the state prior to the beginning of the manual teaching operations, FIG. 17(b) shows the state that the tool manipulated by "the sole-acting mode of the manual operation" is at "the following aimed point" without changing the attitude thereof, and FIG. 17(c) shows the state that the tool has been just positioned at the teaching point, coordinating with the manipulation of the position and the attitude of the workpiece without changing the attitude thereof.

FIG. 28(a) shows the state prior to the beginning of the manual teaching operations, FIG. 28(b) shows the state that the tool has been retired from the workpiece, FIG. 28(c) shows the state that the workpiece has been just positioned at "the following aimed point" with the desired inclination and FIG. 28(d) shows the state that the tool is at the teaching point by being returned to the workpiece.

FIG. 29(a) shows the state prior to the beginning of the manual teaching operations, FIG. 29(b) shows the tool being coordinated with manipulating the position and the attitude of the workpiece without changing the relative position and relative attitude of the tool against the workpiece, FIG. 29(c) shows the state that the tool has been just positioned at "the following aimed point" and FIG. 29(d) shows the state that the tool changed the attitude thereof is positioned at "the following aimed point" by changing the attitude thereof.

DETAILED DESCRIPTION OF THE INVENTION

A teaching control device for manual operations of an industrial robotic system of the present invention is disclosed by applying to a welding robotic system having a workpiece handling robot and a tool handling robot.

Figure 2:
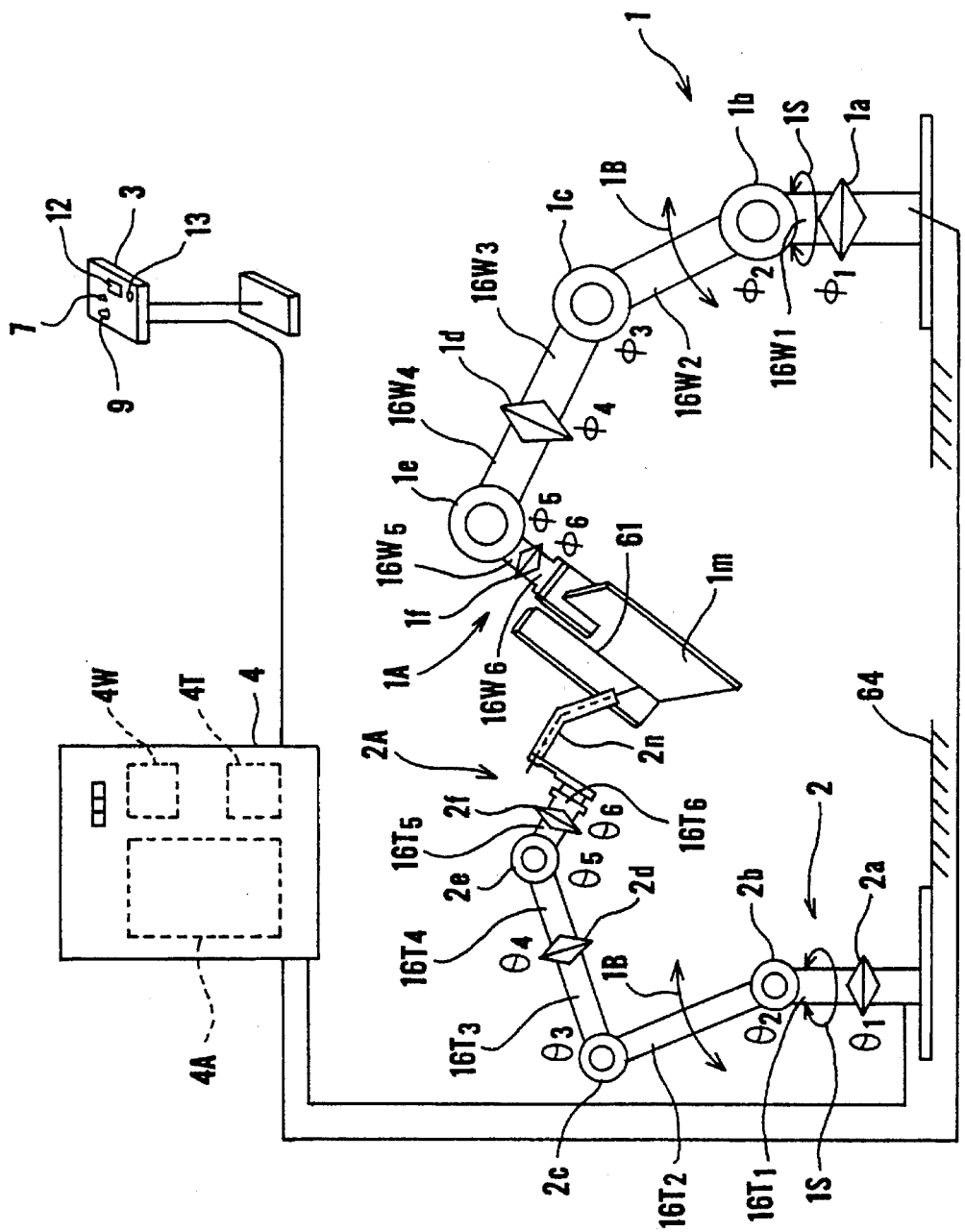
FIG. 2 is a schematic drawing of a teaching control device and a teaching pendant of an industrial robotic system comprising the workpiece handling robot and the tool handling robot.
Figure 3:
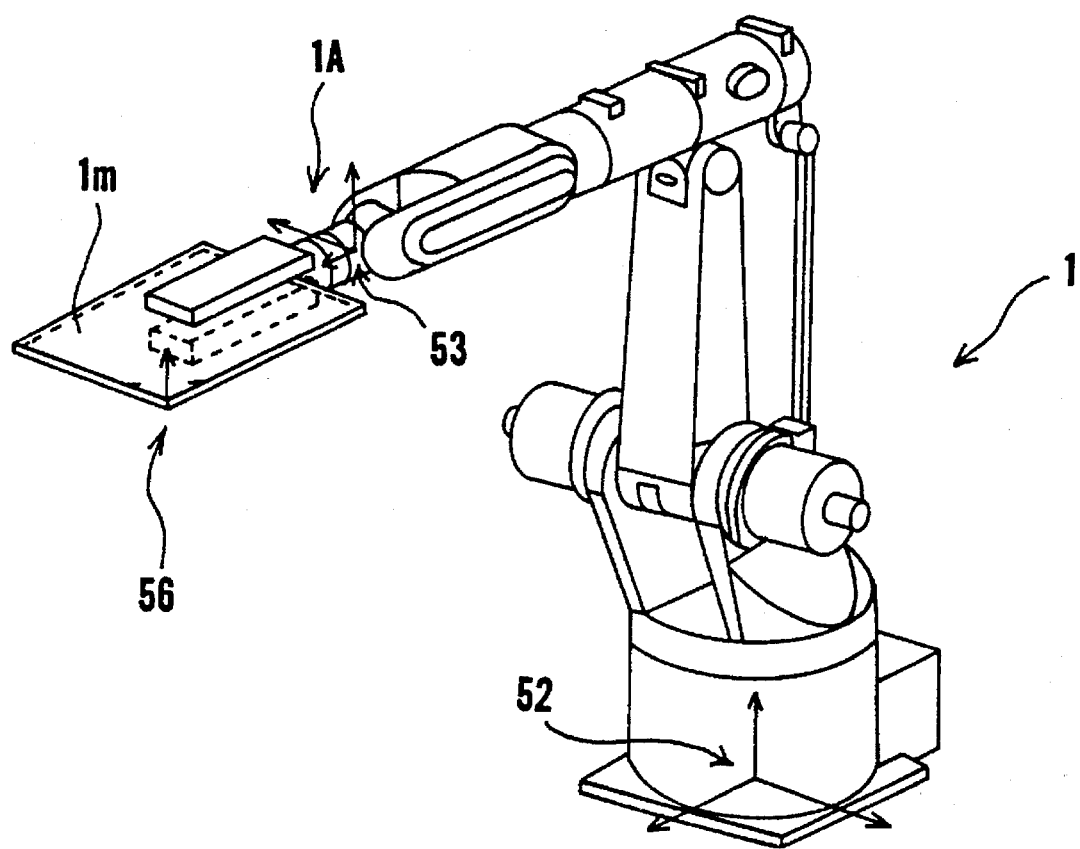
FIG. 3 is a schematic drawing of the workpiece handling robot with 6 degrees of freedom.
Figure 4:
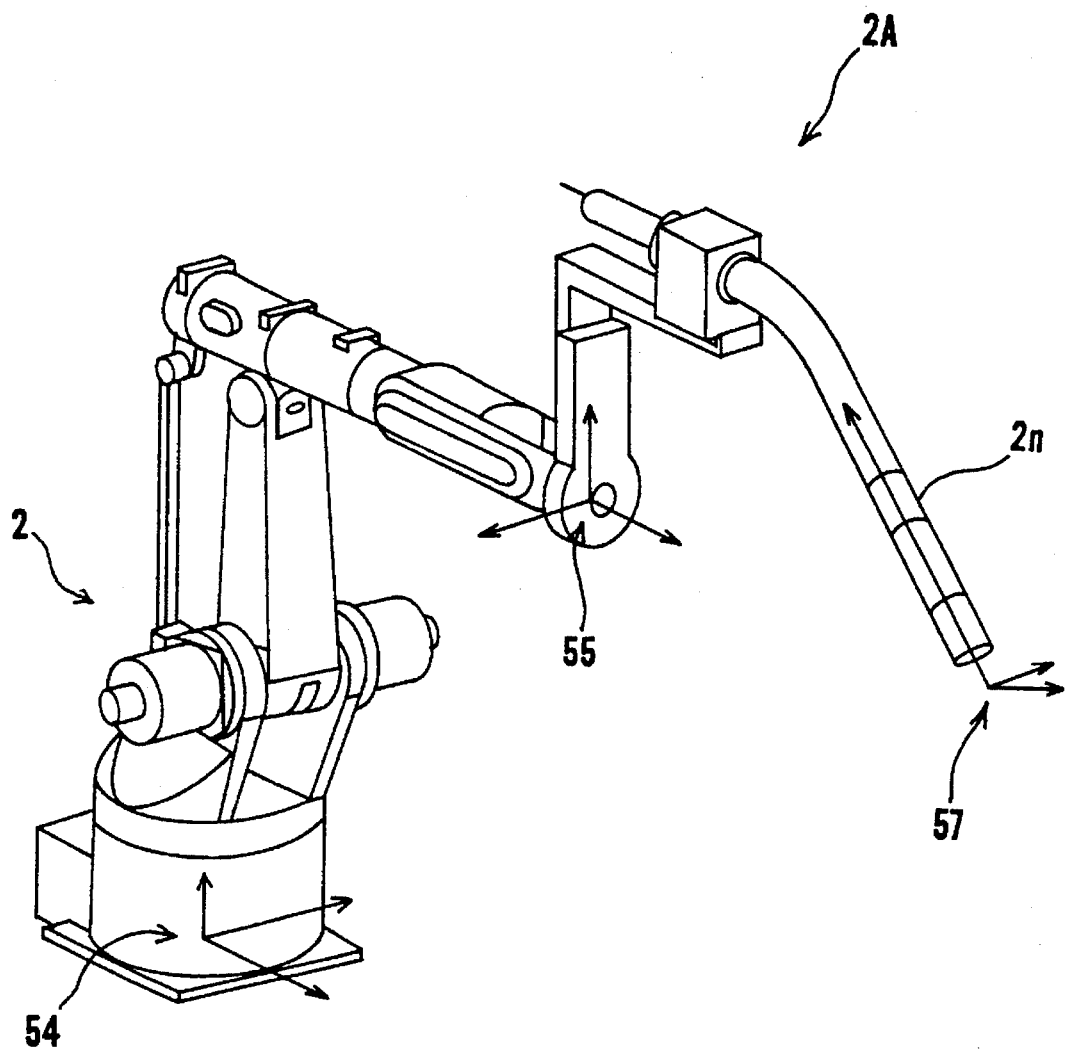
FIG. 4 is a schematic drawing of the tool handling robot with 6 degrees of freedom.

This robotic system is provide with a workpiece handling robot 1 for manipulating "a position and an attitude of a workpiece 1m" as shown in FIG. 3 and a tool handling robot 2 for manipulating "a position and an attitude of a tool 2n processing a workpiece" as shown in FIG. 4. Both the workpiece handling robot 1 and the tool handling robot 2 are disposed to faced each other as shown in FIG. 2, and "the position and the attitude of the workpiece 1m" and "the position and the attitude of the tool 2n" required in real processing operations, e.g., during the welding operations, can be manually taught by the control of "a sole-acting mode of the manual operation" of each handling robot or by the control of "a co-acting mode of the manual operation" of both the robots.

The workpiece handling robot 1 for manipulating a workpiece 1m held in an end effector 1A, such as a robot hand, is a manipulator of 6 degrees of freedom type which has "joint variables" $\phi_1$ to $\phi_6$ corresponding to, for example, 6 joints 1a to 1f, respectively. Not only a manipulator of the 6 degrees of freedom type but ones of less than 3 degrees of freedom type are applicable to the workpiece handling robot 1.

Similarly, the tool handling robot 2 for manipulating a tool 2n installed in an end effector 2A is also a manipulator of 6 degrees of freedom type which has "joint variables" $\theta_1$ to $\theta_6$ correspond to 6 joints 2a to 2f, respectively. Each of the joints 1a, 2a etc., indicated by a diamond mark, means a swivel joint which rotates each of the links 16W$_1$, 16T$_1$, in the direction of an arrow 1S, and each of the joints 1b, 2b etc., indicated by a double-circle, means a bend-joint which rotates each of the lines 16W$_2$, 16T$_2$ in the direction of an arrow 1B. When some of the joints are simultaneously actuated, the workpiece 1m and the tool 2n can be moved in the desired directions respectively, i.e., being moved in the direction of X-axis only and being rotated around Y-axis only.

Figure 5:
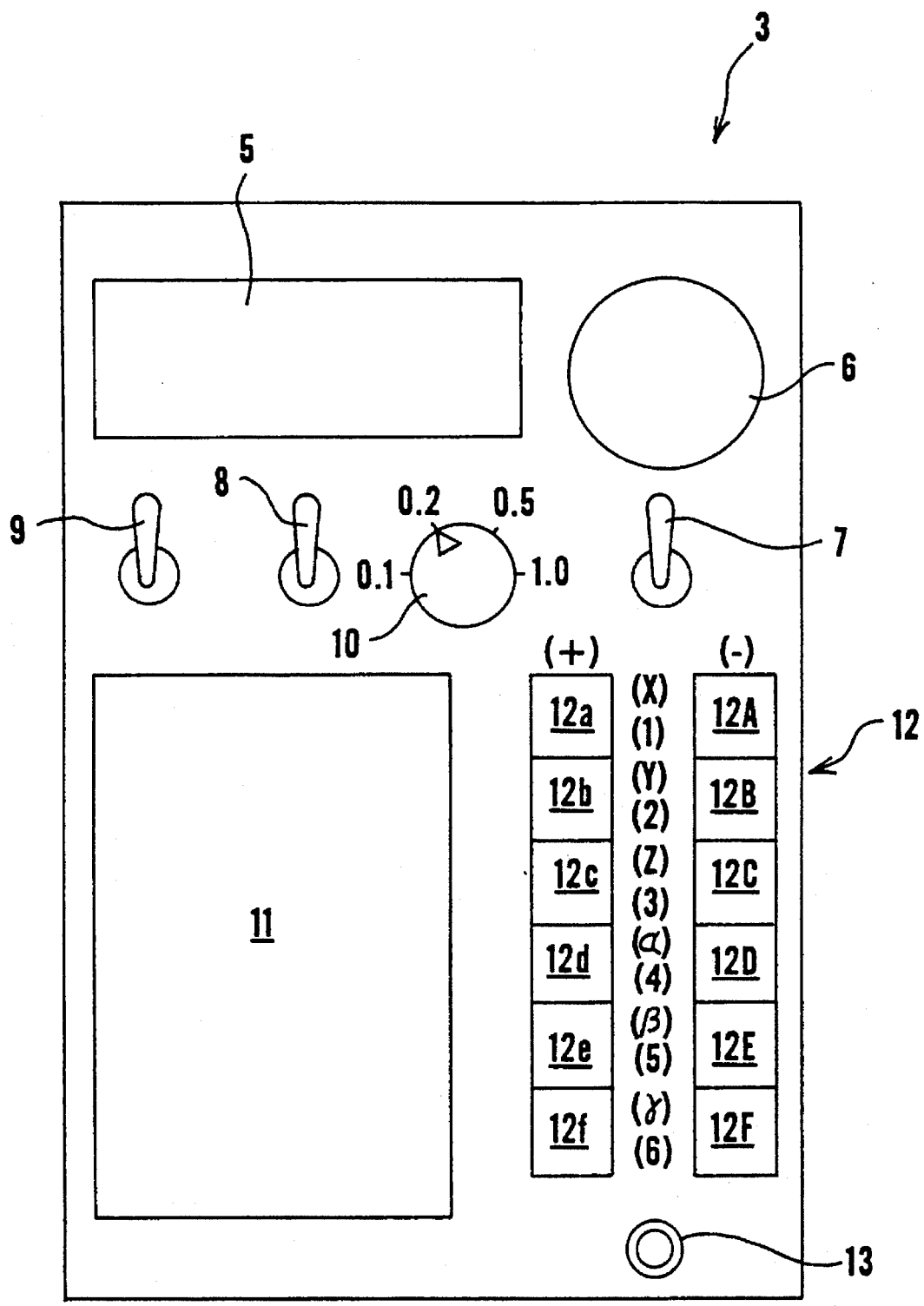
FIG. 5 is a schematic drawing of a teaching panel providing switches.

A teaching pendant 3 and a control equipment 4 are provided for controlling the workpiece handling robot 1 and the tool handling robot 2. FIG. 5 shows a control panel of the teaching pendant 3, on which an indicating device 5 and a topping switch 6 are disposed. There is a robot changing switch 7 on the right hand side of the middle stage of the control panel to select either a workpiece handling robot or a tool handling robot, e.g., tiling it up supplies a robot signal selecting "the workpiece handling robot" and tilting it down supplies a robot signal selecting "the tool handling robot 2". When "a sole-acting mode of the manual operation" is designated by an after mentioned mode changing switch 9, a robot selected by the robot changing switch 7 means one manipulated by the sole-acting mode of the manual operation. When "a co-acting mode of the manual operation" is designated by the mode changing switch 9, a robot selected by the switch 7 means one directly manipulated by the co-acting mode of the manual operation as a master robot. Such a robot changing switch 7 organizes the selecting means of a handling robot.

In the center of the control panel is provided a movement changing switch 8 to choose either "the each axis mode of the manual operation" or "the cartesian coordinates mode of the manual operation". Tiling it up supplies a movement signal choosing "the cartesian coordinates mode on the manual operation" and tilting it down supplies a movement signal choosing "the each axis mode of the manual operation". A mode changing switch 9 is prepared on the left end of the control panel to designate either "the sole-acting mode of the manual operation" for each robot or "the co-acting mode of the manual operation" for both robots. Tiling it up supplies a mode signal designating the latter and tilting it down supplies one designating the former. This mode changing switch 9 organizes the designating means of the sole-action/co-action, which is provided for designating "the sole-acting mode of the manual operation", i.e., the manipulation of the position and the attitude of the tool 2n are independent of the manipulation of the workpiece 1m, or "the co-acting mode of the manual operation", i.e., the manipulation of the position and the attitude of the tool 2n is coordinated with and interdependent on the manipulation of the workpiece 1m. "The co-acting mode of the manual operation" of the present invention means the manipulation of "the position and the attitude of the tool 2n" by the tool handling robot 2 without changing "the attitude of the tool 2n against the ground 64" and "the relative position of the tool 2n against the workpiece 1m" during the manipulation of "the position and the attitude of the workpiece 1m".

The scaling portion at the center of the panel is a rate changing switch 10 for designating a desired rate of the workpiece 1m or the tool 2n during the manual teaching operations within the maximum values memorized in a velocity table of the control equipment 4.

When a scale of, for example, 0.5, is designated, an aimed point regulated on the workpiece 1m is manipulated at a half speed to the target point. If the aimed point is required to be quickly manipulated to the target point, the scale of 1.0 is designated. Thus, any rate many be designated and be changed during the teaching operations. When the path between an aimed point and a target one is rather long, the rate of 1.0 is designated until 80% of the path and the rate of 0.1 during 20% left thereof. Thereby, the aimed point is quickly manipulated to the vicinity of the target point and slowly manipulated close to the target, and it is accurately stopped at the target point for a short time. An operator may return the aimed point to the target one if overshooting a target point owing to the designation of a higher rate. It is convenient for a lower rate to relieve the tension of a teaching operator. Therefore, the rates of this embodiment are provided with four ones, e.g., 0.1, 0.2, 0.5 and 1.0.

On the left hand side of the lower stage of the panel is provided an editing device 11 for teaching data. A group of the keys 12 is disposed on the right hand side of the editing device. Each of the keys 12a to 12f, 12A to 12F supplies an output signal of "1" when pushed, and supplies a signal of "0" when released. This group of the keys 12, consisting of twelve push-buttons, organizes a teaching key means for generating "the actuating signals" to change the position and the attitude of the workpiece 1m or those of tool 2n during the manual teaching operations.

Such a group of the keys 12 is expounded as follows. When not only "the workpiece handling robot" is selected by the robot changing switch 7 but "the each axis mode of the manual operation" is chosen by the movement changing switch 8, pushing the keys 12a to 12f of the left column supplies actuating signals to rotate each joint of the workpiece handling robot 1 and pushing the keys 12A to 12F on the right column supplies ones to reversely rotate each joint thereof. On the other hand, when "the cartesian coordinates mode of the manual operation" is chosen by the switch 8, pushing the keys of the upper three supplies actuating signals to move the workpiece along X-axis, Y-axis and/or Z-axis of the absolute coordinates system 51 shown in FIG. 6, i.e., pushing the left ones 12a to 12c realizes the movement in the position direction of each axis, and pushing the right ones 12A to 12C in the negative directions thereof. Pushing the keys of the lower three supplies actuating signals to rotate the workpiece in the directions of the Euler's angles α, β and/or τ or the absolute coordinates system 51 shown in FIG. 6, i.e., pushing the left ones 12d to 12f realizes the rotation in the positive directions, and pushing the right ones 12D to 12F in the negative directions.

A teaching switch 13 is provided at the lowest stage of the panel in order to memorize the data of the "the position and the attitude" of the workpiece and/or those of the tool during the teaching operations of not only the sole-acting mode executed by the control means for the sole-action but the co-acting mode executed by the control means for the co-action described as follows. Pushing the switch 13 commands to memorize "the position and the attitude of the the tool 2n" under the desired state established.

Such a control device for the manual teaching operations of the industrial robotic system is provided with a computer 4A as control means for controlling the co-acting mode of the manual teaching operations of the robotic system in response to "the co-acting mode signal" supplied by the mode changing switch 9, "the robot signal selecting the workpiece handling robot" supplied by the robot changing switch 7 and "the actuating signals" supplied by the group of the keys 12 in the control equipment 4 as shown in FIG. 2.

The control equipment 4 comprises not only the control means 4A for controlling the co-acting mode of the manual teaching operations associated with the present invention but conventional control means 4W, 4T for controlling the sole-acting mode of the manual teaching operations of the workpiece handling robot and the tool handling robot. Each control means provides, as shown in FIG. 7, a micro-processing unit 14 comprising CPU, ROM and RAM etc., and surbo-drivers 15W, 15T transforming the output signals, i.e., "the control signals of the actuating values for the actuators" in the micro-processing unit, to the actuators of the workpiece handling robot and to the actuators of the tool handling robot.

The workpiece handling robot 1 and the tool handling robot 2 are manipulators of 6 degrees of freedom type, respectively, having surbo-drivers $15W_1$ to $15W_6$, $15T_1$ to $15T_6$. The actuators $17W_1$ to $17W_6$ as electric motors are provided corresponding to each surbo-driver 15W to rotate the links $16W_1$ to $16W_6$ connected with each joint of the workpiece handling robot 1 as shown in FIG. 2, and the actuators $17T_1$ to $17T_6$ are provided corresponding to each surbo-driver 15T to rotate the links $16T_1$ to $16T_6$ connected with each joint of the tool handling robot 2 as also shown in the same.

Figure 7:
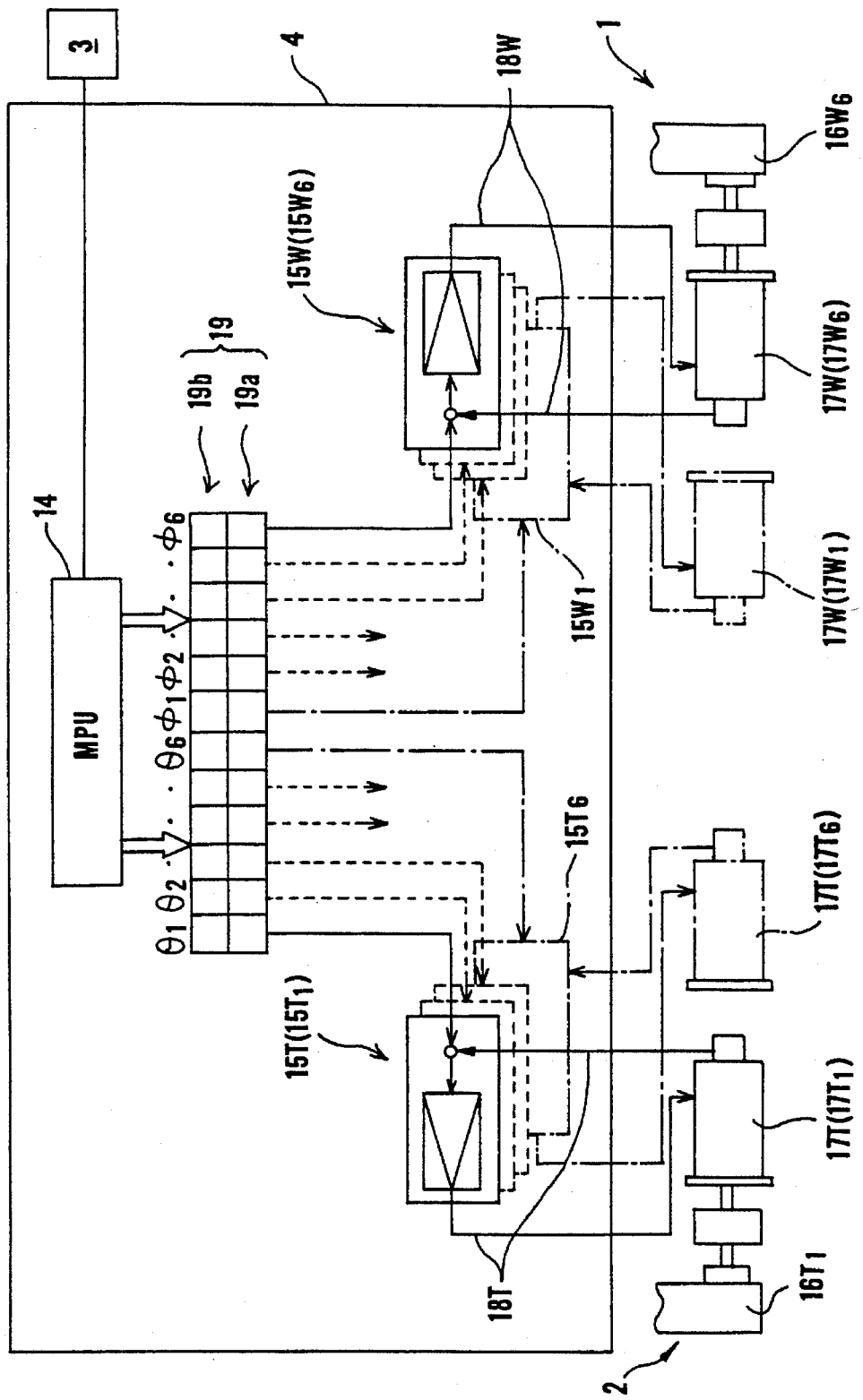
FIG. 7 is a systematic block diagram of the control equipment associated with the actuators of the robots.

The symbol 18W shown in FIG. 7 means a control cable which connects each surbo-driver 15W with corresponding actuator 17W of the workpiece handling robot 1, and the symbol 18T means also a control cable which connects each surbo-driver 15T with corresponding actuator 17T of the tool handling robot 2. The numeral 19 is an interface to transmit control signals of "the actuating values for the actuators", 19a indicates an interface for outputting signals and 19b indicates a buffer thereof. Each has twelve windows corresponding to "the joint variables, $\phi_1, \phi_2, \ldots, \phi_6$", of the workpiece handling robot 1" and corresponding to "the joint variables, $\theta_1, \theta_2, \ldots \theta_6$, of the tool handling robot 2", respectively.

Figure 30:
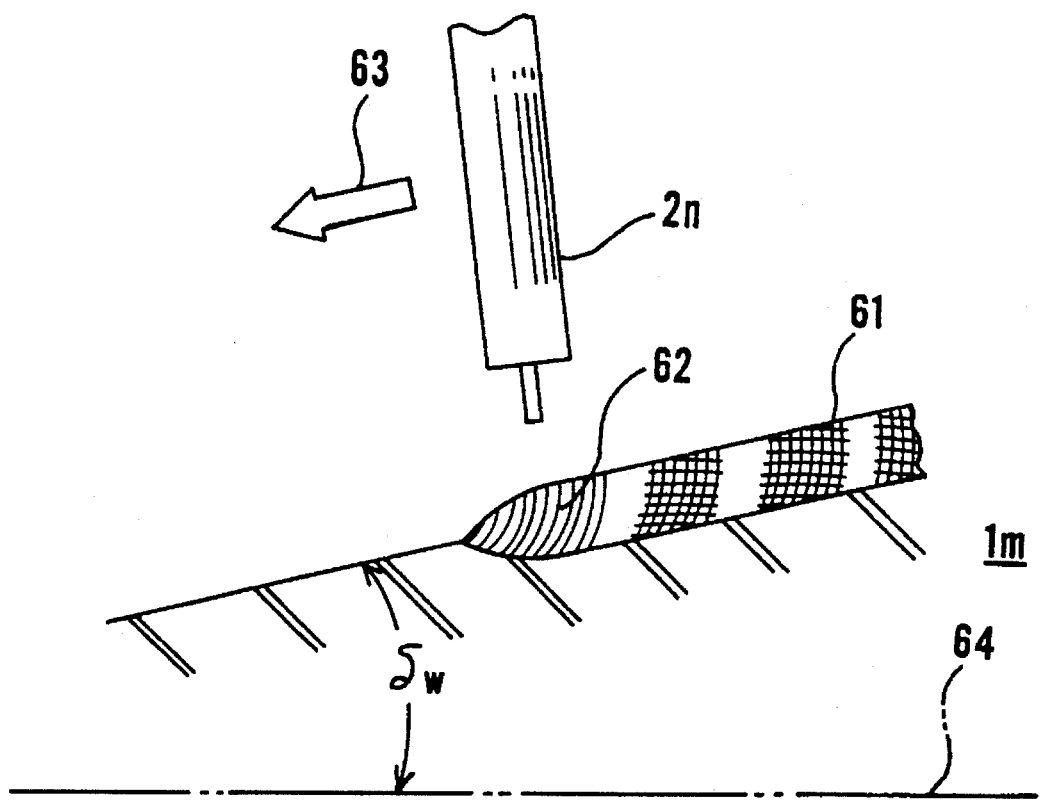
FIG. 30 is a brief drawing of the torch welding the workpiece under the operation of "the downward slope welding".

As mentioned in the background of the prior art, it is important for the workpiece 1m to be set so that the inclination of the welding line 61, see FIG. 30, on the workpiece 1m comes to a desired inclination $\delta_w$ against the ground 64. Therefore, "the attitude of the workpiece 1m" should be maintained constant to achieve the inclination of the welding line 61 being constant against the ground 64. On the other hand, "the attitude of the torch 2n" should be constant against the ground 64 if the inclination of the welding line 61 is maintained constant against the ground 64, because "the attitude of the torch 2n" is regulated by the inclination of the welding line 61.

Figure 1:
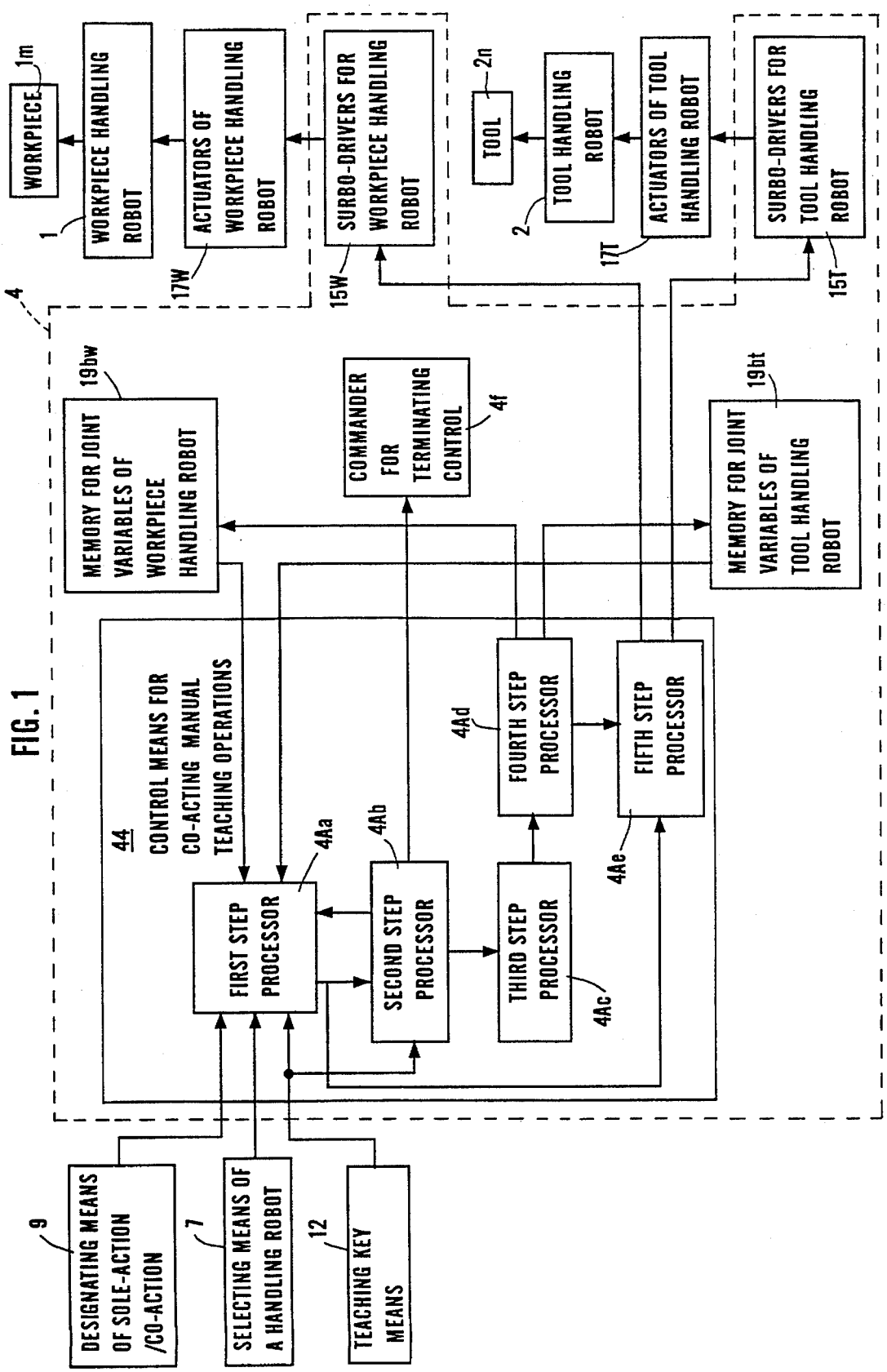
FIG. 1 is a block diagram of a teaching control device for manual operations of an industrial robotic system related to the present invention.
Figure 6:
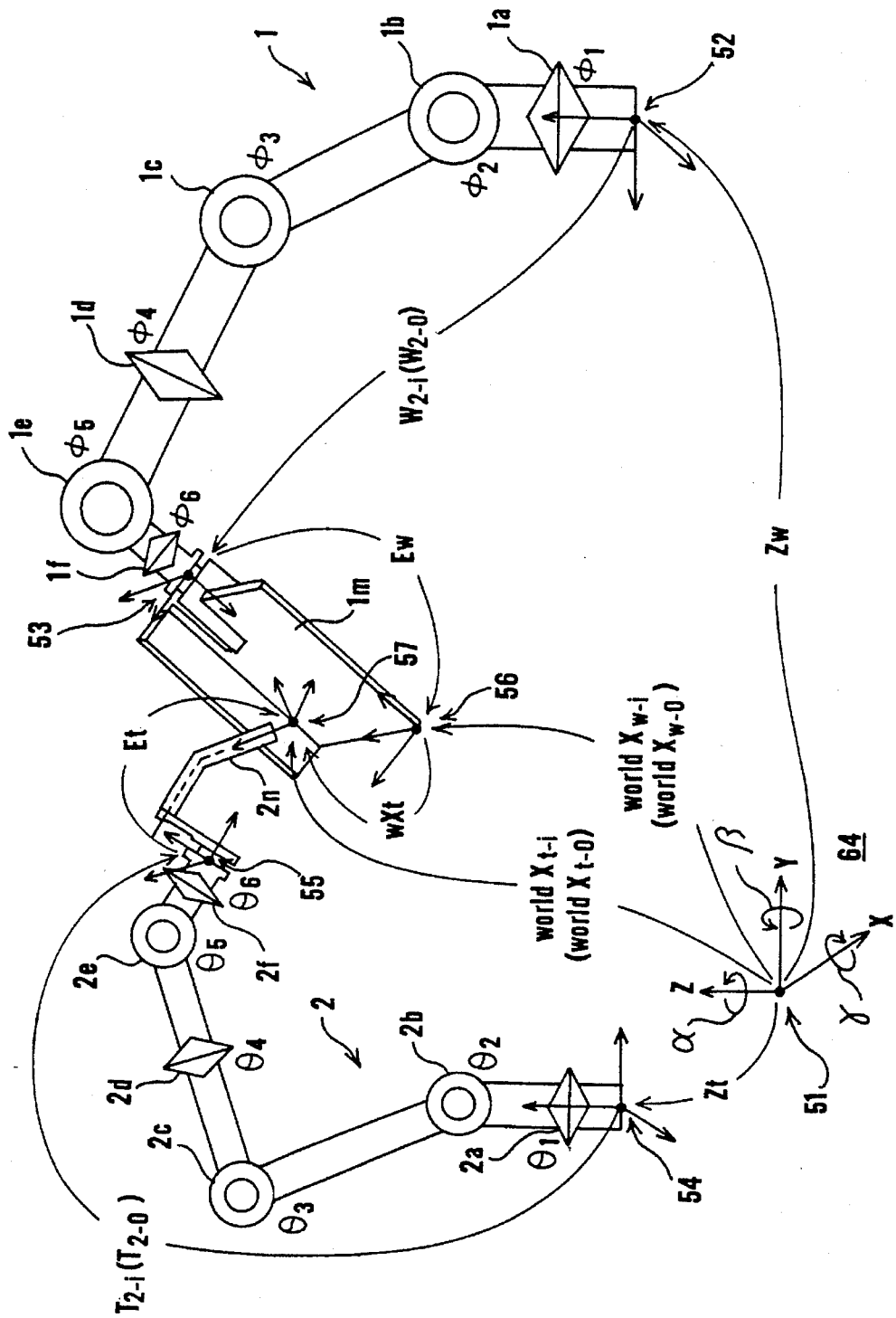
FIG. 6 is a schematic drawing of a robotic system to explain the coordinates system of the workpiece handling robot and that of the tool handling robot, and to explain the mutual relationship of the homogeneous transformation matrixes expressing "the position and the attitude" of the regulated part of each robot.

The control means 4A for controlling the co-acting mode of the manual teaching operations has a computing program executing the control of five processors 4Aa to 4Ae described as follows:

Referring to FIG. 1, the first step processor 4Aa begins to control following procedures after receiving "the co-acting mode signal" supplied by the mode changing switch 9, "the robot signal selecting the workpiece handling robot" supplied by the robot changing switch 7 and "the actuating signals" supplied by the group of the keys 12. Initially, "the joint variables, $\phi_{1-0}, \phi_{2-0}, \phi_{3-0}, \phi_{4-0}, \phi_{5-0}, \phi_{6-0}$, of the workpiece handling robot obtained just before receiving the actuating signals" are red out from "the memory 19bw for the joint variables of the workpiece handling robot" and "the joint variables, $\theta_{1-0}, \theta_{2-0}, \theta_{3-0}, \theta_{4-0}, \theta_{5-0}, \theta_{6-0}$, of the tool handling robot obtained just before receiving the actuating signals" are also red out from "the memory 19bt for the joint variables of the tool handling robot". And "the previous position and the previous attitude of the referential point 56 of the workpiece in the absolute coordinates system 51", "the attitude of the tip point 57 of the tool against the ground 64" and "the relative attitude of the tip point 57 of the tool against the referential point 56 of the workpiece" are computed by using "the joint variables of the workpiece handling robot 1" and "the joint variables of the tool handling robot". The above referential point 56 of the workpiece is a representative point regulated on the workpiece 1*m*, e.g., one of the corner of the workpiece 1*m* as shown in FIG. 6.

"The read-write memory 19*bw* for the joint variables of the workpiece handling robot" and "the read-write memory 19*bt* for the joint variables of the tool handling robot" are included in the buffer 19*b*, respectively, shown in FIG. 7. "The above mentioned joint variables of the workpiece handling robot obtained just before receiving the actuating signals" means "the joint variables of the workpiece handling robot" already stored in the memory 19*bw* prior to receiving "the actuating signals" generated at the beginning of the "co-acting mode of the manual teaching operations". And they also mean "the joint variables of the workpiece handling robot" generated by using "the previous actuating signals" when the control is returned from the control of the fifth step processor 4A*e* to the control of the second step processor 4A*b* under the co-acting mode of the manual teaching operations" as described later. "The joint variables of the tool handling robot obtained just before receiving the actuating signals" also mean the same as the above.

The above control are carried out in response to "the co-acting mode signal", "the robot signal selecting the workpiece handling robot" and "the actuating signals". At this first step processor 4A*a*, the velocity of the workpiece 1*m* are, further, computed in response to the rate "r" designated by the rate changing switch 10 after computing the above mentioned.

The control of the second processor 4A*b* is begun immediately after the completion of the above mentioned computing step of the first processor 4A*a*, of which function is to control the execution of the calculating step of the third processor 4A*c* in response to the actuating signals maintained for a preset time interval $\Delta T$, e.g., one-twentieth of a second, to control the repetition of the above mentioned computing step in response to "new actuating signals" when a change of the actuating signals is detecting during the preset time interval $\Delta T$, or to control the termination of the co-acting mode of the manual operation in response to an absence of the actuating signals during the preset time interval $\Delta T$, i.e., to supply a termination signal to the commander 4*f* for terminating control shown in FIG. 1.

At the third step processor 4A*c*, "the position and the attitude of the holding point 53 of the workpiece against the base point 52 of the workpiece handling robot 1 after the preset time interval $\Delta T$ are calculated by using "the actuating signals" and "the previous position and the previous attitude of the referential point 56 of the workpiece in the absolute coordinates system 51" computed at the first step processor 4A*a*. And "the position and the attitude of the installation point 55 of the tool against the base point 54 of the tool handling robot 2 after the preset time interval $\Delta T$ are also calculated by using "the attitude of the tip point 57 of the tool against the ground 64" computed at the first step processor 4A*a*, "the relative position of the tip point 57 of the tool against the referential point 56 of the workpiece" computed at the first step processor 4A*a* and "the position and the attitude of the referential point 56 of the workpiece in the absolute coordinates system 51 after the preset time interval $\Delta T$" obtained at the process calculating the above mentioned "position and attitude of the holding point 53 of the workpiece against the base point 52 of the workpiece handling robot 1 after the preset time interval $\Delta T$".

The control of the fourth step processor 4*d* is begun immediately after the completion of the calculation at the third step processor 4A*c*. "The joint variables $\phi_{1-i}$, $\phi_{2-i}$, $\phi_{3-i}$, $\phi_{4-i}$, $\phi_{5-i}$, $\phi_{6-i}$, of the workpiece handling robot 1 after the preset time interval $\Delta T$" are calculated by using "the position and attitude of the holding point 53 of the workpiece against the base point 52 of the workpiece handling robot 1 after the preset time interval $\Delta T$" calculated by the third step processor 4A*c*. And "the joint variables, $\theta_{1-i}$, $\theta_{2-i}$, $\theta_{3-i}$, $\theta_{4-i}$, $\theta_{5-i}$, $\theta_{6-i}$, of the tool handling robot 2 after the preset time interval $\Delta T$" are also calculated by using "the position and attitude of the installation point 55 of the tool against the base point 54 of the tool handling robot 2 after the preset time interval $\Delta T$" calculated by the third step processor 4A*c*.

At the fifth step processor 4A*e*, "the actuating values, $a_{w1-i}$, $a_{w2-i}$, $a_{w3-i}$, $a_{w4-i}$, $a_{w5-i}$, $a_{w6-i}$, for the actuators of the workpiece handling robot 1" are calculated by using "the joint variables of the workpiece handling robot 1 after the preset time interval $\Delta T$" calculated at the fourth step processor 4A*d*. "The actuating values, $a_{t1-i}$, $a_{t2-i}$, $a_{t3-i}$, $a_{t4-i}$, $a_{t5-i}$, $a_{t6-i}$, for the actuators of the tool handling robot 2" are also calculated by using "the joint variables of the tool handling robot 2 after the preset time interval $\Delta T$" calculated at the fourth step processor 4A*d*. Thereafter, "the control signals, $a_{w1-i}$, $a_{w2-i}$, $a_{w3-i}$, $a_{w4-i}$, $a_{w5-i}$, $a_{w6-i}$, of the actuating values" and "the control signals, $a_{t1-i}$, $a_{t2-i}$, $a_{t3-i}$, $a_{t4-i}$, $a_{t5-i}$, $a_{t6-i}$, of the actuating values" are simultaneously supplied to the actuators of the workpiece handling robot 1 and to the actuators of the tool handling robot 2 just after the preset time interval $\Delta T$, respectively, through the surbo-driver 15W, 15T for actuating actuators. This calculating step processor commands a repetition of the second step and succeeding steps thereto.

Figure 8A:
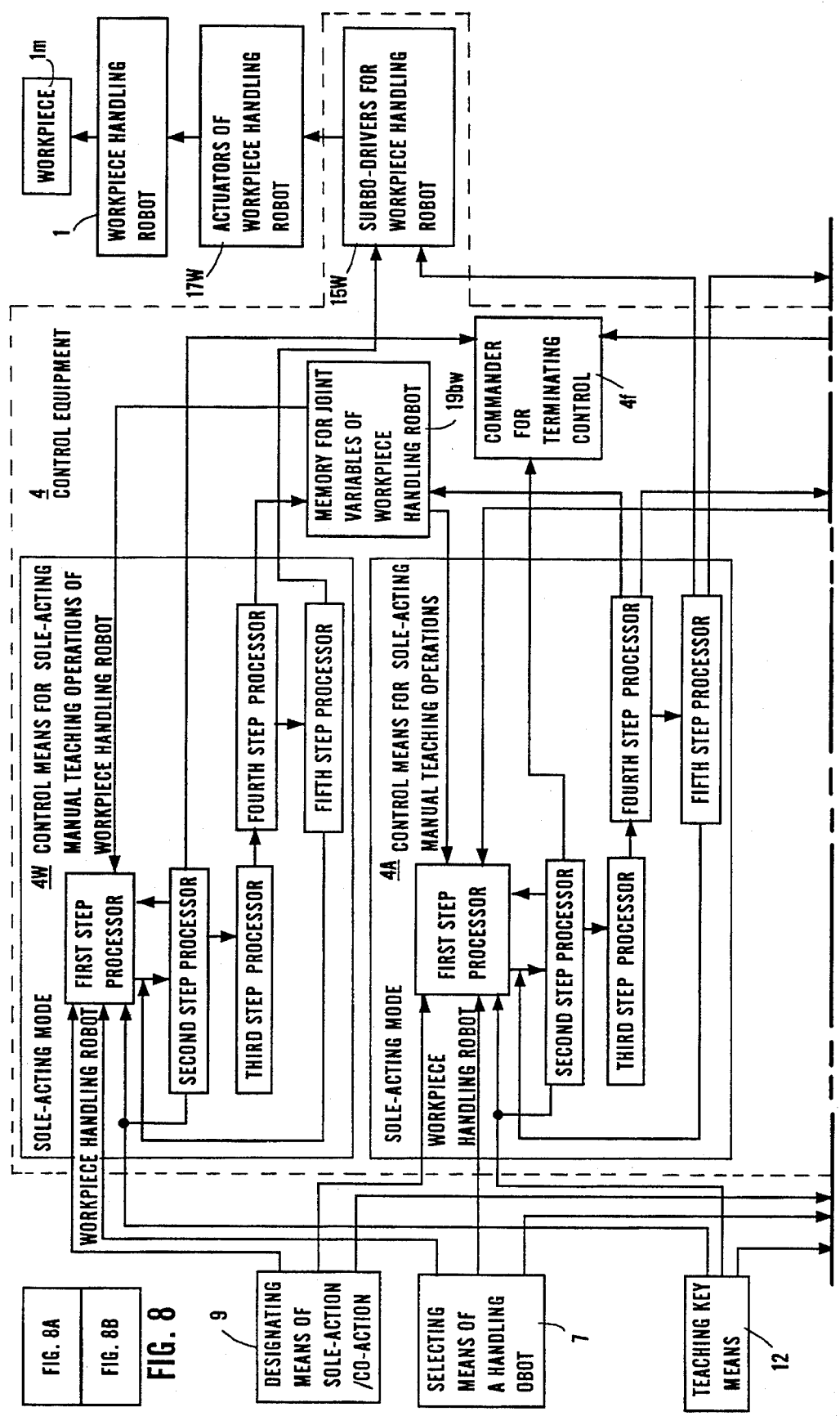
FIGS. 8A and 8B are block diagram of the control equipment for the all mode of the manual teaching operations".
Figure 8B:
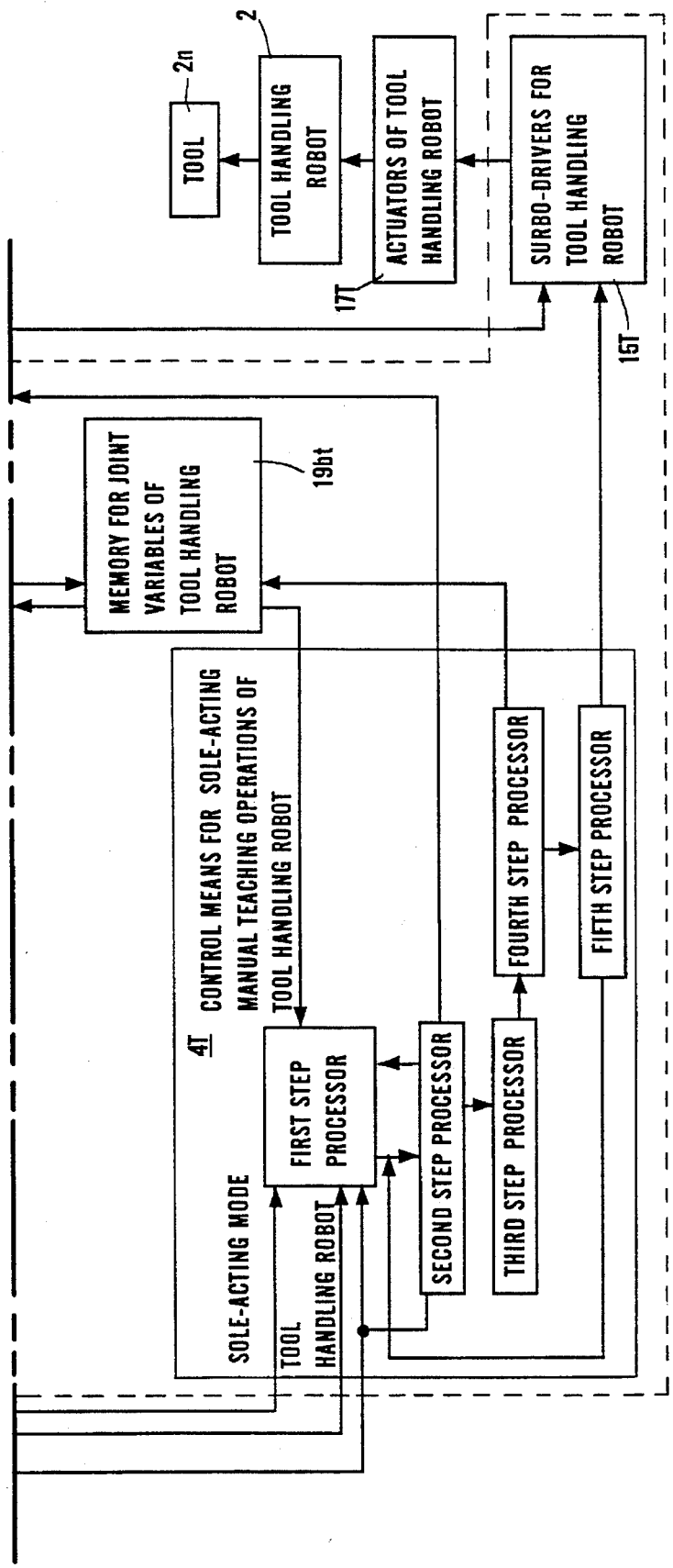

The control equipment 4 also provides a conventional control means 4W for controlling the sole-acting mode of the manual teaching operations of the workpiece handling robot and a conventional control means 4T for controlling the sole-acting mode of the manual teaching operations of the tool handling robot as shown in FIG. 8. The former controls the manipulation of the workpiece handling robot 1 in response to "the actuating signals" supplied by the group of the keys 12, "the robot signal selecting the workpiece handling robot" supplied by the robot changing switch 7 and "the sole-acting mode signal" supplied by the mode changing switch 9. The latter controls the manipulation of the tool handling robot 2 in response to "the actuating signals", "the robot signal selecting the tool handling robot" and "the sole-acting mode signal".

Incidentally, not only "the joint variables" generated under "the sole-acting mode of the manual operations" but "the joint variables" generated under "the co-acting mode of the manual operations" are stored in the memory 19*bw* for the joint variables of the workpiece handling robot and the memory 19*bt* for the joint variables of the tool handling robot, respectively. Therefore, one unit of the memory 19*bw* is adopted for the joint variables of the workpiece handling robot in the control equipment 4, and one unit of the memory 19*bt* is adopted for the joint variables of the tool handling robot. And the commander 4*f* for terminating control is also common to all of control means. The conventional control means 4W and 4T individually have five processors 4W*a* to 4W*e*, 4T*a* to 4T*e* similar to the above mentioned first one 4A*a* to the fifth one 4A*e*, of which functions will be explained in the section of "the sole-acting mode of the manual operations" described later.

Referring to some of the flow charts of FIG. 9 and succeeding ones thereto, the manual teaching operations of the workpiece handling robot 1 and the tool handling robot 2 in the above mentioned robotic system are described as follows:

(1) The control of "the co-acting cartesian coordinates mode of the manual operations" is expounded below, which is controlled in response to "the cartesian coordinates mode signal" supplied by the movement changing switch 8 and "the co-acting mode signal" supplied by the mode changing switch 9.

This control is to manipulate "the position and the attitude of the referential point 56 of the workpiece" in the absolute coordinates system 51 shown in FIG. 6 by rotating the joints of the workpiece handling robot 1 and the joints of the tool handling robot 2 so that "the attitude of the tool $2n$" is maintained constant against the ground 64, i.e., against the absolute coordinates system 51, and so that "the relative position of the tool $2n$ against the workpiece $1m$" is maintained constant by coordinating with the manipulation of "the position and the attitude of the workpiece $1m$".

Previous to the control of "the co-acting mode of the manual operations", the workpiece $1m$ and the tool $2n$ are manipulated by "the sole-acting mode of the manual operations" of the workpiece handling robot 1 and by "the sole-acting mode of the manual operations" of the tool handling robot 2, respectively. Referring to FIG. 13(a), "the position and the attitude of the workpiece $1m$" are, then, manipulated by the workpiece handling robot 1 so that the inclination of the tangent $B_{1S}$ of "the aimed point" $B_1$ regulated on the workpiece $1m$ against the ground 64 comes to "the desired angle $\delta_w$ against the ground 64". Thereafter, "the position and the attitude of the tool $2n$" are manipulated by the tool handling robot 2 so that "the desired attitude of the tool $2n$ against the ground 64" is achieved at "the aimed point" $B_1$ regulated on the workpiece $1m$. By such manipulating, the first state of the workpiece $1m$ and that of the tool $2n$ are achieved.

The first state of the workpiece $1m$ and that of the tool $2n$ are taught by using the teaching switch 13, see FIG. 5, as "the first teaching point" $A_1$, respectively. If unnecessary, the first state established as above is not taught. But "the joint valiables, $\phi_{1-i}, \phi_{2-i}, \phi_{3-i}, \phi_{4-i}, \phi_{5-i}, \phi_{6-i}$, of the workpiece handling robot 1" are automatically stored in the read-write memory 19$bw$ for joint variables and "the joint valiables, $\theta_{1-i}, \theta_{2-i}, \theta_{3-i}, \theta_{4-i}, \theta_{5-i}, \theta_{6-i}$, of the tool handling robot 2" corresponding to "the position and attitude of the tool $2n$" are automatically stored in the memory 19$bt$ even if the teaching switch is not pushed.

"The co-acting mode of the manual operation" is designated by the mode changing switch 9, "the cartesian coordinates mode of the manual operation" is chosen by the movement changing switch 8 and "the workpiece handling robot" is selected by the robot changing switch 7 of the teaching pendant 3. Moreover, a desired rate, e.g., 0.2, which is indicated as "$r_b$", is designated by the rate changing switch 10.

Figure 9:
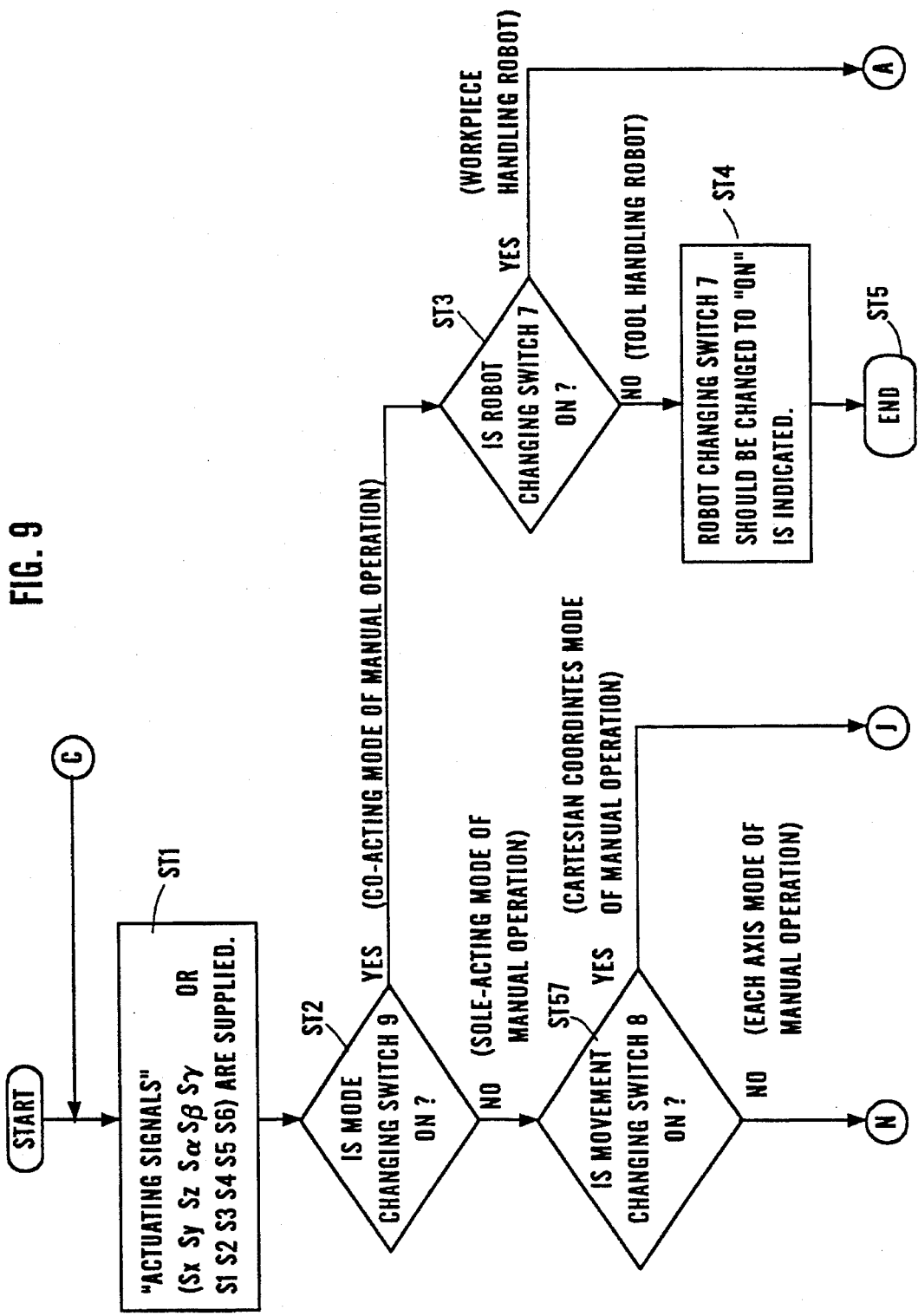
FIG. 9 is a flow chart of the initial phase of the manual teaching operations.

Pushing the desired keys, e.g., 12$b$, 12$c$, and 12E, the control means 4A executes the co-acting cartesian coordinates mode of the manual operation until the keys are released is as follows:

(a): The control of the first step processor 4A$a$ is executed as (a-1) to (a-4) mentioned after;

The control equipment 4 receives the actuating signals generated by the keys 12$b$, 12$c$ and 12E (see step 1 in the flow chart of FIG. 9, which is indicated as ST1). As the mode changing switch 9 is "on" (ST2), the robot changing switch 7 is "on" (ST3), and the movement changing switch 8 is "on" (ST6 in FIG. 10), the procedure is led to the step 7 in response to "the co-acting mode signal", "the robot signal selecting the workpiece handling robot" and "the cartesian coordinates mode signal". If the robot changing switch 7 is "off" (ST3), the undrawn CRT indicates the message of "the workpiece handling robot should be selected", and the termination of "the co-acting mode of the manual operation" is controlled in response to "the robot signal selecting the tool handling robot" (ST4 and ST5).

Either a manipulator of 6 degrees of freedom type or a positioner of less than 3 degrees of freedom type may be generally applicable to the workpiece handling robot 1 manipulating under the control of "the sole-acting mode of the manual operation". The former only is, however, applicable to the control of the co-acting mode of the manual operation, therefore, it is discriminated whether the workpiece handling robot 1 is a manipulator of 6 degrees of freedom type or not at the step 7.

The control means 4A for controlling the co-acting mode of the manual teaching operations" which has previously stored the degrees of freedom of the workpiece handling robot discriminates whether the inputted degrees of freedom of the workpiece handling robot 1 is available to the control of "the co-acting mode of the manual operation". If the workpiece handling robot 1 is a positioner, the undrawn CRT indicates the error message of "the execution of the control is unoperable", and the termination of "the co-acting mode of the manual operation" is controlled in response to the inputted degrees of freedom of the workpiece handling robot (ST8 and ST9).

The computing program of the control means 4A includes a protective program to stop the execution of "the cartesian coordinates mode of the manual operation", unless the workpiece handling robot 1 is a manipulator of 6 degrees of freedom type. Because, the positioner of less than 3 degrees of freedom type is not applicable to the control of "the cartesian coordinates mode of the manual operation". Such a positioner is, however, operable in "the each axis mode of the manual operation" mentioned later. If the workpiece handling robot 1 is 6 degrees of freedom type (ST7), the procedure is led to the step 10 in response to the signal of "6 degrees of freedom".

(a-1); The velocity components of the linear motion of the referential point 56 regulated on the workpiece $1m$ along each axis of the absolute coordinates system 51, i.e., of the coordinates set on the ground 64, and the velocity components of the revolutionary motion thereof around each axis of the absolute coordinates system 51 are calculated as follows;

The velocity components, $Vx_w, Vy_w, Vz_w, V\alpha_w, V\beta_w, W\tau_w$, are computed by the following equations (1) in response to the actuating signals, $Sx, Sy, Sz, S\alpha, S\beta, S\tau$, generated by the keys 12$b$, 12$c$ and 12E, the selected "rate" $r_b$ and the preset maximum values, $Vx_{w0}, Vy_{w0}, Vz_{w0}, V\alpha_{w0}, V\beta_{w0}, W\tau_{w0}$, memorized in the velocity table for "the cartesian coordinates mode of the manual operation" of the workpiece $1m$ (ST10).

$$Vx_w = Sx \times r_b \times Vx_{w0}$$

$$Vy_w = Sy \times r_b \times Vy_{w0}$$

$$Vz_w = Sz \times r_b \times Vz_{w0}$$

$$V\alpha_w = S\alpha \times r_b \times V\alpha_{w0}$$

$V\beta_w = S\beta \times r_b \times V\beta_{w0}$ $V\tau_w = S\tau \times r_b \times V\tau_{w0}$ (1)

The above mentioned Sx, Sy, ..., Sτ are as follows;

Pushing each of the keys 12a to 12f generates a signal "+1";

Pushing each of the keys 12a to 12F generates a signal "−1";

Releasing each of the keys 12a to 12f, 12A to 12F generates a signal "0".

Since the keys 12b, 12c and 12E only are pushed in this case, the actuating signals are generated as follows;

| | | | |
|---|---|---|---|
| Sx = 0, | thus, | $Vx_w$ = | 0 |
| Sy = +1, | thus, | $Vy_w$ = | $r_b \times Vy_{wo}$ |
| Sz = +1, | thus, | $Vz_w$ = | $r_b \times Vz_{wo}$ |
| Sα = 0, | thus, | $V\alpha_w$ = | 0 |
| Sβ = −1, | thus, | $V\beta_w$ = | $r_b \times V\beta_{wo}$ |
| Sγ = 0, | thus, | $V\gamma_w$ = | 0 |

(a-2); "The position and the attitude of the referential point 56 of the workpiece in the absolute coordinates system 51 prior to receiving the actuating signals" are computed by using "the joint variables of the workpiece handling robot 1" obtained just before receiving "the actuating signals" and "the joint variables of the tool handling robot 2" obtained just before receiving "the actuating signals" as follows;

"The joint variables, $\phi_{1-0}, \phi_{2-0}, \ldots, \phi_{6-0}$, of the workpiece handling robot 1" obtained prior to receiving "the present actuating signals" are red out from the read-write memory 19bw (ST11). The homogeneous transformation matrix, $W_{2-0}$, expressing "the position and the attitude of the holding point 53 of the workpiece against the base point 52 (see FIG. 6) of the workpiece handling robot 1 obtained prior to receiving the present actuating signals" is formulated as a following equation (3) by a product of the homogeneous transformation matrixes of the equation (2) which uses "link parameters" of the Denavit-Hartenberg Notation.

$A_{jw} = Rot(Z, \phi_j) \cdot Trans(a_{jw}, 0, d_{jw}) \cdot Rot(X, \alpha_{jw})$ (2)

$W_{2-0} = A_{1w} \cdot A_{2w} \cdot A_{3w} \cdot A_{4w} \cdot A_{5w} \cdot A_{6w}$ (3)

The symbols in the equation (2) are as follows;

$\phi_j$ is a variable of the j-th joint of the workpiece handling robot 1.

$a_{jw}$ is a length of the j-th link of the workpiece handling robot 1, which is a fixed value.

$d_{jw}$ is a distance between the (j−1)-th link and the j-th one of the workpiece handling robot 1, which is a fixed value.

$\alpha_{jw}$ is an angle between the (j−1)-th link and the j-th one of the workpiece handling robot 1, which is a fixed value.

The homogeneous transformation matrix, "world $X_{w-0}$", expressing "the position and the attitude of the referential point 56 of the workpiece in the absolute coordinates system 51 obtained prior to receiving the present actuating signals" is calculated by the equation (4), into which the equation (3) is substituted (ST12).

world $X_{w-0} = Z_w \cdot W_{2-0} \cdot E_w$ (4)

where, $Z_w$ is a homogeneous transformation matrix expressing "the position and the attitude of the base point 52 of the workpiece handling robot 1 in the absolute coordinates system 51 in FIG. 6", and $E_w$ is a homogeneous transformation matrix expressing "the position and the attitude of the referential point 56 of the workpiece against the holding point 53 thereof". These data are known and were previously stored in the control equipment 4.

Equation (4) is formulated as a following equation.

$$\text{world } X_{w-o} = \begin{bmatrix} n_x & o_x & a_x & p_x \\ n_y & o_y & a_y & p_y \\ n_z & o_z & a_z & p_z \\ 0 & 0 & 0 & 1 \end{bmatrix}$$ (5)

By transforming the eq. (5), the data, $X_{w-0}, Y_{w-0}, Z_{w-0}$, of "the position of the referential point 56 of the workpiece in the absolute coordinates system 51 obtained prior to receiving the present actuating signals" and the data $\alpha_{w-0}, \beta_{w-0}, \tau_{w-0}$, of "the attitude of the referential point 56 of the workpiece in the absolute coordinates system 51 obtained prior to receiving the present actuating signals" are calculated. Those six parameters are values equivalent to the following equations (ST13).

world $X_{w-o} = Trans(X_{w-o}, Y_{w-o}, Z_{w-o}) \cdot Rot(Z, \alpha_{w-o}) \cdot$ $Rot(Y, \beta_{w-o}) \cdot Rot(Z, \gamma_{w-o}) =$ $$\begin{bmatrix} Cos(\alpha_{w-o})Cos(\beta_{w-o})Cos(\gamma_{w-o}) - Sin(\alpha_{w-o})Sin(\gamma_{w-o}) \\ Sin(\alpha_{w-o})Cos(\beta_{w-o})Cos(\gamma_{w-o}) + Cos(\alpha_{w-o})Sin(\gamma_{w-o}) \\ -Sin(\beta_{w-o})Cos(\gamma_{w-o}) \\ 0 \\ -Cos(\alpha_{w-o})Cos(\beta_{w-o})Sin(\gamma_{w-o}) - Sin(\alpha_{w-o})Cos(\gamma_{w-o}) \\ -Sin(\alpha_{w-o})Cos(\beta_{w-o})Sin(\gamma_{w-o}) - Cos(\alpha_{w-o})Cos(\gamma_{w-o}) \\ Sin(\beta_{w-o})Cos(\gamma_{w-o}) \\ 0 \\ \begin{matrix} Cos(\alpha_{w-o})Sin(\beta_{w-o}) & X_{w-o} \\ Sin(\alpha_{w-o})Sin(\beta_{w-o}) & Y_{w-o} \\ Cos(\beta_{w-o}) & Z_{w-o} \\ 0 & 1 \end{matrix} \end{bmatrix}$$

$X_{w-o} = p_x, Y_{w-o} = p_y, Z_{w-o} = p_z$ (6)

$\alpha_{w-o} = Cos^{-1}(a_x/Sin(\beta_{w-o}))$ (7)

$\beta_{w-o} = Cos^{-1}(a_z)$ (8)

$\gamma_{w-o} = Sin^{-1}(o_z/Sin(\beta_{w-o}))$ (9)

(a-3); "The attitude of the tip point 57 of the tool against the ground 64" and "the relative position of the tip point 57 of the tool against the referential point 56 of the workpiece" are calculated in response to "the joint variables of the workpiece handling robot 1 obtained prior to receiving the present actuating signals" and "the joint variables of the tool handling robot 2 obtained prior to receiving the present actuating signals" as follows;

"The joint variables, $\theta_{1-0}, \theta_{2-0}, \theta_{3-0}, \theta_{4-0}, \theta_{5-0}, \theta_{6-0}$, of the tool handling robot 2 obtained prior to receiving the present actuating signals" are red out from the read-write memory 19bt (ST14). The homogeneous transformation matrix, $T_{2-0}$, expressing "the position and the attitude of the installation point 55 of the tool against the base point 54 (see FIG. 6) of the tool handling robot 2 obtained prior to receiving "the present actuating signals" is formulated as a following equation (11) by a product of the homogeneous transformation matrixes of the equation (10) which uses "link parameters" of the Denavit-Hartenberg Notation.

$A_{jt} = Rot(Z, \theta_j) \cdot Trans(a_{jt}, 0, d_{jt}) \cdot Rot(X, \alpha_{jt})$ (10)

$T_{2-0} = A_{1t} \cdot A_{2t} \cdot A_{3t} \cdot A_{4t} \cdot A_{5t} \cdot A_{6t}$ (11)

The symbols in the equation (10) are as follows;

$\phi_j$ is a variable of the j-th joint of the tool handling robot 2.

$a_{jt}$ is a length of the j-th link of the tool handling robot 2, which is a fixed value.

$d_{jt}$ is a distance between the (j−1)-th link and the j-th one of the tool handling robot 2, which is a fixed value.

$\alpha_{jt}$ is an angle between the (j−1)-th link and the j-th one of the tool handling robot 2, which is a fixed value.

"The attitude of the tip point 57 of the tool in the absolute coordinates system 51 obtained prior to receiving the present actuating signals" is calculated so that "the attitude of the tip point 57" may maintain "the attitude of the tip point 57 of the tool against the ground 64 obtained prior to receiving the present actuating signals".

The homogeneous transformation matrix, "world $X_{t-0}$", expressing "the position and the attitude of the tip point 57 of the tool in the absolute coordinates system 57 obtained prior to receiving the present actuating signals" is calculated by the eq. (12), into which the eq. (11) is substituted (ST15 of FIG. 11).

$$\text{world } X_{t-o} = Z_t \cdot T_{z-o} \cdot E_t = \begin{bmatrix} n_{xt-o} & o_{xt-o} & a_{xt-o} & p_{xt-o} \\ n_{yt-o} & o_{yt-o} & a_{yt-o} & p_{yt-o} \\ n_{zt-o} & o_{zt-o} & a_{zt-o} & p_{zt-o} \\ 0 & 0 & 0 & 1 \end{bmatrix} \quad (12)$$

where $Z_t$ is a homogeneous transformation matrix expressing "the position and the attitude of the base point 54 of the tool handling robot 2 in the absolute coordinates system 51" in FIG. 6, and $E_t$ is a homogeneous transformation matrix expressing "the position and the attitude of the tip point 57 of the tool against the installation point 55 thereof". These data are known and were previously stored in the control equipment 4.

By substituting each factors of eq. (12) into the following eq. (12a) to eq. (12c), the data, $\alpha_{t-0}$, $\beta_{t-0}$, $\tau_{t-0}$, of "the attitude of the tip point 57 of the tool in the absolute coordinates system 51 obtained prior to receiving the present actuating signals" are calculated [ST16].

$$\alpha_{t-0} = \text{Cos}^{-1}(a_{xt-o}/\text{Sin}(\beta_{t-0})) \quad (12a)$$

$$\beta_{t-0} = \text{Cos}^{-1}(a_{yt-o}) \quad (12b)$$

$$\tau_{t-0} = \text{Sin}^{-1}(o_{zt-o}/\text{Sin}(\beta_{t-0})) \quad (12c)$$

Since "the relative position of the tip point 57 of the tool against the referential point 56 of the workpiece obtained prior to the beginning of the manual teaching operations" should be maintained, "the relative position of the tip point 57 of the tool against the referential point 56 of the workpiece obtained prior to receiving the present actuating signals" is calculated. Assuming that the homogeneous transformation matrix expressing "the relative position and the relative attitude of the tip point 57 of the tool against the referential point 56 of the workpiece obtained prior to receiving the present actuating signals" is "$wX_t$", the homogeneous transformation matrix, world $X_{t-0}$, expressing "the position and the attitude of the tip point 57 of the tool in the absolute coordinates system 51 obtained prior to receiving the present actuating signals" is formulated as a following equation (13), which is comprehensible according to FIG. 6.

$$\text{world } X_{t-o} = \text{world } X_{w-o} \cdot wX_t \quad (13)$$

Therefore, the homogeneous transformation matrix of $wX_t$ is calculated by the eq. (14), into which eq. (5) and eq. (12) are substituted (ST17).

$$wX_t = (\text{world } X_{w-o})^{-1} \cdot \text{world } X_{t-o} = \begin{bmatrix} n_{xw}x_t & o_{xw}x_t & a_{xw}x_t & p_{xw}x_t \\ n_{yw}x_t & o_{yw}x_t & a_{yw}x_t & p_{yw}x_t \\ n_{zw}x_t & o_{zw}x_t & a_{zw}x_t & p_{zw}x_t \\ 0 & 0 & 0 & 1 \end{bmatrix} \quad (14)$$

The $wX_t$ formulated by the eq. (14) is the homogeneous transformation matrix expressing "the relative position and the relative attitude of the tip point 57 of the tool against the referential point 56 of the workpiece obtained prior to receiving the present actuating signals". Since it is required for the manipulation of "the position of the tip point 57 of the tool" enough to coordinate with the change of "the position of the referential point 56 of the workpiece", the data, $X_{wX_t}$, $Y_{wX_t}$, $Z_{wX_t}$, of "the relative position of the tip point 57 of the tool against the referential point 56 of the workpiece obtained prior to receiving the present actuating signals" should be calculated. They are expressed as follows by using each factor of the fourth column in the eq. (14).

$$X_{wX_t} = p_{xw}x_t, \; Y_{wX_t} = p_{yw}x_t, \; Z_{wX_t} = p_{zw}x_t \quad (14a)$$

The homogeneous transformation matrix, $wT_t$, expressing "the relative position of the tip point 57 of the tool against the referential point 56 of the workpiece obtained prior to receiving the present actuating signals" is calculated by the following equation introduced from eq. (14a) (ST18).

$$wT_t = \text{Trans}(X_w x_t, Y_w x_t, Z_w x_t) = \begin{bmatrix} 1 & 0 & 0 & X_w x_t \\ 0 & 1 & 0 & Y_w x_t \\ 0 & 0 & 1 & Z_w x_t \\ 0 & 0 & 0 & 1 \end{bmatrix} \quad (14b)$$

(a-4); When a preset infinitesimal time interval $\Delta T$, e.g., one-twentieth of a second, elapses since "the present actuating signals" were generated (ST19), "i" is set to "0" (ST18), i.e., the time $\Delta t_{-i}$ is set to "0" (ST20). Such a one-twentieth of a second is selected long enough to execute not only the control of the first step processor 4A$a$, i.e., computing at the step 10 and controlling from the step 11 to the step 18, but the control from the second step processor 4A$b$ until the fourth step processor 4A$d$ (see the $\Delta T$ in FIG. 15 explained later).

(b): The control of the second step processor 4A$b$ is executed in response to the completion of the first step as follows;

Whether pushing the keys 12$b$, 12$c$ and 12E are continued for the preset time interval $\Delta T$ is discriminated (ST21). When "the present actuating signals" have been maintained, a preset infinitesimal time interval $\Delta T$, e.g., one-twentieth of a second, is added to the time $\Delta t_{-i}$ (ST22), and the execution at the third step processor 4A$c$ is controlled after the time $\Delta t_{-i}$ is replaced to $\Delta t_{-i+1}$ (ST23).

When all of "actuating signals" generated by the keys 12$b$, 12$c$ and 12E have already vanished in the middle of the preset time interval (ST24), the termination of the co-acting mode of the manual operation is controlled in response to the absence of the actuating signals (ST25). When some of the keys have been released or changed to different ones in the middle of the preset time interval, i.e., when the keys 12$a$ and 12E have been pushed instead of the keys 12$b$, 12$c$ and 12E (ST24), the repetition from the step 1 is controlled in response to "new actuating signals". The controls in response to the change or the absence of "the actuating signals" will be described later in detail.

(c): The control of the third step processor 4A$c$ is executed in response to the completion of the second step as follows;

The data, $X_{w-i}$, $Y_{w-i}$, $Z_{w-i}$, of "the position of the referential point 56 of the workpiece in the absolute coordinates system 51 after the time $\Delta t_{-i}$, i.e., after $\Delta T \times i$", and the data, $\alpha_{w-i}$, $\beta_{w-i}$, $\tau_{w-i}$, of "the attitude" of the referential point 56 of the workpiece in the absolute coordinates system 51 after the time $\Delta t_{-i}$ are calculated by the equation (15) (ST24 in FIG. 12).

$$X_{w-i} = X_{w-o} + Vx_w \times \Delta t_{-i}$$

$$Y_{w-i} = Y_{w-o} + Vy_w \times \Delta t_{-i}$$

$$Z_{w-i} = Z_{w-o} + Vz_w \times \Delta t_{-i}$$

$$\alpha_{w-i} = \alpha_{w-o} + V\alpha_w \times \Delta t_{-i}$$

$$\beta_{w-i} = \beta_{w-o} + V\beta_w \times \Delta t_{-i}$$

$$\tau_{w-i} = \tau_{w-o} + V\tau_w \times \Delta t_{-i} \quad (15)$$

The datum $X_{w-i}$ after the time $\Delta t_{-i}$ is calculated by means of adding the product of the velocity component $Vx_w$ of the equation (1) and the time $\Delta t_{-i}$ to the datum $X_{w-o}$ expressing "the position of the referential point 56 of the workpiece in the absolute coordinates system 51 obtained prior to receiving the present actuating signals". The data of $Y_{w-i}$ to $\tau_{w-i}$ are similarly calculated.

The homogeneous transformation matrix "world $X_{w-i}$" expressing "the position and the attitude of the referential point 56 of the workpiece in the absolute coordinates system 51 after the time $\Delta t_{-i}$" is calculated by the equation (16) (ST27).

$$\text{world } X_{w-i} = \text{Trans}(X_{w-i}, Y_{w-i}, Z_{w-i}) \cdot Rot(X, \alpha_{w-i}) \cdot Rot(Y, \beta_{w-i}) \cdot Rot(Z, \tau_{w-i}) \quad (16)$$

This equation (16) is formulated as a following equation (17), similarly to the equation (4) above mentioned.

$$\text{world } X_{w-i} = Z_w \cdot W_{2-i} \cdot E_w \quad (17)$$

The homogeneous transformation matrix, $W_{2-i}$, expressing "the position and the attitude of the holding point 53 of the workpiece against the base point 52 of the workpiece handling robot 1 after the time $\Delta t_{-i}$" is associate by the eq. (18), and is calculated by the eq. (18), into which the eq. (16) is substituted (ST28).

$$W_{2-i} = (Z_w)^{-1} \cdot \text{world } X_{w-i} \cdot (E_w)^{-1} \quad (18)$$

When the referential point 56 of the workpiece is manipulated according to equation (16), the manipulation of "the position of the tip point 57 of tool in the absolute coordinates system 51" coordinating with the manipulation of "the position and the attitude of the referential point 56 of the workpiece" is required without changing "the attitude of the tip point 57 of the tool". Therefore, the homogeneous transformation matrix $T_{2-i}$ expressing "the position and the attitude of the installation point 55 of the tool against the base point 54 of the tool handling robot 2 after the time $\Delta t_{31\ i}$" is calculated so that "the relative position of the tip point 57 of the tool against the referential point 56 of the workpiece" may be maintained.

"The position of the tip point 57 of the tool in the absolute coordinates system 51" coordinating with the manipulation of the referential point 56 of the workpiece is calculated by the following equation, into which the homogeneous transformation matrix $wT_t$ expressing "the relative position of the tip point 57 of the tool against the referential point 56 of the workpiece obtained prior to the beginning of the manual teaching operations", which was computed by the eq. (14b) of the step 18, and the equation (16) are substituted.

$$\text{world } X_{t-i} = \text{world } W_{w-i} \cdot wT_t = \begin{bmatrix} n_{xt-i} & o_{xt-i} & a_{xt-i} & p_{xt-i} \\ n_{yt-i} & o_{yt-i} & a_{yt-i} & p_{yt-i} \\ n_{zt-i} & o_{zt-i} & a_{zt-i} & p_{zt-i} \\ 0 & 0 & 0 & 1 \end{bmatrix} \quad (19)$$

"The position of the tip point 57 of the tool in the absolute coordinates system 51" is formulated as following equations by using each factor of the fourth column in the eq. (19).

$$X_{t-i} = p_{xt-i}, \; Y_{t-i} = p_{yt-i}, \; Z_{t-i} = p_{zt-i} \quad (19a)$$

The homogeneous transformation matrix, world $X_{t-i}$, expressing "the position and the attitude of the tip point 57 of the tool in the absolute coordinates system 51 after the time $\Delta t_{-i}$" coordinating with the manipulation of the referential point 56 of the workpiece controlled by the equation (16) is calculated by the following equation, into which the above mentioned equation (19a) and the data, $\alpha_{t-0}$, $\beta_{t-0}$, $\tau_{t-0}$, of "the attitude of the tip point 57 of the tool in the absolute coordinates system 51 obtained prior to the beginning of the manual teaching operations" computed by the equations (12a) to (12c) are substituted.

$$\text{world } X_{t-i} = \text{Trans}(X_{t-i}, Y_{t-i}, Z_{t-i}) \cdot Rot(Z, \alpha_{t-0}) \cdot Rot(Y, \beta_{t-0}) \cdot Rot(Z, \tau_{t-0}) \quad (20)$$

The equation (20) is formulated as a following equation (21), similarly to the equation (12).

$$\text{world } X_{t-i} = Z_t \cdot T_{2-i} \cdot E_t \quad (21)$$

The homogeneous transformation matrix, $T_{2-i}$, expressing "the position and the attitude of the installation point 55 of the tool against the base point 54 of the tool handling robot 2 after the time $\Delta t_{-i}$" is associated as a following equation (22) by transforming the equation (21).

$$T_{2-i} = (Z_t)^{-1} \cdot \text{world } X_{t-i} \cdot (E_t)^{-1} \quad (22)$$

Under the condition that "the relative position of the tip point 57 of the tool against the referential point 56 of the workpiece" is not changed when the referential point 56 of the workpiece is manipulated according to equation (16), the homogeneous transformation matrix, $T_{2-i}$, expressing "the position and the attitude of the installation point 55 of the tool against the base point 54 of the tool handling robot 2 after the time $\Delta t_{-i}$" is calculated by the equation (22), into which the eq. (20) is substituted (ST29).

(d): The control of the fourth step processor 4Adis executed as (d-1) to (d-4) as below;

(d-1); "The joint variables, $\theta_{1-i}, \theta_{2-i}, \ldots, \theta_{6-i}$, of the tool handling robot 2 after the time $\Delta t_{-i}$" are calculated by inversely transforming the homogeneous transformation matrix, $T_{2-i}$, expressing "the position and the attitude of the installation point 55 of the tool against the base point 54 of the tool handling robot 2 after the time $\Delta t_{-i}$" calculated by the equation (22)(ST30).

(d-2); "The joint variables, $\phi_{1-i}, \phi_{2-i}, \ldots, \phi_{6-i}$, of the workpiece handling robot 1 after the time $\Delta t_{-i}$" are calculated by inversely transforming the homogeneous transformation matrix, $W_{2-i}$, expressing "the position and the attitude of the holding point 53 of the workpiece against the base point 52 of the workpiece handling robot 1 after the time $\Delta t_{-i}$" calculated by the equation (18) (ST31).

"The joint variables, $\theta_{1-i}, \theta_{2-i}, \theta_{2-i}, \theta_{2-i}, \theta_{6-i}$, of the workpiece handling robot 1 after the time $\Delta t_{-i}$" are calculated by inversely transforming the homogeneous transformation matrix, $W_{2-i}$, expressing "the position and the attitude of the holding point 53 of the workpiece against the base point 52 of the workpiece handling robot 1 after the time $\Delta t_{-i}$" calculated by the equation (18) (ST31).

"The joint variables, $\theta_{1-i}$, $\theta_{2-i}$, $\theta_{2-i}$, $\theta_{2-i}$, $\theta_{6-i}$ of the workpiece handling robot 1 after the time $\Delta t_{-}$" are temporarily stored in the read-write memory 19bw.

(e): The control of the fifth step processor 4Ae is executed in response to the completion of the fourth step as follows;

The unity of "each actuating values for actuators" of the tool handling robot 2 and the unity of "each actuating values for actuators" of the workpiece handling robot 1 have, respectively, been stored in the control equipment 4 as $R_{t1}$, $R_{t2}$, ..., $R_{t6}$, $R_{w1}$, $R_{w2}$, ..., $R_{w6}$.

"The actuating values, $a_{t1-i}$, $a_{t2-i}$, $a_{t3-i}$, $a_{t4-i}$, $a_{t5-i}$, $a_{t6-i}$, for the actuaters $17T_1$, $17T_2$, ..., $17T_6$ of the tool handling robot 2" are calculated by the following equation (101) in response to "the joint variables, $\theta_{1-i}$, $\theta_{2-i}$, $\theta_{3-i}$, $\theta_{4-i}$, $\theta_{5-i}$, $\theta_{6-i}$, of the tool handling robot 2 after the time $\Delta t_{-i}$" calculated in the step 30 [ST32]. similarly, "the actuating values, $a_{w1-i}$, $a_{w2-i}$, $a_{w3-i}$, $a_{w4-i}$, $a_{w5-i}$, $a_{w6-i}$, for the actuaters $17W_1$, $17W_2$, ..., $17W_6$ of the workpiece handling robot 1" are calculated by the following equation (102) in response to "the joint variables, $\phi_{1-i}$, $\phi_{2-i}$, $\phi_{3-i}$, $\phi_{4-i}$, $\phi_{5-i}$, $\phi_{6-i}$, of the workpiece handling robot 1 after the time $\Delta t_{-1}$" calculated in the step 31 (step 32).

$$a_{t1-i} = \theta_{1-i}/R_{t1}$$
$$a_{t2-i} = \theta_{2-i}/R_{t2}$$
$$a_{t3-i} = \theta_{3-i}/R_{t3}$$
$$a_{t4-i} = \theta_{4-i}/R_{t4}$$
$$a_{t5-i} = \theta_{5-i}/R_{t5}$$
$$a_{t6-i} = \theta_{6-i}/R_{t6} \quad (101)$$
$$a_{w1-i} = \theta_{1-i}/R_{w1}$$
$$a_{w2-i} = \theta_{2-i}/R_{w2}$$
$$a_{w3-i} = \theta_{3-i}/R_{w3}$$
$$a_{w4-i} = \theta_{4-i}/R_{w4}$$
$$a_{w5-i} = \theta_{5-i}/R_{w5}$$
$$a_{w6-i} = \theta_{6-i}/R_{w6} \quad (102)$$

And in response, simultaneously, the control signals, $a_{t1-i}$, $a_{t2-i}$, $a_{t3-i}$, $a_{t4-i}$, $a_{t5-i}$, $a_{t6-i}$, are supplied to the surbo-driver 15T, see FIG. 1, for the tool handling robot 2 and the control signals, $a_{w1-i}$, $a_{w2-i}$, $a_{w3-i}$, $a_{w4-i}$, $a_{w5-i}$, $a_{w6-i}$, are supplied to the surbo-driver 15W for the workpiece handling robot 1 just after the time $\Delta T \times i$ since the control of the step 23 (ST33, ST34). Thereafter, the control is returned to the step 21 for executing the control of the second step and succeeding steps thereto.

After the step 34, the change of "the position and the attitude of the tool 2n" manipulated by the tool handling robot 2 are executed by the actuators $17T_1$, $17T_2$, ..., $17T_6$, see FIG. 7, of the tool handling 2. And the change of "the position and the attitude of the workpiece 1m" manipulated by the workpiece handling robot 1 are executed by the actuators $17W_1$, $17W_2$, ..., $17W_6$ of the workpiece handling robot 1.

The above mentioned control is to manipulate "the position and the attitude" at the state of FIG. 13(a) to "the position and the attitude" at the state of FIG. 13(b). In FIG. 13(b), "the position and the attitude of the workpiece 1m" have been manipulated so that the inclination of the tangent $B_{2s}$ of "the following aimed point" $B_2$ regulated on the workpiece 1m comes to "a desired inclination $\delta_w$ against the ground 64" without changing "the attitude of the tip point 57 of the tool against the ground 64" at "the aimed point" $B_1$ and "the relative position of the tip point 57 of the tool against the referential point 56 of the workpiece 1m".

Incidentally, after releasing all of the keys, the inclination of the tangent $B_{2s}$ of "the following aimed point" $B_2$ regulated on the workpiece 1m is checked by a gauge for measurement of the angle set on "the aimed point" $B_2$ whether it is "the desired inclination $\delta_w$ against the ground 64" or not. Unless the inclination of the tangent $B_{2s}$ is equal to "the desired inclination $\delta_w$ against the ground 64", the control of "the co-acting mode of the manual operation" will be again executed, thereafter, the check of the inclination of the tangent $B_{2s}$ will be repeated.

Thereafter, as shown in FIG. 13(c), the tool 2n positioned at "the first teaching point" $A_1$ is moved to "the following aimed point" $B_2$ regulated on the workpiece 1m by the manipulation of "the sole-acting mode of the manual operation" of the tool handling robot 2 without changing "the attitude of the tip point 57 of the tool against the ground 64". When such states of the workpiece 1m and the tool 2n are required to memorize as "the second teaching point" $A_2$, "the point $A_2$ is, individually, taught by pushing the teaching switch 13. The control of "the sole-acting mode of the manual operation" of the tool handling robot 2 will be described later.

Succeedingly, not only the control of "the co-acting mode of the manual operation" are operable. "The third teaching point" $A_3$ will be taught by the repetition of the control from the teaching procedure of "the first teaching point" $A_2$. "The attitude of the tool 2n against the ground 64" is, then, maintained at third teaching point" $A_3$.

As described in FIG. 13(a), the state of the workpiece 1m and the tool 2n obtained prior to the control of "the co-acting mode of the manual operation" is established by the manipulation of "the sole-acting mode of the manual operation" of the the workpiece handling robot 1 and by the manipulation of "the sole-acting mode of the manual operation" of the tool handling robot 2, respectively. The establishment of the state of FIG. 13(a) by the control of "the co-acting mode of the manual operation" will be also comprehensible from the above mentioned description.

According to the present invention related to the control of "the co-acting mode of the manual operation", the manipulation of "the position and the attitude of the workpiece 1m" by the workpiece handling robot and the maintenance of "the attitude of the tip point 57 of the tool against the ground 64" and "the relative position of the tip point 57 of the tool against the referential point 56 of the workpiece" by the tool handling robot 2 are simultaneously and independently executed after the preset time interval $\Delta T$. The manipulation of "the position and the attitude of the workpiece 1m" and the manipulation of "the position and the attitude of the tool 2n" are, therefore, performed rapidly.

As the manipulation of "the position and the attitude of the tool 2n" are not subjected to the manipulation of "the position an the attitude of the workpiece 1n", the calculation for manipulating "the position and the attitude of the tool 2n" is not reflected by the calculative errors occurred in the calculation for manipulating "the position and the attitude of the workpiece 1m", therefore, the calculation to manipulate "the position and the attitude of the tool 2n" remarkably becomes accurate.

According to the control of "the co-acting mode of the manual operation" of both the robots, the tool $2n$ need not to retire from the workpiece $1m$ during the manual teaching operations, therefore, an operator never loses sight of "the previous teaching point" or "the previous aimed point" while "the following teaching point" is taught, the teaching procedures are simplified. And during the control of "the co-acting mode of the manual operation", "the attitude of the tip point 57 of the tool against the ground 64" and "the relative position of the tip point 57 of the tool against the referential point of the workpiece $1m$" are maintained constant. In the welding robotic system using the welding torch, an undesired downflow and undesired stagnation of the welding pond according to gravity are avoided, therefore, the quality of the welded products is remarkably improved.

If pushing the keys 12$b$, 12$c$ and 12E is maintained when the control is returned from the step 34 to the step 21, the control from the step 22 until the step 34 is repeated in response to "the same actuating signals". When the signals are maintained for i×ΔT, the execution of i-times is repeated in response to "the succeeding actuating signals". "The previous joint variables, $\theta_{1-(i-1)}$, $\theta_{2-(i-1)}$, $\theta_{3-(i-1)}$, $\theta_{4-(i-1)}$, $\theta_{5-(i-1)}$, $\theta_{6-(i-1)}$, of the tool handling robot" stored in the read-write memory 19$bt$ are replaced to "the new joint variables, $\theta_{1-i}$, $\theta_{2-i}$, $\theta_{3-i}$, $\theta_{4-i}$, $\theta_{5-i}$, $\theta_{6-i}$, thereof. Similarly, "The previous joint variables, $\phi_{1-(i-1)}$, $\phi_{2-(i-1)}$, $\phi_{3-(i-1)}$, $\phi_{4-(i-1)}$, $\phi_{5-(i-1)}$, $\phi_{6-(i-1)}$, of the workpiece handling robot" stored in the read-write memory 19$bw$ are replaced to "the new joint variables, $\phi_{1-i}$, $\phi_{2-i}$, $\phi_{3-i}$, $\phi_{4-i}$, $\phi_{5-i}$, $\phi_{6-i}$, thereof.

If "the new actuating signals" are generated when the control is returned to the step 21 after the repetition of (i+1)-times, i.e., if the keys 12$a$ and 12E are pushed instead of the keys 12$b$, 12$c$ and 12E (ST24), the control is returned to the step 1. And the velocity components of the linear motion of the referential point 56 of the workpiece along each axis of the absolute coordinates system 51, and the velocity components of the revolutionary motion thereof around each axis of the absolute coordinates system 51 are calculated in response to "the new actuating signals" as the section of (a-1) described before.

The calculation of "the position and the attitude of the referential point 56 of the workpiece in the absolute coordinates system 51 obtained prior to the beginning of the manual teaching operations" at the section of (a-2) described before means the calculation of "the position and the attitude of the referential point 56 of the workpiece in the absolute coordinates system 51 obtained prior to receiving "the new actuating signals". Therefore, the step 12 and succeeding steps thereto are executed in response to "the joint variables of the workpiece handling robot" stored in the read-write memory 19$bw$ by the calculation using "the actuating signals" of i-times.

Similarly, the calculation of "the attitude of the tip point 57 of the tool in the absolute coordinates system 51 obtained prior to the beginning of the manual teaching operations" and the calculation of "the relative position of the tip point 57 of the tool against the referential point 56 of the workpiece obtained prior to the beginning of the manual teaching operations" mean the calculation of "the attitude of the tip point 57 of the tool in the absolute coordinates system 51 obtained prior to receiving the new actuating signals" and the calculation of "the relative position of the tip point 57 of the tool against the referential point 56 of the workpiece obtained prior to receiving the new actuating signals", respectively. Therefore, the step 15 and succeeding steps thereto are executed in response to "the joint variables of the tool handling robot" stored in the read-write memory 19$bt$ by the calculation using "the actuating signals" of i-times.

If "the actuating signals" are absent when the control is returned to the step 21 at the (i+n)-times, i.e., if the keys 12$a$ and 12E are released (ST24), the termination signal is transformed to the commander 4$f$ for terminating control (ST25).

At this time, the control of "the co-acting mode of the manual operation" is terminated.

The above mentioned manipulation was subjected to the control of the control means 4A executing in accordance with the algorithm for "the co-acting mode of the manual operation". Referring to FIG. 14($a$), the example of an actual manual teaching operations are expounded as follows:

The workpiece $1m$ shown by a solid line is manipulated to the figure shown by a single dotted chain line via ones shown by a broken line. Then, the tip point 57 of the tool is at "the aimed point" $B_1$ regulated on the workpiece $1m$ shown by a single dotted chain line after "the attitude of the workpiece $1m$" was manipulated so that the inclination of the tangent $B_{2s}$ at "the following aimed point" $B_2$ regulated on the workpiece $1m$ shown by a single dotted chain line came to "the desired inclination $\delta_w$ of the tangent $B_{1s}$ at "the initial aimed point" $B_1$ regulated on the workpiece $1m$, shown by a solid line, against the ground 64". This means that "the relative position of the tool $2n$ against the workpiece $1m$" were maintained.

The attitude of the tool $2n$ positioned at "the aimed point" $B_1$ regulated on the workpiece $1m$ shown by a single dotted chain line is the same as the attitude of the tool $2n$ at "the aimed point" $B_1$ regulated on the workpiece $1m$ shown by a solid line, i.e., as the attitude of the tool $2n$ at "the first teaching point" $A_1$. This means to maintain "the attitude of the tool $2n$ against the ground 64". The manipulation of the workpiece $1m$ in the direction of an arrow 21 is simultaneously executed with the manipulation of the tool $2n$ in the direction of an arrow 22, which means the execution controlling "the co-acting mode of the manual operation".

The attitude of the tool $2n$ is maintained with the tip point 57 of the tool is manipulated from "the aimed point" $B_1$ regulated on the workpiece $1m$ shown by a single dotted chain line to "the following aimed point" $B_2$ as an arrow 23, of which manipulation is executed by the control of "the sole-acting mode of the manual operation" of the tool handling robot 2. "The second teaching point" $A_2$ is taught under the state that the tip point 57 of the tool positions at "the following aimed point" $B_2$.

An operator may continue to push the keys if the path between "the aimed point" $B_1$ regulated on the workpiece $1m$ shown by the solid line and "the aimed point" $B_1$ regulated on the workpiece $1m$ shown by the single dotted chain line is simple. Such an execution is returned to the step 21 and succeeding steps thereto for every preset infinitesimal time interval ΔT. The workpiece $1m$ and the tool $2n$ are, respectively, manipulated for every time the control signals of "the actuating values of the workpiece handling robot 1" and the control signals of "the actuating values of the tool handling robot 2" are supplied to the surbo-motors.

The procedure is repeated until ΔT×i for every ΔT as shown in FIG. 15 of a timing chart, i.e., the execution from the control of the second step processor 4A$b$ until that of the fifth one 4A$e$ is repeated for every ΔT. At the step 24, if the absence of "the actuating signals" is detected, the manipulation of the workpiece $1m$ is required no longer, and the control of "the co-acting mode of the manual operation" is terminated at the point EE of the timing chart. Thereafter, either the control of "the co-acting mode of the manual operation" will be again repeated or the control of "the sole-acting mode of the manual operation" will be executed from the step 2 as described after.

Figure 14A:
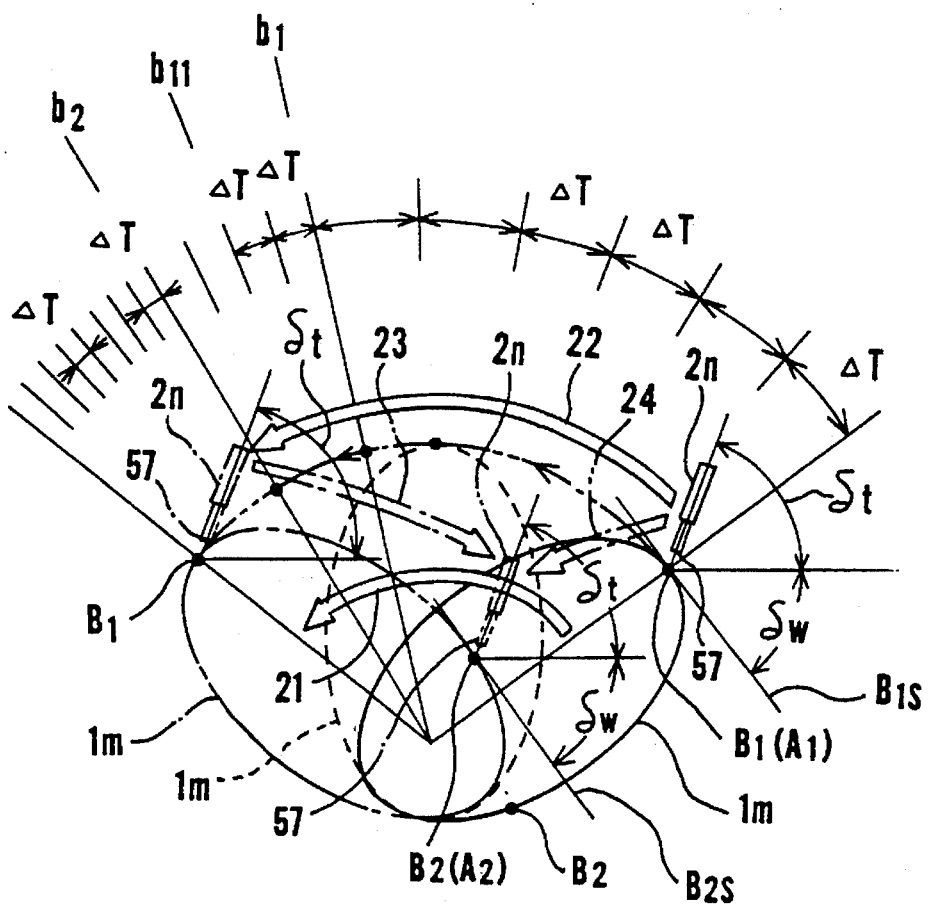
FIGS. 14(a), 14(b) and 14(c)

The rate changing switch 10 is often changed when "the aimed point" $B_1$ is required to move along a long path. In such a case, the temporary point $b_1$ and $b_2$ are provided in the middle of the path as shown in FIG. 14(a). The rate of 1.0 is designated on the path between "the previous aimed point" $B_1$ and the temporary point $b_1$, the rate of 0.5 on the path between the point $b_1$ and the point $b_2$, and the rate of 0.1 on the path between the point $b_2$ and "the aimed point" $B_1$. If a higher speed is selected on the path between "the previous aimed point" $B_1$ and the temporary point $b_1$, it takes a short time for the manipulation of the workpiece $1m$ and/or the tool $2n$. If a lower speed is selected on the path between the temporary point $b_2$ and "the new aimed point" $B_1$, the workpiece $1m$ and/or the tool $2n$ accurately stop at the point $B_1$, and the tension of an operator is relieved.

The termination point EE in FIG. 15 corresponds to the point $b_1$, the point $b_2$ and/or "a new aimed point" $B_1$. The joint variables of the workpiece handling robot 1 obtained at "the aimed point" $B_1$ are changed for every $\Delta T$ by reaching the point $b_1$. Also, while moving from the point $b_1$ until the point $b_2$, the joint variables are replaced for every $\Delta T$ in the read-write memory $19bw$. The joint variables are not recorded as long as the teaching switch 13 is not pushed.

The $\Delta T$ between the point $b_1$ and the point $b_2$ is drawn smaller than that between "the previous aimed point" $B_1$ and the point $b_1$ in FIG. 14(a), which means the lower speed on the path between the point $b_1$ and the point $b_2$ gave a short distance for one-twentieth of a second. On the other hand, though a constant speed is selected on the path between the point $b_1$ and point $b_2$, the distance for every $\Delta T$ is not same with each other. This means that the keys $12a$ and $12E$ were pushed instead of the key $12b$, $12c$ and $12E$ at the point $b_{11}$ achieved prior to the return from the control of the fifth processor $4Ae$ to the control of the second step processor $4Ab$.

Figure 16:
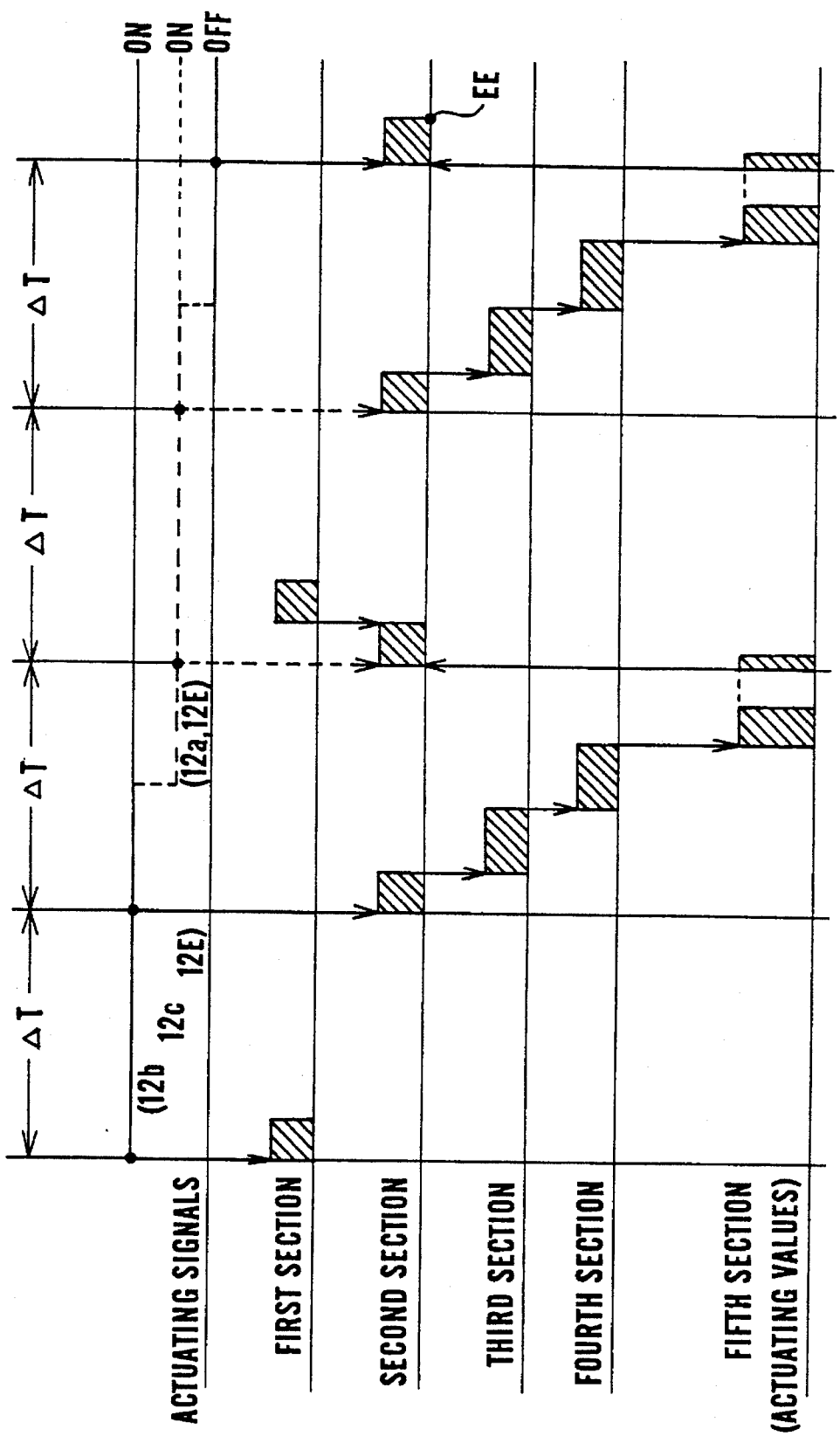
FIG. 16 is a timing chart shows the control of each step processor under "the co-acting mode of the manual operation" at the detection of the change of "the actuating signals" before released.

This case occurs when "the actuating signals" were changed as a broken line shown in FIG. 16 of another timing chart. The repetition from the step 24 to the step 1 is executed as long as "the actuating signals" are not absent, and the control from the step 1 until the step 34 are executed in response to "the new actuating signals". The distance achieved for $\Delta T$ by pushing the keys $12b$, $12c$ and $12E$ is easily comprehensible different from the distance achieved for $\Delta T$ by pushing the keys $12a$ and $12E$.

Figure 14B:
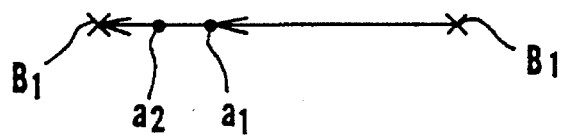

Incidentally, the temporary point $a_1$ and $a_2$ in the middle of the path, where "the aimed point" $B_1$ persues, are available at the control of "the sole-acting mode of the manual operation" as shown in FIG. 14(b). This explanation should be described at the section of "the sole-acting mode of the manual operation". It is, however, easily comprehensible in comparison with "the co-acting mode of the manual operation". The explanation thereof is described below. In such a case, the "rate" of 1.0, 0.5, 0.2 or 0.1 is available to the control of each path. The higher rate enables a rapid teaching, and the lower rate enables to relieve the tension of the operator at the stop point.

Under the control of "the sole-acting mode of the manual operation", the tool $2n$ is stationary while "the position and the attitude of the workpiece $1m$" are manipulated, and the workpiece $1m$ is stationary while "the position and the attitude of the tool $2n$" are manipulated. The tool $2n$ often encounters a protrusion formed on the workpiece $1m$ when the tool $2n$ is manipulated from "an aimed point" $B_1$ to "a following aimed point" $B_2$.

Figure 14C:
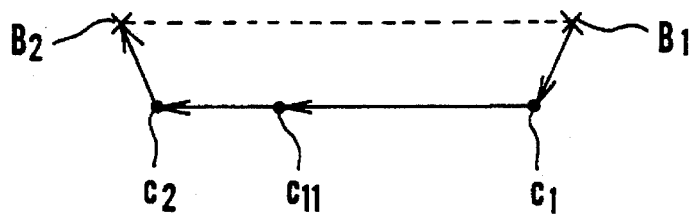

In order to avoid the protrusion, the path including the temporary point $c_1$ and $c_2$ is selected instead of the straight path of the segment $B_1$ to $B_2$ shown by a broken line in FIG. 14(c). For example, "the each axis mode of the manual operation" is chosen on the path between the point $B_1$ and the point $c_1$, "the cartesian coordinates mode of the manual operation" is chosen on the path between the point $c_1$ and the point $c_2$ and "the each axis mode of the manual operation" is again chosen on the path between the point $c_2$ and the point $B_2$. The point $c_1$, the point $c_2$ and "the aimed point" $B_2$ are corresponds to the termination point at the control of "the sole-acting mode of the manual operation". The rate is changeable at the point $c_{11}$ which is provided in the middle of the path between the point $c_1$ and $c_2$.

The present invention relates to "the teaching control device for the manual operations", and does not relate to the playback operations of the robotic system after teaching operations, e.g., to the real processing operations of the welding work. But, the playback operations of the workpiece handling robot 1 and the tool handling robot 2 executed after the teaching according to the present invention is briefly described below.

FIG. 14(a) is an example of the control from the manipulation at "the first teaching point" $A_1$ until the manipulation at "the second teaching point" $A_2$. Under the teaching operations, the workpiece $1m$ was manipulated in the direction of the arrow 21, and the tool $2n$ was manipulated in the direction of the arrow 23 after being manipulated in the direction of the arrow 22. On the other hand, under the playback operations, the workpiece $1m$ is manipulated in the direction of the arrow 21, but the tool $2n$ is directly manipulated in the direction of the arrow 24, i.e., it is not manipulated via "the aimed point" $B_1$.

The manipulating speed of the workpiece $1m$ and the manipulating speed of the tool $2n$ are controlled under the playback operations, which are different from those under the teaching operations. Both the linear movement and the circular one may be selected for the manipulation from "the first teaching point" $A_1$ until "the second teaching point" $A_2$. When the linear movement is selected, the aimed point moved from "the first teaching point" $A_1$ to "the second teaching point" $A_2$ pursues a series of the complementary points which have obtained by the interpolating calculation. When the circular movement is selected, the aimed point pursues the complementary points which have obtained by equivalently dividing the circumference having a predetermined radius.

Figure 17C:
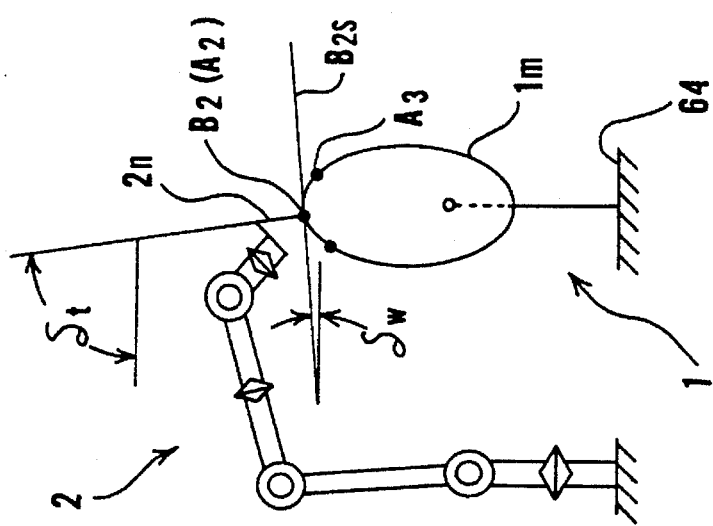
FIGS. 17(a), 17(b) and 17(c) are brief drawings of the manipulation by "the sole-acting mode of the manual operation" and/or "the co-acting mode of the manual operation " of the workpiece handling robot and/or the tool handling robot.
Figure 17B:
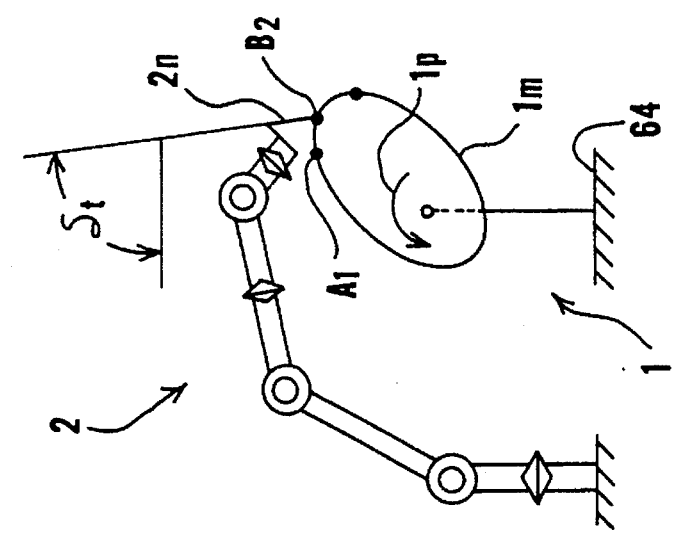
Figure 17A:
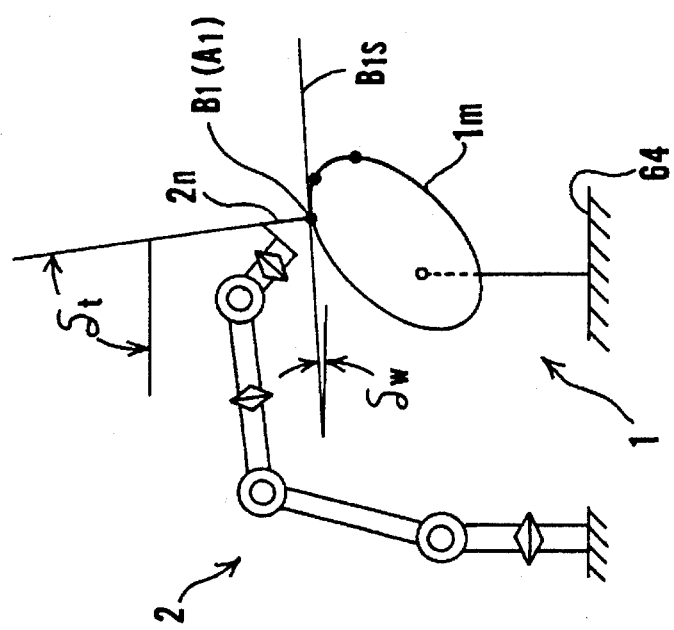

Referring to FIGS. 17(a), 17(b), and 17(c), the procedure which "the following aimed point" $B_2$ is taught as "the second teaching point" $A_2$ is described as follows, which is executed after "the aimed point" $B_1$ was taught as "the first teaching point" $A_1$ by manipulating "the position and the attitude of the workpiece $1m$" and by manipulating "the position and the attitude of the tool $2n$". This procedure is different from one in FIG. 13.

The control of FIGS. 17(a), 17(b) and 17(c) is briefly explained below. FIG. 17(a) is as same as FIG. 13(a). The manipulation from FIG. 17(a) until FIG. 17(b) is the manipulation of "the sole-acting mode of the manual operation" of the tool handling robot 2, which corresponds to the manipulation from FIG. 13(b) until FIG. 13(c). The manipulation from FIG. 17(b) until FIG. 17(c) is the manipulation of "the co-acting mode of the manual operation" of the workpiece handling robot 1 and the tool handling robot 2, which corresponds to the manipulation from FIG. 13(a) until FIG. 13(b).

The manipulation from FIG. 17(a) until FIG. 17(c) is described as follows.

"The sole-acting mode of the manual operation" is designated by the mode changing switch 9, and "the workpiece handling robot" is selected by the robot changing switch 7. Thereafter, "the actuating signals" for changing "the position and the attitude of the workpiece 1m" are generated by the group of the keys 12, thereby, "the attitude of the workpiece 1m" is manipulated so that the inclination of the tangent $B_{1s}$ of "the aimed point" $B_1$ regulated on the workpiece 1m comes to "the desired inclination $\delta_w$ against the ground 64" (see FIG. 17(a)).

"The tool handling robot" is selected by the robot changing switch 7, and "the actuating signals" for changing "the position and the attitude of the tool 2n" are generated by the group of the keys 12, thereby, "the attitude of the tool 2n against the ground 64" is achieved at "the aimed point" $B_1$ regulated on the welding line 61 of the workpiece 1m (see FIG. 17(a)). "The joint variables of the workpiece handling robot 1" realizing "the position and the attitude of the workpiece 1m" and "the joint variables of the tool handling robot 2" realizing "the position and the attitude of the tool 2n" are automatically stored in the read-write memory 19bw and 19bt, respectively. If necessary, the state of the workpiece 1m and the tool 2n at "the aimed point" $B_1$ are taught as "the teaching point $A_1$.

The position and the attitude of the workpiece 1m" and "the position and the attitude of the tool 2n" may be manipulated by the control of "the co-acting mode of the manual operation" of both the robots instead of the manipulation of "the position and the attitude of the workpiece 1m" by the control of "the sole-acting mode of the manual operation" and by the manipulation of "the position and the attitude of the tool 2n" by the control of "the sole-acting mode of the manual operation" when the state of the workpiece 1m and the tool 2n "the aimed point" $B_1$ is required, as described in the explanation of FIG. 13. Naturally, a compound control of "the sole-acting mode of the manual operation" and "the co-acting mode of the manual operation" may be adopted to get "the desired position and the desired attitude of the workpiece 1m" and "the desired position and the desired attitude of the tool 2n".

"The tool handling robot" is selected by the robot changing switch 7. "The actuating signals" are generated by the group of the keys 12 to change "the position and the attitude of the tool 2n" by the control of "the sole-acting mode of the manual operation", thereby, the tool 2n positioned at "the aimed point" $B_1$ is moved to "the following aimed point" $B_2$ regulated on the workpiece 1m without changing "the attitude of the tool 2n against the ground 64" at "the aimed point" $B_1$ (see FIG. 17(b)).

Thereafter, "the co-acting mode of the manual operation" is designated by the mode changing switch 9, and "the workpiece handling robot" is selected by the robot changing switch 7. "The actuating signals" for changing "the position and the attitude of the workpiece 1m" are generated by the group of the keys 12, thereby "the position and the attitude of the workpiece 1m" are manipulated so that the inclination of the tangent $B_{2s}$ of "the following aimed point" $B_2$ regulated on the workpiece 1m comes to "the desired inclination $\delta_w$ against the ground 64" without changing "the attitude of the tool 2n against the ground 64" at "the following aimed point" $B_2$ and "the relative position of the tool 2n against the workpiece 1m".

The control means 4A for controlling the co-acting mode of the manual operations controls the execution from the first step processor 4Aa until the fifth step processor 4Ae in response to "the co-acting mode signal", "the robot signal selecting the workpiece handling robot" and "the actuating signals", thereby, the state of the workpiece 1m moved as the arrow 1p and the tool 2n coordinated with the workpiece 1m are taught as "the second teaching point" $A_2$ (see FIG. 17(c)).

Whether "the inclination of the tangent $B_{2s}$ of "the following aimed point" $B_2$ regulated on the workpiece 1m is equal to "the desired inclination $\delta_w$ against the ground 64" is confirmed by a gauge for measurement of the angle set on "the aimed point" $B_2$ after an operator released all of the keys. Unless the inclination of the tangent $B_{2s}$ is "the desired inclination $\delta_w$ against the ground 64", the manipulation of "the co-acting mode of the manual operation" will again be executed, thereafter, the inclination of the tangent $B_{2s}$ will be rechecked by the guage.

In this example, the tip point 57 of the tool positions at "the aimed point" $B_2$ when the gauge is set on "the aimed point" $B_2$. Therefore, it is advantageous that the portion checked by the gauge is clear for the operator in comparison with the case of FIGS. 13(a), 13(b) and 13(c).

"The following teaching point" $A_3$ is taught by repeating the procedure from the manipulation at "the previous aimed point" $B_1$ until the manipulation at "the teaching point" $A_2$, thereby, "the attitude of the tool 2n against the ground 64" is also maintained at "the following teaching point" $A_3$.

Applying the present invention to the manual teaching operations maintaining "the attitude of the tool 2n against the ground 64" constant, "the position and the attitude of the workpiece 1m" are manipulated without changing "the attitude of the tool 2n against the ground 64". In addition, the control of the manual teaching operations is simply and rapidly performed without the interference of the workpiece 1m with the tool 2n as "the relative position of the tool 2n against the workpiece 1m" is maintained constant.

Incidentally, "the signals commanding for the linear motion of the referential point 56 of the workpiece along each axis of the cartesian coordinates" and "the signals commanding for the revolution of the referential point thereof around each axis of the cartesian coordinates" may be adopted for "the actuating signals" for changing "the position and the attitude of the workpiece 1m" under the control of "the co-acting mode of the manual operation". "The signals commanding for the rotation of each joint of the workpiece handling robot 1 may be adopted for "the actuating signals" instead of the signals for the linear motion and for the revolution above mentioned.

(2) The control of "the co-acting each axis mode of the manual operations" is expounded below, which is controlled in response to "the each axis mode signal" supplied by the movement changing switch 8 and "the co-acting mode signal" supplied by the mode changing switch 9.

This control is to manipulate "the position and the attitude of the referential point 56 of the workpiece" by rotating the joints of the workpiece handling robot 1 and the joints of the tool handling robot 2 so that "the attitude of the tool 2n" is maintained constant against the absolute coordinates system 51", and so that "the relative position of the tool 2n against the workpiece 1m" is maintained constant by coordinating with the manipulation of "the position and the attitude of the workpiece 1m".

The first state of the workpiece 1m and the tool 2n as shown in FIG. 13(a) and FIG. 17(a) is previously achieved before the present control, similarly to the above mentioned "co-acting cartesian coordinates mode of the manual operations".

"The co-acting mode of the manual operation" is designated by the mode changing switch 9, "the each axis mode of the manual operation" is chosen by the movement changing switch 8 and "the workpiece handling robot" is selected by the robot changing switch 7 of the teaching pendant 3.

Moreover, a desired rate, e.g. 0.5, which is indicated as "$r_c$", is designated by the rate changing switch 10.

Pushing the desired keys, e.g. 12b and 12D, the control means 4A executes the co-acting each axis mode of the manual operation until the keys are released is as follows;

(a): The control of the first step processor 4Aa is executed as (a-1) to (a-4) mentioned after.

The control equipment 4 receives the actuating signals generated by the keys 12b and 12D (ST1 in FIG. 9). As the mode changing switch 9 is "on" (ST2), the robot changing switch 7 is "on" (ST3) and the movement changing switch 8 is "off" (ST6 in FIG. 10), the procedure is led to the step 35 in FIG. 18 in response to "the co-acting mode signal", "the robot signal selecting the workpiece handling robot" and "the each axis mode signal". If the robot changing switch 7 is "off" (ST3), the undrawn CRT indicates the message of "the workpiece handling robot should be selected", and the termination of "the co-acting mode of the manual operation" is controlled in response to "the robot signal selecting the tool handling robot" (ST4, ST5).

Either a manipulator of 6 degrees of freedom type or a positioner of less than 3 degrees of freedom type may be applicable to the workpiece handling robot 1 manipulating under the control of "the each axis mode of the manual operation". A manipulator of 6 degrees of freedom type only is applied to the above mentioned "the cartesian coordinates mode of the manual operation". The actuating signals of S1 to S3 only are generated by the group of the keys 12 if the workpiece handling robot less than 3 degrees of freedom type is applied to "the each axis mode of the manual operation".

Figure 18:
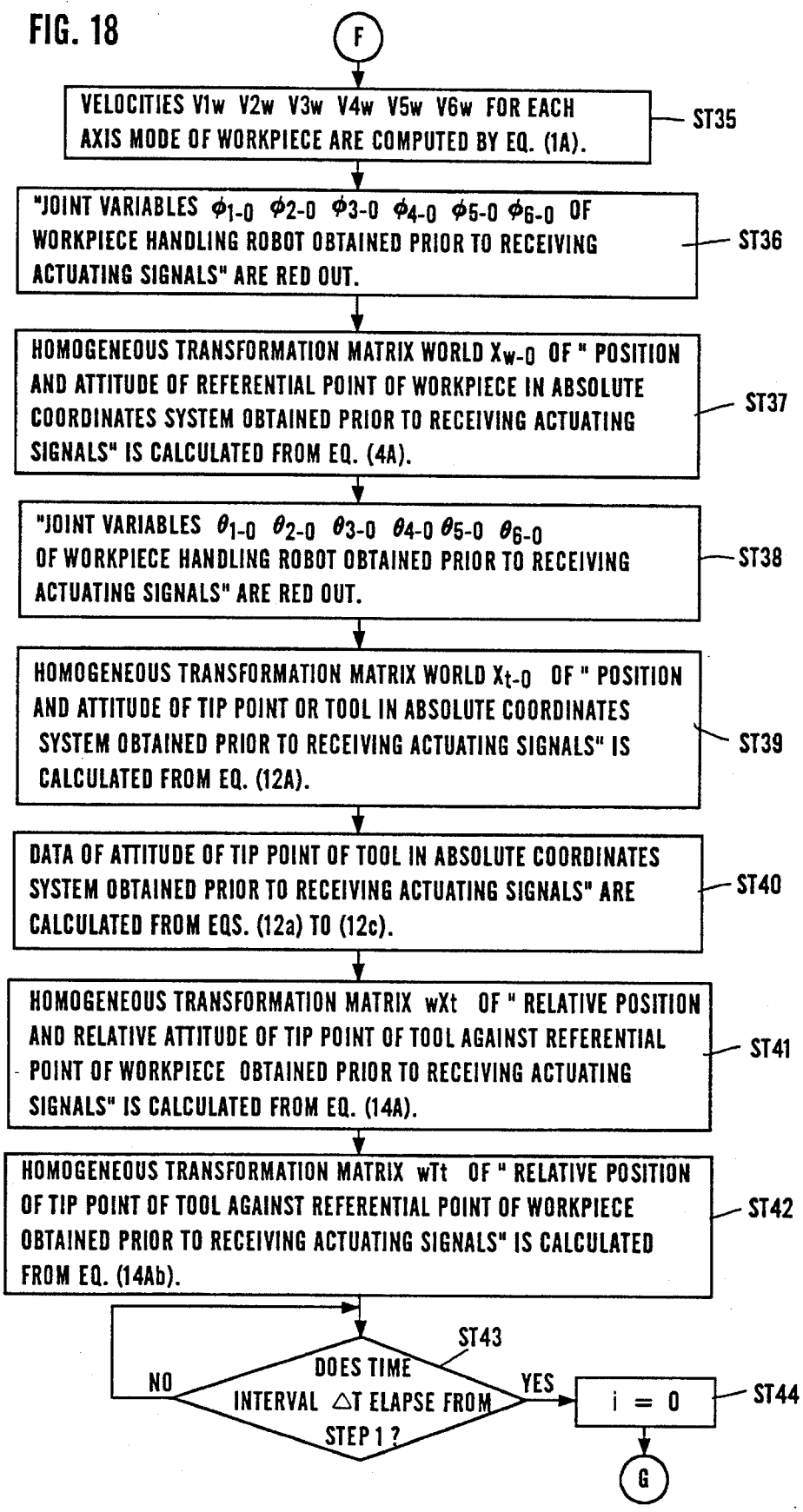
FIG. 18 is a flow chart of "the co-acting each axis mode of the manual operation" continued from F of FIG. 10.
Figure 19:
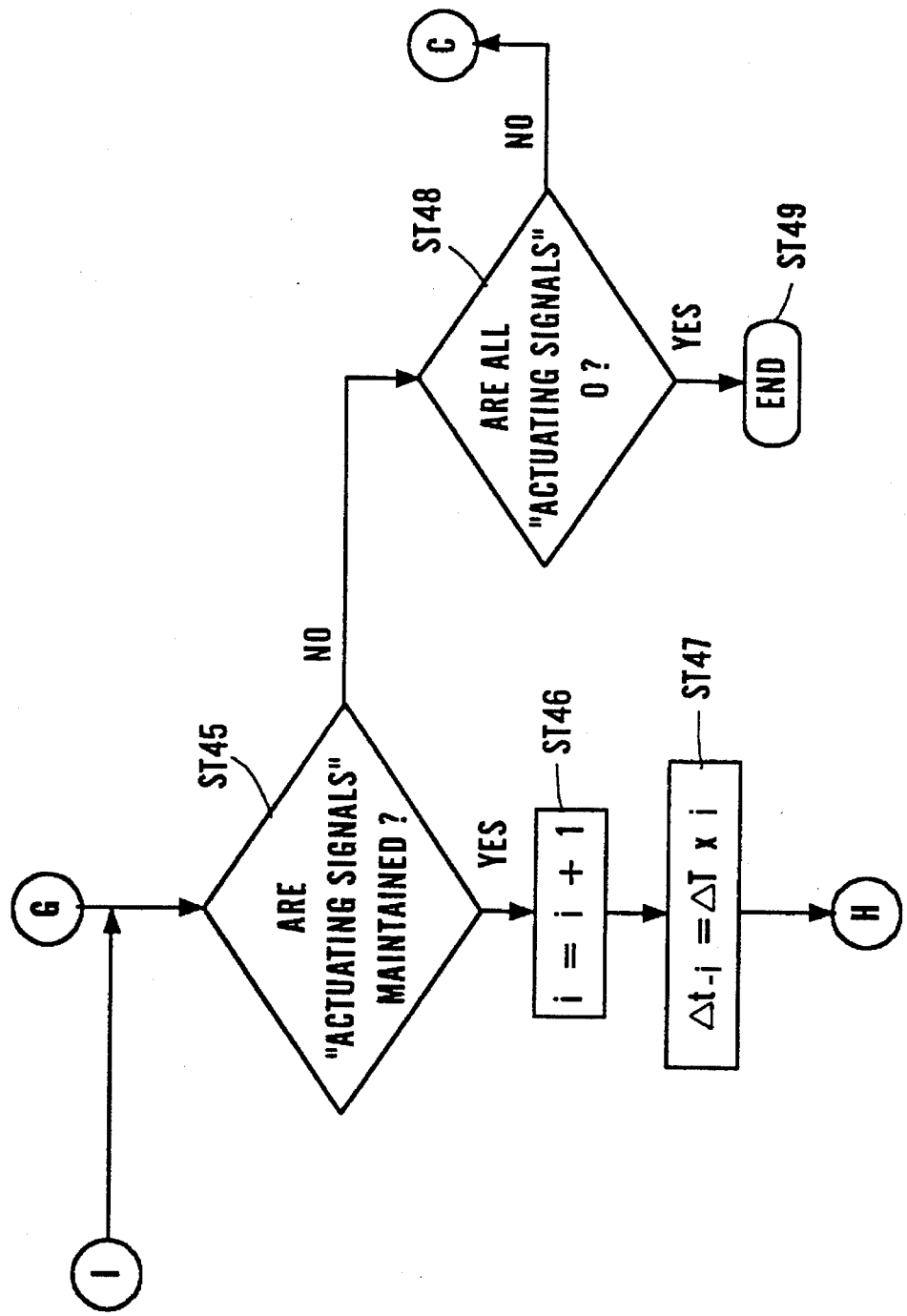
FIG. 19 is a flow chart of "the co-acting each axis mode of the manual operation" continued from G of FIG. 18.

(a-1); The rotating velocities of the joints 1a, 1b, 1c, 1d, 1e and 1f of the workpiece handling robot 1 are calculated as follows;

The velocities, $V1_w$, $V2_w$, $V3_w$, $V4_w$, $V5_w$, $V6_w$, are computed by the following equations (1A) in response to the actuating signals, S1, S2, S3, S4, S5, S6, generated by the keys 12b and 12D, the designated rate "$r_c$" and the preset maximum values, $V1_{w0}$, $V2_{w0}$, $V3_{w0}$, $V4_{w0}$, $V5_{w0}$, $V6_{w0}$, memorized in the velocity table for "the each axis mode of the manual operation" of the workpiece handling robot 1 (ST35 in FIG. 18).

$$V1_w = S1 \times r_c \times V1_{w0}$$

$$V2_w = S2 \times r_c \times V2_{w0}$$

$$V3_w = S3 \times r_c \times V3_{w0}$$

$$V4_w = S4 \times r_c \times V4_{w0}$$

$$V5_w = S5 \times r_c \times V5_{w0}$$

$$V6_w = S6 \times r_c \times V6_{w0} \qquad (1A)$$

The above mentioned S1, S2, . . . , S6 are as follows;

Pushing each of the keys 12a to 12f generates a signal "+1";

Pushing each of the keys 12A to 12F generates a signal "−1";

Releasing each of the keys 12a to 12f, 12A to 12F generates a signal "0".

Since the keys except 12b and 12D are released in this example, the actuating signals are as follows;

$$V1_w = 0, V3_w = 0, V5_w = 0, V6_w = 0.$$

(a-2); "The position and the attitude of the referential point 56 of the workpiece in the absolute coordinates system 51 prior to receiving the actuating signals" are computed by using "the joint variables of the workpiece handling robot 1" obtained just before receiving "the actuating signals" and "the joint variables of the tool handling robot 2" obtained just before receiving "the actuating signals" as follows;

"The joint variables, $\phi_{1-0}$, $\phi_{2-0}$, . . . , $\phi_{6-0}$, of the workpiece handling robot 1 obtained prior to receiving "the present actuating signals" are red out from the read-write memory 19bw (ST36). The homogeneous transformation matrix, $W_{2-0}$, expressing "the position and the attitude of the holding point 53 of the workpiece against the basepoint 52 of the workpiece handling robot 1 obtained prior to receiving the present actuating signals" is formulated as a following equation (3A) by a product of the homogeneous transformation matrixes of the equation (2A) which uses "link parameters" of the Denavit-Hartenberg Notation.

$$A_{jw} = Rot(Z, \phi_{jw}) \cdot Trans(a_{jw}, 0, d_{jw}) \cdot Rot(X, \alpha_{jw}) \qquad (2A)$$

$$W_{2-0} = A_{1w} \cdot A_{2w} \cdot A_{3w} \cdot A_{4w} \cdot A_{5w} \cdot A_{6w} \qquad (3A)$$

The equations of (2A) and (3A) are similar to the above mentioned equations (2) and (3), respectively. $\phi_j$, $a_{jw}$, $d_{jw}$, and $\alpha_{jw}$ are also the same as the explanation after equations (2) and (3).

The homogeneous transformation matrix, "world $X_{w-0}$", expressing "the position and the attitude of the referential point 56 of the workpiece in the absolute coordinates system 51 obtained prior to receiving the present actuating signals" is calculated by the equation (4A), into which the eq. (3A) is substituted (ST37).

$$\text{world } X_{w-0} = Z_w \cdot W_{2-0} \cdot E_w \qquad (4A)$$

This equation of (4A) is similar to the equation (4). And $Z_w$ and $E_w$ are also the same as the explanation after the equation (4).

(a-3); "The relative attitude of the tip point 57 of the tool against the ground 64" and "the relative position of the tip point 57 of the tool against the referential point 56 of the workpiece" are calculated in response to "the joint variables of the workpiece handling robot 1 obtained prior to receiving the present actuating signals" and "the joint variables of the tool handling robot 2 obtained prior to receiving the present actuating signals" as follows;

"The joint variables, $\theta_{1-0}$, $\theta_{2-0}$, . . . , $\theta_{6-0}$, of the tool handling robot 2 obtained prior to receiving the present actuating signals" are red out from the read-write memory 19bt (ST38). The homogeneous transformation matrix, $T_{2-0}$, expressing "the position and the attitude of the installation point 55 of the tool against the base point 54 (see FIG. 6) of the tool handling robot 2 obtained prior to receiving the present actuating signals" is formulated as a following equation (11A) by a product of the homogeneous transformation matrixes of the equation (10A) which uses "link parameters" of the Denavit-Hartenberg Notation.

$$A_{jt} = Rot(Z, \theta_j) \cdot Trans(a_{jt}, 0, d_{jt}) \cdot Rot(X, \alpha_{jt}) \qquad (10A)$$

$$T_{2-0} = A_{1t} \cdot A_{2t} \cdot A_{3t} \cdot A_{4t} \cdot A_{5t} \cdot A_{6t} \qquad (11A)$$

The equations of (10A) and (11A) are similar to the above mentioned equations (10) and (11). $\phi_j$, $a_{jt}$, $d_{jt}$, and $\alpha_{jt}$ are also the same as the explanation after the equations (10) and (11).

"The attitude of the tip point 57 of the tool in the absolute coordinates system 51 obtained prior to receiving the present actuating signals" is calculated so that "the attitude of the tip point 57" may maintain "the attitude of the tip point 57 of the tool against the ground 64 obtained prior to receiving the present actuating signals".

The homogeneous transformation matrix, "world $X_{t\text{-}0}$", expressing "the position and the attitude of the tip point 57 of the tool in the absolute coordinates system 51 obtained prior to receiving the present actuating signals" is calculated by the equation (12A), into which eq. (11A) is substituted (ST39).

$$\text{world } X_{t-o} = Z_t \cdot T_{z-o} \cdot E_t = \begin{bmatrix} n_{xt-o} & o_{xt-o} & a_{xt-o} & p_{xt-o} \\ n_{yt-o} & o_{yt-o} & a_{yt-o} & p_{yt-o} \\ n_{zt-o} & o_{zt-o} & a_{zt-o} & p_{zt-o} \\ 0 & 0 & 0 & 1 \end{bmatrix} \quad (12A)$$

This equation of (12A) is similar to the above mentioned equation (12). $Z_t$ and $E_t$ are also the same as the explanation after the equation (12).

By substituting each factors of eq. (12A) into the following eq. (12Aa) to eq. (12Ac), the data of "the attitude of the tip point 57 of the tool in the absolute coordinated system 51 obtained prior to the beginning of the manual teaching operations", i.e., the data, $\alpha_{t\text{-}0}, \beta_{t\text{-}0}, \tau_{t\text{-}0}$, of "the attitude of the tip point 57 of the tool in the absolute coordinates system 51 obtained prior to receiving the present actuating signals" are calculated (ST40).

$$\alpha_{t\text{-}0} = \cos^{-1}(a_{xt\text{-}0}/\sin(\beta_{t\text{-}0})) \quad (12Aa)$$

$$\beta_{t\text{-}0} = \cos^{-1}(a_{xt\text{-}0}) \quad (12Ab)$$

$$\tau_{t\text{-}0} = \sin^{-1}(o_{xt\text{-}0}/\sin(\beta_{t\text{-}0})) \quad (12Ac)$$

These equations (12Aa) to (12Ac) are similar to the above mentioned equations (12a) to (12c).

Since "the relative position of the tip point 57 of the tool against the referential point 56 of the workpiece obtained prior to the beginning of the manual teaching operations" should be maintained, "the relative position of the tip point 57 of the tool against the referential point 56 of the workpiece obtained prior to receiving the present actuating signals" is calculated. Assuming that the homogeneous transformation matrix expressing "the relative position and the relative attitude of the tip point 57 of the tool against the referential point 56 of the workpiece obtained prior to receiving the present actuating signals" is "$wX_t$", the homogeneous transformation matrix, world $X_{t\text{-}0}$, expressing "the position and the attitude of the tip point 57 of the tool in the absolute coordinates system 51 obtained prior to receiving the present actuating signals" is formulated as a following equation (13A), into which the eq. (4A) is substituted.

$$\text{world } X_{t\text{-}0} = \text{world } X_{w\text{-}0} \cdot wX_t \quad (13A)$$

Therefore, the homogeneous transformation matrix of $wX_t$ is calculated by equation (14A) (ST41).

$$wX_t = (\text{world } X_{w-o})^{-1} \cdot \text{world } X_{t-o} = \begin{bmatrix} n_{xwX_t} & o_{xwX_t} & a_{xwX_t} & p_{xwX_t} \\ n_{ywX_t} & o_{ywX_t} & a_{ywX_t} & p_{ywX_t} \\ n_{zwX_t} & o_{zwX_t} & a_{zwX_t} & p_{zwX_t} \\ 0 & 0 & 0 & 1 \end{bmatrix} \quad (14A)$$

The $wX_t$ formulated by the eq. (14A) is the homogeneous transformation matrix expressing "the relative position and the relative attitude of the tip point 57 of the tool against the referential point 56 of the workpiece obtained prior to receiving the present actuating signals". Since it is required for the manipulation of "the position of the tip point 57 of the tool" to coordinate with the change of "the position of the referential point 56 of the workpiece", the data, $X_{wX_t}$, $Y_{wX_t}$, $Z_{wX_t}$, of "the relative position of the tip point 57 of the tool against the referential point 56 of the workpiece obtained prior to receiving the present actuating signals" should be calculated. They are expressed as follows by using each factor of the fourth column in the eq. (14A).

$$X_{wX_t} = p_{xwX_t},\ Y_{wX_t} = p_{ywX_t},\ Z_{wX_t} = p_{zwX_t} \quad (14Aa)$$

The homogeneous transformation matrix, $wT_t$, expressing "the relative position of the tip point 57 of the tool against the referential point 56 of the workpiece obtained prior to receiving the present actuating signals" is calculated by the following equation introduced from eq. (14Aa) (ST42).

$$wT_t = \text{Trans}(X_w x_t, Y_w x_t, Z_w x_t) = \begin{bmatrix} 1 & 0 & 0 & X_w x_t \\ 0 & 1 & 0 & Y_w x_t \\ 0 & 0 & 1 & Z_w x_t \\ 0 & 0 & 0 & 1 \end{bmatrix} \quad (14Ab)$$

These equations (13A), (14A), (14Aa) and (14Ab) are similar to the above mentioned equations (13), (14), (14a) and (14b), respectively.

(a-4); When a present infinitesimal time interval $\Delta T$, e.g., one-twentieth of a second, elapses since "the present actuating signals" were generated (ST43), "i" is set to "0", i.e., the time interval $\Delta t_{\text{-}i}$ is set to "0" (ST44).

(b): The control of the second step processor 4A$b$ is executed in response to the completion of the first step as follows;

Whether pushing the keys 12$b$ and 12D are continued for the preset time interval $\Delta T$ is discriminated (ST45 in FIG. 9). When "the present actuating signals" have been maintained, a preset infinitesimal time interval $\Delta T$, e.g., one-twentieth of a second, is added to the time $\Delta t_{\text{-}i}$ (ST46), and the execution at the third step processor 4A$c$ is controlled after the time $\Delta t_{\text{-}i}$ is replaced to $\Delta t_{\text{-}i+1}$ (ST47).

When all of "actuating signals" generated by the keys 12$b$ and 12D have already vanished in the middle of the preset time interval (ST48), the termination of the co-acting mode of the manual operation is controlled in response to the absence of the actuating signals (ST49). When some of the keys have been released or changed to different ones in the middle of the preset time interval, i.e., when the key 12$c$ has been pushed instead of the keys 12$b$ and 12D (ST48), the repetition from the step 1 is controlled in response to "the new actuating signals".

Figure 20:
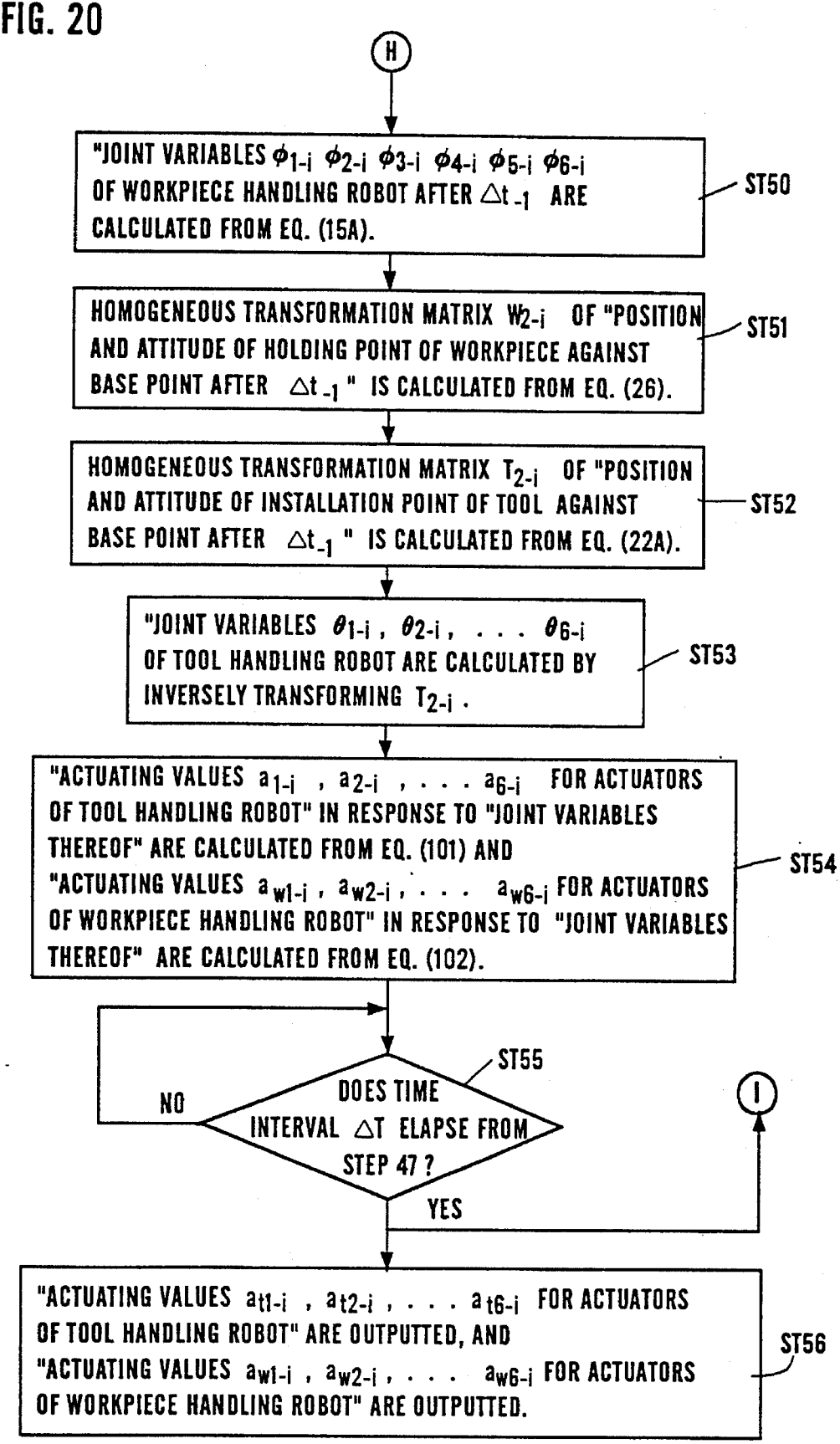
FIG. 20 is a flow chart of "the co-acting each axis mode of the manual operation" continued from H of FIG. 19.

(c): The control of the third step processor 4A$c$ is executed in response to the completion of the second step as follows;

"The joint variables, $\phi_{1\text{-}i}, \phi_{2\text{-}i}, \ldots, \phi_{6\text{-}i}$, of the workpiece handling robot 1 after the time $\Delta t_{\text{-}i}$, i.e., after $\Delta T \times i$", are calculated by a following equation (15A) (ST50) in FIG. 20).

$$\phi_{1\text{-}i} = \phi_{1\text{-}0} + V1_w \times \Delta t_{\text{-}i}$$

$$\phi_{2\text{-}i} = \phi_{2\text{-}0} + V2_w \times \Delta t_{\text{-}i}$$

$$\phi_{3\text{-}i} = \phi_{3\text{-}0} + V3_w \times \Delta t_{\text{-}i}$$

$$\phi_{4\text{-}i} = \phi_{4\text{-}0} + V4_w \times \Delta t_{\text{-}i}$$

$$\phi_{5\text{-}i} = \phi_{5\text{-}0} + V5_w \times \Delta t_{\text{-}i}$$

$$\phi_{6\text{-}i} = \phi_{6\text{-}0} + V6_w \times \Delta t_{\text{-}i} \quad (15A)$$

"The joint variable, $\phi_{1\text{-}i}$, of the workpiece handling robot 1 after the time $\Delta t_{\text{-}i}$ i.e., after $\Delta T \times i$", is calculated by means of adding the product of the velocity $V1_w$ of the equation (1A) and the time $\Delta t_{\text{-}i}$ to "the joint variable, $\phi_{1\text{-}0}$, of the workpiece handling robot 1 obtained prior to receiving the present actuating signals". "The joint variables, $\phi_{2\text{-}i}$ to $\phi_{6\text{-}i}$", are similarly calculated.

The homogeneous transformation matrix, $W_{2-i}$, expressing "the position and the attitude of the holding point 53 of the workpiece against the base point 52 of the workpiece handling robot 1 after the time $\Delta t_{-i}$" is formulated as a following equation (26) by a product of the homogeneous transformation matrixes of equation (25) which uses "link parameters" of the Denavit-Hartenberg Notation (ST51).

$$A_{jw} = Rot(z, \phi_j) \cdot Trans(a_{jw}, 0, d_{jw}) \cdot Rot(x, \alpha_{jw}) \quad (25)$$

$$W_{2-i} = A_{1w} \cdot A_{2w} \cdot A_{3w} \cdot A_{4w} \cdot A_{5w} \cdot A_{6w} \quad (26)$$

The symbols in equation (25) are as follows;

$\phi_j$ is a variable of the j-th joint of the workpiece handling robot 1.

$a_{jw}$ is a length of the j-th link of the workpiece handling robot 1, which is a fixed value.

$d_{jw}$ is a distance between the (j−1)-th link and the j-th one of the workpiece handling robot 1, which is a fixed value.

$\alpha_{jw}$ is an angle between the (j−1)-th link and the j-th one of the workpiece handling robot 1, which is a fixed value.

The homogeneous transformation matrix, "world $X_{w-i}$", expressing "the position and the attitude of the referential point 56 of the workpiece in the absolute coordinates system 51 after the time $\Delta t_{-i}$" is formulated as a following equation (27), into which the eq. (26) is substituted.

$$\text{world } X_{w-i} = Z_w \cdot W_{2-i} \cdot E_w \quad (27)$$

When the holding point 53 of the workpiece is manipulated according to equation (26), the manipulation of "the position of the tip point 57 of the tool in the absolute coordinates system 51" coordinating with the manipulation of "the position and the attitude of the holding point 53 of the workpiece" is required without changing "the attitude of the tip point 57 of the tool". Therefore, the homogeneous transformation matrix $T_{2-i}$ expressing "the position and the attitude of the installation point 55 of the tool against the base point 54 of the tool handling robot 2 after the time $\Delta t_{-i}$" is calculated so that "the relative position of the tip point 57 of the tool against the holding point 53 of the workpiece" may be maintained.

The homogeneous transformation matrix, world $X_{t-i}$, expressing "the position and attitude of the tip point 57 of the tool in the absolute coordinates system 51 after the time $\Delta t_{-i}$" coordinating with the manipulation of the holding point 53 of the workpiece is calculated from the following equation, by using the homogeneous transformation matrix, $wT_t$, expressing "the relative position of the tip point 57 of the tool against the referential point 56 of the workpiece obtained prior to the beginning of the manual teaching operations", which was computed by the eq. (14Ab) of the step 42, and the above mentioned equation (27).

$$\text{world } X_{t-i} = \text{world } X_{w-i} \cdot wT_t = \begin{bmatrix} n_{xt-i} & o_{xt-i} & a_{xt-i} & p_{xt-o} \\ n_{yt-i} & o_{yt-i} & a_{yt-i} & p_{yt-o} \\ n_{zt-i} & o_{zt-i} & a_{zt-i} & p_{zt-o} \\ 0 & 0 & 0 & 1 \end{bmatrix} \quad (19A)$$

"The position of the tip point 57 of the tool in the absolute coordinates system 51" is formulated as following equations by using each factor of the fourth column in the eq. (19A).

$$X_{t-i} = p_{xt-i}, Y_{t-i} = p_{yt-i}, Z_{t-i} = p_{zt-i} \quad (19Aa)$$

The homogeneous transformation matrix, world $X_{t-i}$, expressing "the position and the attitude of the tip point 57 of the tool in the absolute coordinates system 51 after the time $\Delta t_{-i}$" coordinating with the manipulation of the holding point 53 of the workpiece controlled by the equation (26) is calculated by the following equation, into which the above mentioned equation (19Aa) and the data, $\alpha_{t-0}, \beta_{t-0}, \tau_{t-0}$, of "the attitude of the tip point 57 of the tool in the absolute coordinates system 51 obtained prior to the beginning of the manual teaching operations" computed by the equations (12Aa) to (12Ac) are substituted.

$$\text{world } X_{t-i} = Trans(X_{t-i}, Y_{t-i}, Z_{t-i}) \cdot Rot(Z, \alpha_{t-0}) \cdot Rot(Y, \beta_{t-0}) \cdot Rot(Z, \tau_{t-0}) \quad (20A)$$

The equation (20A) is formulated as a following equation (21A), similarly to the equation (12A).

$$\text{world } X_{t-i} = Z_t \cdot T_{2-i} \cdot E_t \quad (21A)$$

The homogeneous transformation matrix, $T_{2-i}$, expressing "the position and the attitude of the installation point 55 of the tool against the base point 54 of the tool handling robot 2 after the time $\Delta t_{-i}$" is associated as a following equation (22) by transforming the equation (21A).

$$T_{2-i} = (Z_t)^{-1} \cdot \text{world } X_{t-i} \cdot (E_t)^{-1} \quad (22A)$$

Under the condition that "the relative position of the tip point 57 of the tool against the referential point 53 of the workpiece" is not changed when the referential point 53 of the workpiece is manipulated according to equation (26), the homogeneous transformation matrix, $T_{2-i}$, expressing "the position and the attitude of the installation point 55 of the tool against the base point 54 of the tool handling robot 2 after the time $\Delta t_{-i}$" is calculated by the equation (22A), into which the eq. (20A) is substituted (ST52).

(d): The control of the fourth step processor 4Ad is executed as below;

"The joint variables, $\theta_{1-i}, \theta_{2-i}, \ldots, \theta_{6-i}$, of the tool handling robot 2 after the time $\Delta t_{-i}$" are calculated by inversely transforming the homogeneous transformation matrix, $T_{2-i}$, expressing "the position and the attitude of the installation point 55 of the tool against the base point 54 of the tool handling robot 2 after the time $\Delta t_{-i}$" calculated by the equation (22A) (ST53).

"The joint variables, $\theta_{1-i}, \theta_{2-i}, \theta_{3-i}, \theta_{4-i}, \theta_{5-i}, \theta_{6-i}$ of the tool handling robot 2 after the time $\Delta t_{-i}$" are temporarily stored in the read-write memory 19bt, and "the joint variables, $\phi_{1-i}, \phi_{2-i}, \phi_{3-i}, \phi_{4-i}, \phi_{5-i}, \phi_{6-i}$, of the workpiece handling robot 1 after the time $\Delta t_{-i}$" are temporarily stored in the read-write memory 19bw.

(e): The control of the fifth step processor 4Ae is executed in response to the completion of the fourth step as follows;

The unity of "each actuating values for actuators" of the tool handling robot 2 and the unity of "each actuating values for actuators" of the workpiece handling robot 1 have, respectively, been stored in the control equipment 4 as $R_{t1}, R_{t2}, \ldots, R_{t6}, R_{w1}, R_{w2}, \ldots, R_{w6}$.

"The actuating values, $a_{t1-i}, a_{t2-i}, a_{t3-i}, a_{t4-i}, a_{t5-i}, a_{t6-i}$, for the actuaters $17T_1, 17T_2, \ldots, 17T_6$ of the tool handling robot 2" are calculated by the above mentioned equation (101) in response to "the joint variables, $\theta_{1-i}, \theta_{2-i}, \theta_{3-i}, \theta_{4-i}, \theta_{5-i}, \theta_{6-i}$, of the tool handling robot 2 after the time $\Delta t_{-i}$" calculated in the step 53 [ST54]. Similarly, "the actuating values $a_{w1-i}, a_{w2-i}, a_{w3-i}, a_{w4-i}, a_{w5-i}, a_{w6-i}$, for the actuaters $17W_1, 17W_2, \ldots, 17W_6$ of the workpiece handling robot 1" are calculated by the above mentioned equation (102) in response to "the joint variables, $\phi_{1-i}, \phi_{2-i}, \phi_{3-i}, \phi_{4-i}, \phi_{5-i}, \phi_{6-i}$, of the workpiece handling robot 1 after the time $\Delta t_{-i}$" calculated in the step 50 (ST54).

And in response, simultaneously, the control signals, $a_{t1-i}$, $a_{t2-i}$, $a_{t3-i}$, $a_{t4-i}$, $a_{t5-i}$, $a_{t6-i}$, are supplied to the surbo-driver 15T for the tool handling robot 2 and the control signals $a_{w1-i}$, $a_{w2-i}$, $a_{w3-i}$, $a_{w4-i}$, $a_{w5-i}$, $a_{w6-i}$, are supplied to the surbo-driver 15W for the workpiece handling robot 1 just after the time $\Delta T \times i$ since the control of the step 47 (ST55, ST56). Thereafter, the control is returned to the step 45 for executing the control of the second step and succeeding steps thereto.

The control of "the co-acting each axis mode of the manual operation" until detecting the absence of "the actuating signals" is the same as the control shown in FIG. 15 and/or FIG. 16. The explanation of the control from FIG. 13(a) until FIG. 13(b), of the control from FIG. 17(b) until FIG. 17(c) and/or of the control at FIG. 14(a) are applicable to the above described control of "the co-acting each axis mode of the manual operation".

The control applied to the manipulation from FIG. 13(b) until FIG. 13(c) and the manipulation from FIG. 17(a) until FIG. 17(b) are expounded as below, which do not relate to the present invention. The execution is controlled by means of a conventional "sole-acting cartesian coordinates mode of the manual operation" or a conventional "sole-acting each axis mode of the manual operation". Therefore, the control equipment 4 provides the program for controlling not only the manipulation of "the co-acting cartesian coordinates and/or the co-acting each axis mode of the manual operation" but the manipulation of "the sole-acting cartesian coordinates and/or the sole-acting each axis mode of the manual operation".

(3) The control of "the sole-acting cartesian coordinates mode of the manual operation" of the tool handling robot 2 manipulating "the desired position and the desired attitude of the tool $2n$" in the absolute coordinates system 51 is described below:

"The tool handling robot" is selected by the robot changing switch 7, "the cartesian coordinates mode of the manual operation" is chosen by the movement changing switch 8 and "the sole-acting mode of the manual operation" is designated by the mode changing switch 9 of the teaching pendant 3. Moreover, a desired rate, e.g., 0.2, which is indicated as "$r_b$", is designated by the rate changing switch 10.

Pushing the desired keys, e.g., 12b and 12c, the control of the sole-acting cartesian coordinates mode of the manual operation until the keys are released is as follows;

(a): The control of the first step processor 4Ta is executed as (a-1) to (a-3) mentioned after.

Figure 21:
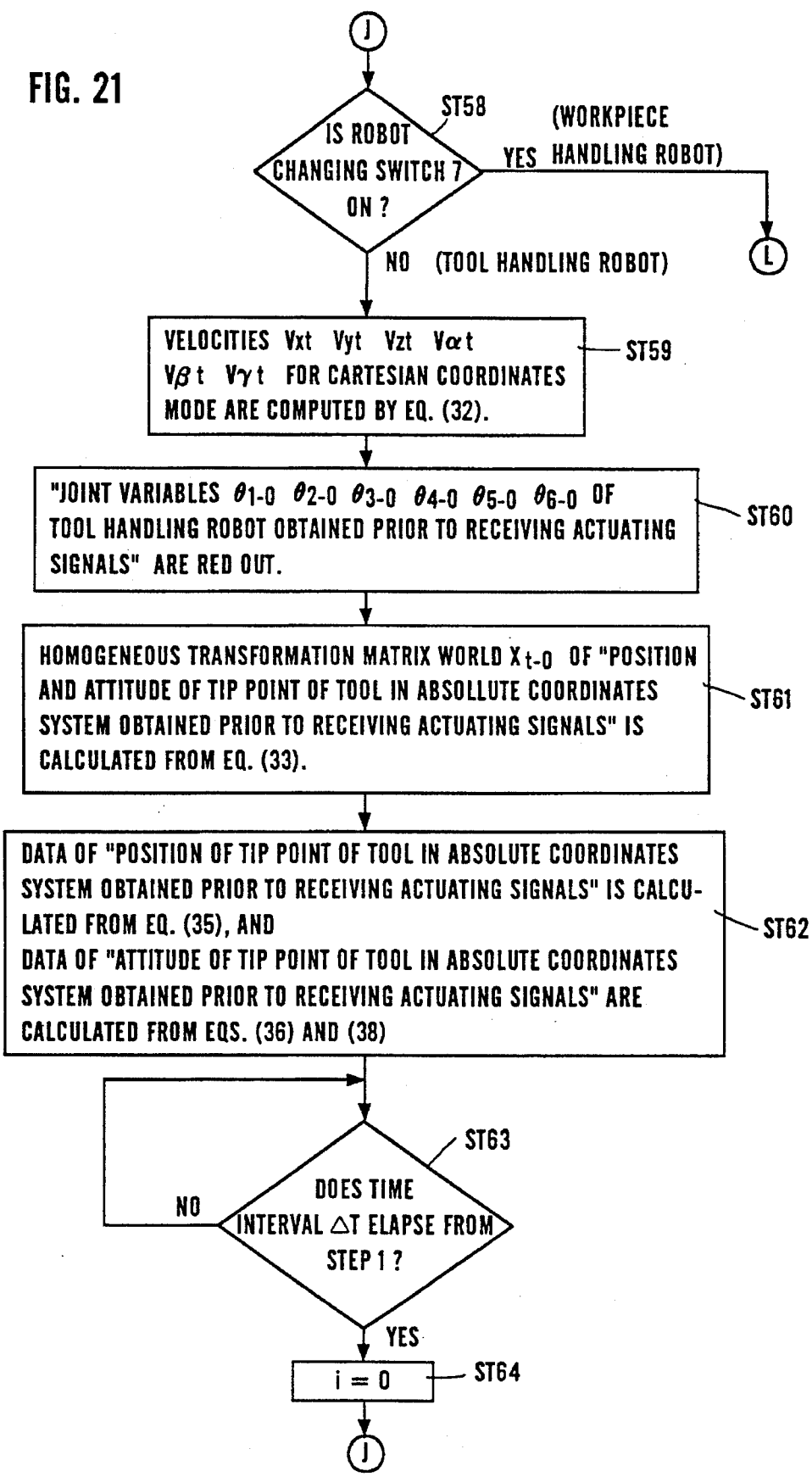
FIG. 21 is a flow chart of "the sole-acting cartesian coordinates mode of the manual operation" by the tool handling robot continued from J of FIG. 9.

The control equipment 4 receives the actuating signals generated by the keys 12b and 12c (ST1 in FIG. 9). As the mode changing switch 9 is "off" (ST2), the movement changing switch 8 is "on" (ST57) and a robot changing switch 7 is "off" (ST58 in FIG. 21), the procedure is led to the step 59 in response to "the sole-acting mode signal", "the cartesian coordinates mode signal" and "the robot signal selecting the tool handling robot".

(a-1); The velocity components of the linear motion of the tip point 57 of the tool along each axis of the absolute coordinates system 51 and the velocity components of the revolutionary motion thereof around each axis of the absolute coordinates system are calculated as follows;

The velocity components, $Vx_t$, $Vy_t$, $Vz_t$, $V\alpha_t$, $V\beta_t$, $V\tau_t$, are computed by the following equations (32) in response to the "actuating signals", $Sx$, $Sy$, $Sz$, $S\alpha$, $S\beta$, $S\tau$, generated by keys 12b and 12c, the designated "rate" $r_b$ and the preset maximum values, $Vx_{t0}$, $Vy_{t0}$, $Vz_{t0}$, $V\alpha_{t0}$, $V\beta_{t0}$, $V\tau_{t0}$, memorized in the velocity table for the cartesian coordinates mode of the manual operation of the tool $2n$ (ST59).

$$Vx_t = Sx \times R_b \times Vx_{t0}$$
$$Vy_t = Sy \times R_b \times Vy_{t0}$$
$$Vz_t = Sz \times R_b \times Vz_{t0}$$
$$V\alpha_t = S\alpha \times R_b \times V\alpha_{t0}$$
$$V\beta_t = S\beta \times R_b \times V\beta_{t0}$$
$$V\tau_t = S\tau \times R_b \times V\tau_{t0} \tag{32}$$

The above mentioned, $Sx$, $Sy$, $Sz$, $S\alpha$, $S\beta$, $S\tau$, are as follows;

Pushing each of the keys 12a to 12f generates a signal "+1";

Pushing each of the keys 12A to 12F generates a signal "−1";

Releasing each of the keys 12a to 12f, 12A to 12F generates a signal "0".

Since the keys except 12b and 12c are released in this example, the actuating signals are as follows;

$$Vx_t = 0, \ V\alpha_t = 0, \ V\beta_t = 0, \ V\tau_t = 0.$$

Such a control of "the sole-acting cartesian coordinates mode of the manual operation" of the tool handling robot 2 is executed for manipulating the tool $2n$ to "the aimed point" $B_1$ regulated on the workpiece $1m$, e.g., for manipulating the tool $2n$ to the state of FIG. 13(a) or for manipulating the tool $2n$ from FIG. 13(b) to FIG. 13(c). At the latter case, the keys 12d to 12f and 12D to 12F are not pushed, because "the attitude of the tool $2n$" is changed by rotating the tip point 57 of the tool. Therefore, the velocity components of the revolutionary motion of the tip point 57 of the tool around each axis of the absolute coordinates system 51 are always set to "0".

(a-2); "The position and the attitude of the tip point 57 of the tool in the absolute coordinates system 51 obtained prior to the beginning of the manual teaching operations" are computed by using "the joint variables of the tool handling robot 2" obtained prior to receiving "the actuating signals" as follows;

"The joint variables, $\theta_{1-0}$, $\theta_{2-0}$, $\theta_{3-0}$, $\theta_{4-0}$, $\theta_{5-0}$, $\theta_{6-0}$, of the tool handling robot 2" obtained prior to receiving the present actuating signals" are red out from the read-write memory 19bt (ST60). The homogeneous transformation matrix, world $X_{t-0}$, expressing "the position and the attitude of the tip point 57 of the tool in the absolute coordinates system 51 obtained prior to the beginning of the manual teaching operations" is calculated by the equation (33) (ST61).

$$\text{world } X_{t-0} = Z_t \cdot T_{2-0} \cdot E_t \tag{33}$$

The equation (33) is formulated as a following equation.

$$\text{world } X_{t-o} = \begin{bmatrix} n_x & o_x & a_x & p_x \\ n_y & o_y & a_y & p_y \\ n_z & o_z & a_z & p_z \\ 0 & 0 & 0 & 1 \end{bmatrix} \tag{34}$$

By transforming the eq. (33), the data, $X_{t-0}$, $Y_{t-0}$, $Z_{t-0}$, of "the position of the tip point 57 of the tool in the absolute coordinates system 51 obtained prior to receiving the present actuating signals" and the data, $\alpha_{t-0}$, $\beta_{t-0}$, $\tau_{t-0}$, of "the attitude of the tip point 57 of the tool in the absolute coordinates system 51 obtained prior to receiving the present actuating signals" are calculated, i.e., the six parameters equivalent to following equations are calculated.

world $X_{t-o}$ = Trans($X_{t-o}$, $Y_{t-o}$, $Z_{t-o}$) · Rot(Z, $\alpha_{t-o}$) ·

Rot(Y, $\beta_{t-o}$) · Rot(Z, $\gamma_{t-o}$) =

$$\begin{bmatrix} \cos(\alpha_{t-o})\cos(\beta_{t-o})\cos(\gamma_{t-o}) - \sin(\alpha_{t-o})\sin(\gamma_{t-o}) \\ \sin(\alpha_{t-o})\cos(\beta_{t-o})\cos(\gamma_{t-o}) + \cos(\alpha_{t-o})\sin(\gamma_{t-o}) \\ -\sin(\beta_{t-o})\cos(\gamma_{t-o}) \\ 0 \\ \\ -\cos(\alpha_{t-o})\cos(\beta_{t-o})\sin(\gamma_{t-o}) - \sin(\alpha_{t-o})\cos(\gamma_{t-o}) \\ -\sin(\alpha_{t-o})\cos(\beta_{t-o})\sin(\gamma_{t-o}) - \cos(\alpha_{t-o})\cos(\gamma_{t-o}) \\ \sin(\beta_{t-o})\cos(\gamma_{t-o}) \\ 0 \\ \\ \cos(\alpha_{t-o})\sin(\beta_{t-o})\ X_{t-o} \\ \sin(\alpha_{t-o})\sin(\beta_{t-o})\ Y_{t-o} \\ \cos(\beta_{t-o})\ Z_{t-o} \\ 0 \end{bmatrix}$$

$X_{t-o} = p_x$, $Y_{t-o} = p_y$, $Z_{t-o} = p_z$ \hfill (35)

$\alpha_{t-o} = \cos^{-1}(a_x/\sin(\beta_{t-o}))$ \hfill (36)

$\beta_{t-o} = \cos^{-1}(a_z)$ \hfill (37)

$\gamma_{t-o} = \sin^{-1}(o_z/\sin(\beta_{t-o}))$ \hfill (38)

"The position and the attitude of the tip point 57 of the tool in the absolute coordinates system 51" are calculated by these equations (35), (36), (37), and (38) (ST62).

a-3); When a preset infinitesimal time interval $\Delta T$, e.g., one-twentieth of a second, elapses since "the preset actuating signals" were generated (ST63), "i" is set to "0" (ST64), i.e., the time $\Delta t_{-i}$ is set to "0".

Figure 22:
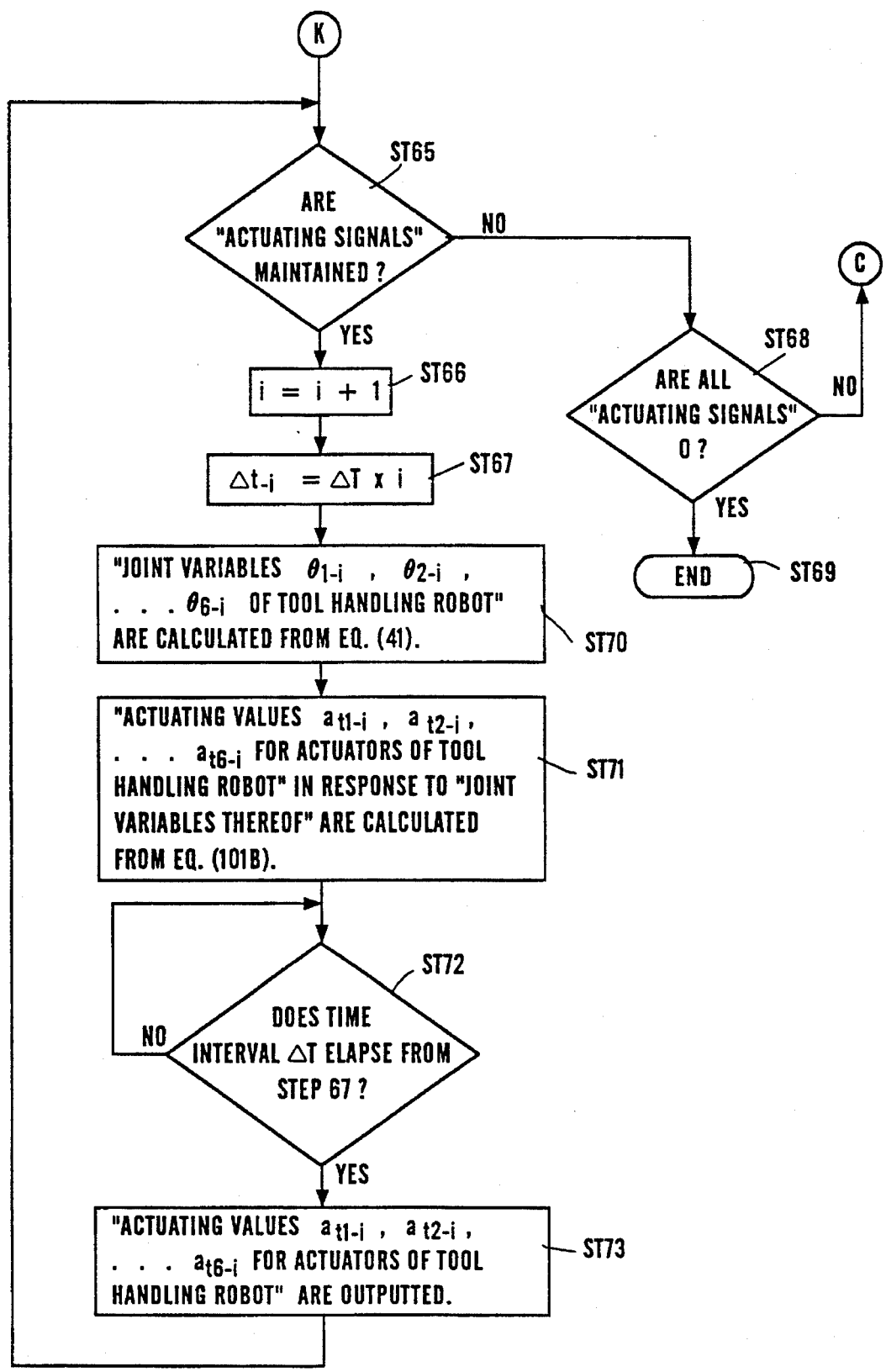
FIG. 22 is a flow chart of "the sole-acting cartesian coordinates mode of the manual operation" by the tool handling robot continued from K of FIG. 21.

(b): The control of the second step processor 4T*b* is executed as follows;

Whether pushing the keys 12*b* and 12*c* are continued for the preset time interval $\Delta T$ is discriminated (ST65 in FIG. 22). When "the present actuating signals" have been maintained, a preset infinitesimal time interval $\Delta T$, e.g., one-twentieth of a second, is added to the time $\Delta t_{-i}$ (ST66), and the execution at the third step processor 4T*c* is controlled after the time $\Delta t_{-i}$ is replaced to $\Delta t_{-i+1}$ (ST67).

When all of the keys 12*b* and 12*c* have already released in the middle of the preset time interval (ST68), i.e., when "all present actuating signals" have vanished, a termination signal is transmitted to the commander 4*f* for terminating control, see FIG. 8 (ST69). When some of the keys have been released or changed to different ones in the middle of the preset time interval, i.e., when the keys 12*a* and 12*b* have been pushed instead of the keys 12*b* and 12*c* (ST68), the repetition from the step 1 is controlled in response to "new actuating signals".

(c): The control of the third step processor 4T*c* is executed in response to the completion of controlling the second step processor 4T*b* as follows;

The data, $X_{t-i}$, $Y_{t-i}$, $Z_{t-i}$, of "the position of the tip point 57 of the tool in the absolute coordinates system 51 after the time $\Delta t_{-i}$", i.e., after $\Delta T \times i$", and the data, $\alpha_{t-i}$, $\beta_{t-i}$, $\tau_{t-i}$, of "the attitude of the tip point 57 of the tool in the absolute coordinates system 51 after the time $\Delta t_{-i}$" are calculated by the equation (39). However, the data, $\alpha_{t-i}$, $\beta_{t-i}$, $\tau_{t-i}$, are "0", respectively, i.e., $V\alpha_t=0$, $V\beta_t=0$, $V\tau_t=0$, because "the attitude of the tip point 57 of the tool" is not changed.

$X_{t-i}=X_{t-0}+Vx_t\times\Delta t_{-i}$ $Y_{t-i}=Y_{t-0}+Vy_t\times\Delta t_{-i}$ $Z_{t-i}=Z_{t-0}+Vz_t\times\Delta t_{-i}$ $\alpha_{t-i}=\alpha_{t-0}+V\alpha_t\times\Delta t_{-i}$ $\beta_{t-i}=\beta_{t-0}+V\beta_t\times\Delta t_{-i}$ $\tau_{t-i}=\tau_{t-0}+V\tau_t\times\Delta t_{-i}$ \hfill (39)

The homogeneous transformation matrix, world $X_{t-i}$, of expressing "the position and the attitude of the tip point 57 of the tool in the absolute coordinates system 51 after the time $\Delta t_{-i}$" is calculated by the following equation.

world $X_{t-i}$=Trans($X_{t-i}$, $Y_{t-i}$, $Z_{t-i}$)·Rot(Z, $\alpha_{t-i}$)·Rot(Y, $\beta_{t-i}$)·Rot(Z, $\tau_{t-i}$) \hfill (40A)

The homogeneous transformation matrix, $T_{2-i}$, of expressing "the position and the attitude of the installation point 55 of the tool against the base point 54 of the tool handling robot 2 after the time $\Delta t_{-i}$" is calculated by the following equation (41), similarly to the eq. (22).

$T_{2-i}=(Z_t)^{-1}\cdot$world $X_{t-i}\cdot(E_t)^{-1}$ \hfill (41)

(d): The control of the fourth step processor 4T*d* is executed as follows;

"The joint variables, $\theta_{1-i}$, $\theta_{2-i}$, $\theta_{3-i}$, $\theta_{4-i}$, $\theta_{5-i}$, $\theta_{6-i}$, of the tool handling robot 2 after the time $\Delta t_{-i}$" are calculated by inversely transforming the homogeneous transformation matrix, $T_{2-i}$, expressing "the position and the attitude of the installation point 55 of the tool against the base point 54 of the tool handling robot 2 after the time $\Delta t_{-i}$" obtained by the eq. (41) (ST70).

(e): The control of the fifth step processor 4T*e* is executed as follows;

The unity of "each actuating values for actuators" of the tool handling robot 2 have been stored in the control equipment 4 as $R_{t1}$, $R_{t2}$, $R_{t3}$, $R_{t4}$, $R_{t5}$, $R_{t6}$. "The actuating values, $a_{t1-i}$, $a_{t2-i}$, $a_{t3-i}$, $a_{t4-i}$, $a_{t5-i}$, $a_{t6-i}$, for the actuators 17T of the tool handling robot 2" are calculated by the following equation (101B) in response to "the joint variables, $\theta_{1-i}$, $\theta_{2-i}$, $\theta_{3-i}$, $\theta_{4-i}$, $\theta_{5-i}$, $\theta_{6-i}$, of the tool handling robot 2 after the time $\Delta t_{-i}$" calculated in the step 70 (ST71).

$a_{t1-i}=\theta_{1-i}/R_{t1}$ $a_{t2-i}=\theta_{2-i}/R_{t2}$ $a_{t3-i}=\theta_{3-i}/R_{t3}$ $a_{t4-i}=\theta_{4-i}/R_{t4}$ $a_{t5-i}=\theta_{5-i}/R_{t5}$ $a_{t6-i}=\theta_{6-i}/R_{t6}$ \hfill (101B)

This equation (101B) is the same as the eq. (101) above mentioned.

And in response, the control signals, $a_{t1-i}$, $a_{t2-i}$, $a_{t3-i}$, $a_{t4-i}$, $a_{t5-i}$, $a_{t6-i}$, of the actuators are supplied to the surbo-driver 15T, see FIG. 8, for the tool handling robot 2 just after the time $\Delta T \times i$ since the control of the step 67 (ST72, ST73). Thereafter, the control is returned to the step 65 for executing the control of the second step and succeeding steps thereto.

After the step 73, the manipulation of "the position and the attitude of the tool 2*n*" are executed by the actuators 17T$_1$, 17T$_2$, 17T$_3$, 17T$_4$, 17T$_5$, 17T$_6$, see FIG. 7, of the tool handling robot 2.

By such manipulation of "the position and the attitude of the tool 2*n*", the control to position the tool 2*n* at the state of FIG. 13(*a*), the control to move the tool from FIG. 13(*b*) until FIG. 13(*c*) and the control to move the tool from FIG. 17(*a*) until FIG. 17(*b*) are executed.

(4) The control of "the sole-acting cartesian coordinates mode of the manual operation" of the workpiece handling robot 1 manipulating "the desired position and the desired attitude of the workpiece $1m$" in the absolute coordinates system 51 is described below:

"The workpiece handling robot" is selected by the robot changing switch 7, "the cartesian coordinates mode of the manual operation" is chosen by the movement changing switch 8 and "the sole-acting mode of the manual operation" is designated by the mode changing switch 9 of the teaching pendant 3. Moreover, a desired rate, e.g. 0.5, which is indicated as "$r_c$", is designated by the rate changing switch 10.

Pushing the desired keys, e.g., 12a and 12e, the control of the sole-acting cartesian coordinates mode of the manual operation until the keys are released is as follows;

(a): The control of the first step processor 4Wa is executed as (a-1) to (a-3) mentioned after.

Figure 23:
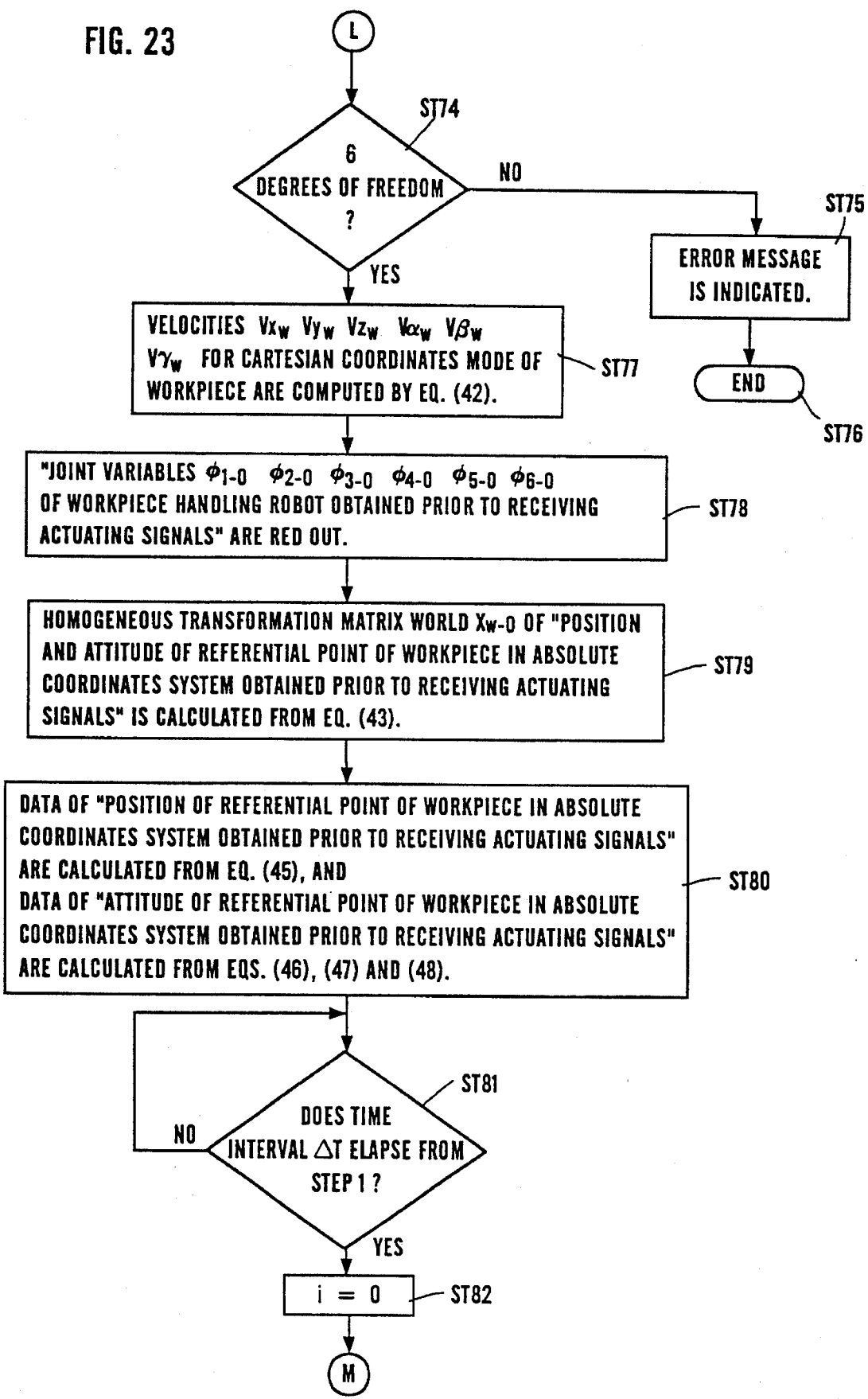
FIG. 23 is a flow chart of "the sole-acting cartesian coordinates mode of the manual operation" by the workpiece handling robot continued from L of FIG. 21.

The control equipment 4 receives the actuating signals generated by the keys 12a and 12e (ST1 in FIG. 9). As the mode changing switch 9 is "off" (ST2), the movement changing switch 8 is "on" (ST57) and a robot changing switch 7 is "on" (ST58 in FIG. 21), the procedure is led to the step 74 in FIG. 23 in response to "the sole-acting mode signal", "the cartesian coordinates mode signal" and "the robot signal selecting the workpiece handling robot".

Either a manipulator of 6 degrees of freedom type or a positioner of less than 3 degrees of freedom type may be applicable to the workpiece handling robot 1. The former only is, however, applicable to this control, therefore, it is discriminated whether the workpiece handling robot 1 is a manipulator of 6 degrees of freedom type or not at the step 74.

The degrees of freedom for the workpiece handling robot 1 has previously stored in the control equipment 4, which confirms the degrees of freedom of the workpiece handling robot 1. If the workpiece handling robot 1 is a positioner, the undrawn CRT indicates the error message (ST75), and the termination is controlled (ST76). If the workpiece handling robot 1 is a manipulator of 6 degrees of freedom type (ST74), the procedure is led to the step 77.

(a-1); The velocity components of the linear motion of the referential point 56 of the workpiece along each axis of the absolute coordinates system 51 and the velocity components of the revolutionary motion thereof around each axis of the absolute coordinates system are calculated as follows;

The velocity components, $Vx_w$, $Vy_w$, $Vz_w$, $V\alpha_w$, $V\beta_w$, $V\tau_w$, are computed by the following equations (42) in response to the "actuating signals", $Sx$, $Sy$, $Sz$, $S\alpha$, $S\beta$, $S\tau$, generated by the keys 12a and 12e, the designated "rate" $r_c$ and the preset maximum values, $Vx_{w0}$, $Vy_{w0}$, $Vz_{w0}$, $V\alpha_{w0}$, $V\beta_{w0}$, $V\tau_{w0}$, memorized in the velocity table for the cartesian coordinates mode of the manual operation of the workpiece $1m$ (ST77).

$$Vx_w = Sx \times r_c \times Vx_{w0}$$
$$Vy_w = Sy \times r_c \times Vy_{w0}$$
$$Vz_w = Sz \times r_c \times Vz_{w0}$$
$$V\alpha_w = S\alpha \times r_c \times V\alpha_{w0}$$
$$V\beta_w = S\beta \times r_c \times V\beta_{w0}$$
$$V\tau_w = S\tau \times r_c \times V\tau_{w0} \qquad (42)$$

The above mentioned, $Sx$, $Sy$, $Sz$, $S\alpha$, $S\beta$, $S\tau$, are as follows;

Pushing each of the keys 12a to 12f generates a signal "+1";

Pushing each of the keys 12A to 12F generates a signal "−1";

Releasing each of the keys 12a to 12f, 12A to 12F generates a signal "0".

Since the keys except 12a and 2e are released in this example, the actuating signals are as follows;

$$Vy_w = 0, Vz_w = 0, V\alpha_w = 0, V\tau_w = 0.$$

(a-2); "The position and the attitude of the referential point 56 of the workpiece in the absolute coordinates system 51 obtained prior to the beginning of the manual teaching operations" are computed by using "the joint variables of the workpiece handling robot 1" obtained prior to receiving "the actuating signals" as follows; "The joint variables, $\phi_{1-0}$, $\phi_{2-0}$, $\phi_{3-0}$, $\phi_{4-0}$, $\phi_{5-0}$, $\phi_{6-0}$, of the workpiece handling robot 1" obtained prior to receiving the present actuating signals" are red out from the read-write memory 19bw (ST78). The homogeneous transformation matrix, world $X_{w-0}$, expressing "the position and the attitude of the referential point 56 of the workpiece in the absolute coordinates system 51 obtained prior to the beginning of the manual teaching operations" is calculated by the equation (43) (ST79).

$$\text{world } X_{w-0} = Z_w \cdot T_{2-0} \cdot E_w \qquad (43)$$

The equation (43) is formulated as a following equation.

$$\text{world } X_{w-o} = \begin{bmatrix} n_x & o_x & a_x & p_x \\ n_y & o_y & a_y & p_y \\ n_z & o_z & a_z & p_z \\ 0 & 0 & 0 & 1 \end{bmatrix} \qquad (44)$$

By transforming the eq. (44), the data, $X_{w-0}$, $Y_{w-0}$, $Z_{w-0}$, of "the position of the referential point 56 of the workpiece in the absolute coordinates system 51 obtained prior to receiving the present actuating signals" and the data, $\alpha_{w-o}$, $\beta_{w-o}$, $\tau_{w-o}$, of "the attitude of the referential point 56 of the workpiece in the absolute coordinates system 51 obtained prior to receiving the present actuating signals" are calculated, i.e., the six parameters equivalent to following equations are calculated.

$$\text{world } X_{w-o} = \text{Trans}(X_{w-o}, Y_{w-o}, Z_{w-o}) \cdot Rot(Z, \alpha_{w-o}) \cdot$$

$$Rot(Y, \beta_{w-o}) \cdot Rot(Z, \gamma_{w-o}) =$$

$$\begin{bmatrix} \cos(\alpha_{w-o})\cos(\beta_{w-o})\cos(\gamma_{w-o}) - \sin(\alpha_{w-o})\sin(\gamma_{w-o}) \\ \sin(\alpha_{w-o})\cos(\beta_{w-o})\cos(\gamma_{w-o}) + \cos(\alpha_{w-o})\sin(\gamma_{w-o}) \\ -\sin(\beta_{w-o})\cos(\gamma_{w-o}) \\ 0 \\[4pt] -\cos(\alpha_{w-o})\cos(\beta_{w-o})\sin(\gamma_{w-o}) - \sin(\alpha_{w-o})\cos(\gamma_{w-o}) \\ -\sin(\alpha_{w-o})\cos(\beta_{w-o})\sin(\gamma_{w-o}) - \cos(\alpha_{w-o})\cos(\gamma_{w-o}) \\ \sin(\beta_{w-o})\cos(\gamma_{w-o}) \\ 0 \\[4pt] \cos(\alpha_{w-o})\sin(\beta_{w-o}) \quad X_{w-o} \\ \sin(\alpha_{w-o})\sin(\beta_{w-o}) \quad Y_{w-o} \\ \cos(\beta_{w-o}) \quad Z_{w-o} \\ 0 \quad 1 \end{bmatrix}$$

$$X_{w-o} = p_x, Y_{w-o} = p_y, Z_{w-o} = p_z \qquad (45)$$
$$\alpha_{w-o} = \cos^{-1}(a_x/\sin(\beta_{w-o})) \qquad (46)$$
$$\beta_{w-o} = \cos^{-1}(a_z) \qquad (47)$$
$$\gamma_{w-o} = \sin^{-1}(o_z/\sin(\beta_{w-o})) \qquad (48)$$

"The position and the attitude of the referential point 56 of the workpiece in the absolute coordinates system 51" are calculated by these equations (45), (46), (47), (48), [ST80].

(a-3); When a preset infinitesimal time interval $\Delta T$, e.g., one-twentieth of a second, elapses since "the present actuating signals" were generated (ST81), "i" is set to "0" (ST82), i.e., the time $\Delta t_{-i}$ is set to "0".

Figure 24:
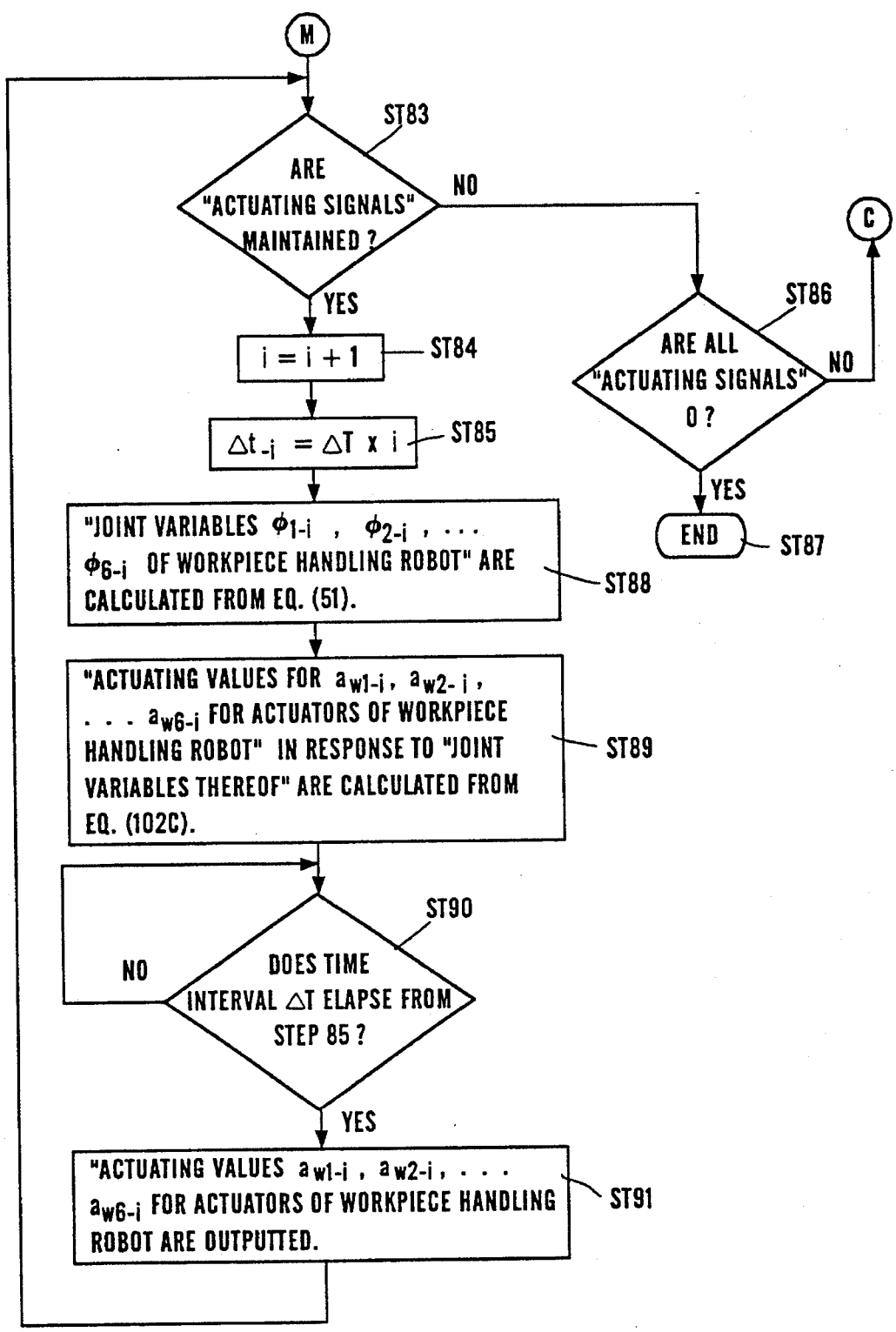
FIG. 24 is a flow chart of "the sole-acting cartesian coordinates mode of the manual operation" by the workpiece handling robot continued from M of FIG. 23.

(b): The control of the second step processor 4Wb is executed as follows;

Whether pushing the keys 12a and 12e are continued for the preset time interval $\Delta T$ is discriminated (ST83 in FIG. 24). When "the present actuating signals" have been maintained, a preset infinitesimal time interval $\Delta T$ is added to the time $\Delta t_{-i}$ (ST84), and the execution at the third step processor 4Wc is controlled after the time $\Delta t_{-i}$ is replaced to $\Delta t_{-i+1}$ (ST85).

When all of the keys 12a and 12e have already released in the middle of the preset time interval (ST86), i.e., when "all present actuating signals" have vanished, a termination signal is transmitted to the commander 4f for terminating control, see FIG. 8 (ST87). When some of the keys have been released or changed to different ones in the middle of the preset time interval, i.e., when the keys 12a and 12c have been pushed instead of the keys 12a and 12e (ST86), the repetition from the step 1 is controlled in response to "new actuating signals".

(c): The control of the third step processor 4Wc is executed in response to the completion of controlling the second step processor 4Wb as follows:

The data, $X_{w-i}$, $Y_{w-i}$, $Z_{w-i}$, of "the position of the referential point 56 of the workpiece in the absolute coordinates system 51 after the time $\Delta t_{-i}$, i.e., after $\Delta T \times i$", and the data, $\alpha_{w-i}$, $\beta_{w-i}$, $\tau_{w-i}$, of "the attitude of the referential point 56 of the workpiece in the absolute coordinates system 51 after the time $\Delta t_{-i}$" are calculated by the equation (49).

$$X_{w-i}=X_{w-0}+Vx_w \times \Delta t_{-i}$$
$$Y_{w-i}=Y_{w-0}+Vy_w \times \Delta t_{-i}$$
$$Z_{w-i}=Z_{w-0}+Vz_w \times \Delta t_{-i}$$
$$\alpha_{w-i}=\alpha_{w-0}+V\alpha_w \times \Delta t_{-i}$$
$$\beta_{w-i}=\beta_{w-0}+V\beta_w \times \Delta t_{-i}$$
$$\tau_{w-i}=\tau_{w-0}+V\tau_w \times \Delta t_{-i} \qquad (49)$$

The homogeneous transformation matrix, world $X_{w-i}$, of expressing "the position and the attitude of the referential point 56 of the workpiece in the absolute coordinates system 51 after the time $\Delta t_{-i}$" is formulated as the following equation (50).

$$\text{world } X_{w-i}=\text{Trans}(X_{w-i}, Y_{w-i}, Z_{w-i}) \cdot Rot(Z, \alpha_{w-i}) \cdot Rot(Y, \beta_{w-i}) \cdot (Rot(Z, \tau_{w-i}) \qquad (50)$$

The homogeneous transformation matrix, $W_{2-i}$, of expressing "the position and the attitude of the holding point 53 of the workpiece against the base point 54 of the workpiece handling robot after the time $\Delta t_{-i}$" is calculated by the following equation (51), similarly to the eq. (18).

$$W_{2-i}=(Z_w)^{-1} \cdot \text{world } X_{w-i} \cdot (E_w)^{-1} \qquad (51)$$

(d): The control of the fourth step processor 4Wd is executed as follows;

"The joint variables, $\phi_{1-i}$, $\phi_{2-i}$, $\phi_{3-i}$, $\phi_{4-i}$, $\phi_{5-i}$, $\phi_{6-i}$, of the workpiece handling robot 1 after the time $\Delta t_{-i}$" are calculated by inversely transforming the homogeneous transformation matrix, $W_{2-i}$, expressing "the position and the attitude of the holding point 53 of the workpiece against the base point 52 of the workpiece handling robot 1 after the time $\Delta t_{-i}$" obtained by the eq. (51) (ST88).

(e): The control of the fifth step processor 4We is executed as follows;

The unity of "each actuating values for actuators" of the workpiece handling robot 1 have been stored in the control equipment 4 as $R_{w1}$, $R_{w2}$, $R_{w3}$, $R_{w4}$, $R_{w5}$, $R_{w6}$. "The actuating values, $a_{w1-i}$, $a_{w2-i}$, $a_{w3-i}$, $a_{w4-i}$, $a_{w5-i}$, $a_{w6-i}$, for the actuators 17W of the workpiece handling robot 1" are calculated by the following equation (102C) in response to "the joint variables, $\phi_{1-i}$, $\phi_{2-i}$, $\phi_{3-i}$, $\phi_{4-i}$, $\phi_{5-i}$, $\phi_{6-i}$, of the workpiece handling robot 1 after the time $\Delta t_{-i}$" calculated in the step 88 (ST89).

$$a_{w1-i}=\phi_{1-i}/R_{w1}$$
$$a_{w2-i}=\phi_{2-i}/R_{w2}$$
$$a_{w3-i}=\phi_{3-i}/R_{w3}$$
$$a_{w4-i}=\phi_{4-i}/R_{w4}$$
$$a_{w5-i}=\phi_{5-i}/R_{w5}$$
$$a_{w6-i}=\phi_{6-i}/R_{w6} \qquad (102C)$$

This equation (102C) is the same as equation (102) mentioned above.

And in response, the control sign, $a_{w1-i}$, $a_{w2-i}$, $a_{w3-i}$, $a_{w4-i}$, $a_{w5-i}$, $a_{w6-i}$, of the actuators are supplied to the surbo-driver 15W, see FIG. 8, for the workpiece handling robot 1 just after the time $\Delta T \times i$ since the control of the step 85 (ST90, ST91). Thereafter, the control is returned to the step 83 for executing the control of the second step and succeeding step thereto.

After the step 91, the manipulation of "the position and the attitude of the workpiece 1m" are executed by the actuators $17W_1$, $17W_2$, $17W_3$, $17W_4$, $17W_5$, $17W_6$, see FIG. 7, of the workpiece handling robot 1.

By such manipulation of "the position and the attitude of the workpiece 1m", the control to position the workpiece 1m at the state of FIG. 13(a) and the control to position the workpiece 1m at the state of FIG. 17(a) are executed.

(5) The control of "the sole-acting each axis mode of the manual operation" of the tool handling robot 2 manipulating "the desired position and the desired attitude of the tool 2n" in the absolute coordinates system 51 is described below:

According to "the sole-acting each mode of the manual operation" of the tool handling robot 2, it is not easy for tool 2n to achieve a desired attitude inclination thereof at the welding line 61 of the workpiece 1m. "The sole-acting each axis mode of the manual operation" is, therefore, not applicable to the invention described in FIGS. 13(a)–13(c) and 17(a)–17(c). On the other hand, it is available to the case that the attitude of the tool 2n is paid no attention, i.e., to the case that the tip point 57 of the tool is only positioned to the welding 61 of the workpiece 1m, which is explained below;

"The tool handling robot" is selected by the robot changing switch 7, "the each axis mode of the manual operation" is chosen by the movement changing switch 8 and "the sole-acting mode of the manual operation" is designated by the mode changing switch 9 of the teaching pendant 3. Moreover, a desired rate, e.g., 0.2, which is indicated as "$r_b$", is designated by the rate changing switch 10.

Pushing the desired keys, e.g. 12A and 12c, the control of the sole-acting cartesian coordinates mode of the manual operation unit the keys are released is as follows;

(a): The control of the first step processor 4Ta is executed as (a-1) to (a-3) mentioned after.

Figure 25:
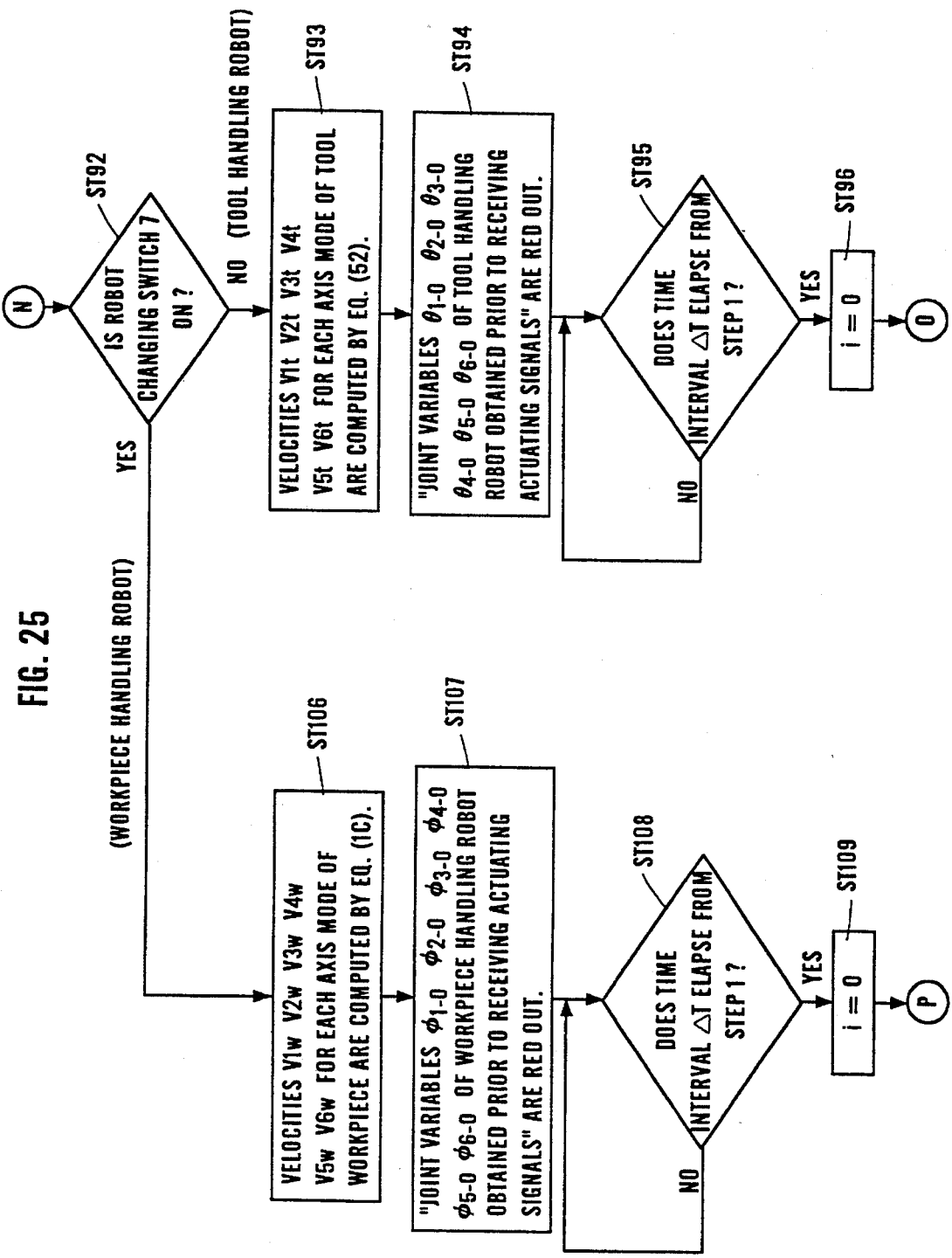
FIG. 25 is a flow chart of "the sole-acting each axis mode of the manual operation" by the tool handling robot and/or the workpiece handling robot continued from N of FIG. 9.

The control equipment 4 receives the actuating signals generated by the keys 12A and 12c (ST1 in FIG. 9). As the mode changing switch 9 is "off" (ST2), the movement changing switch 8 is "off" (ST57) and a robot changing switch 7 is "off" (ST92 in FIG. 25), the procedure is led to the step 93 in response to "the sole-acting mode signal", "the each axis mode signal" and "the robot signal selecting the tool handling robot".

(a-1); The rotating velocities of the joint $2a$, $2b$, $2c$, $2d$, $2e$, and $2f$ of the tool handling robot 2 are calculated as follows;

The velocity components, $V1_t$, $V2_t$, $V3_t$, $V4_t$, $V5_t$, $V6_t$, are computed by the following equations (52) in response to the "actuating signals", S1, S2, S3, S4, S5, S6, generated by the keys 12A and 12c, the designated "rate" $r_b$, and the preset maximum values, $V1_{t0}$, $V2_{t0}$, $V3_{t0}$, $V4_{t0}$, $V5_{t0}$, $V6_{t0}$, memorized in the velocity table for the each axis mode of the manual operation of the tool handling robot 2 (ST93).

$$V1_t = S1 \times r_b \times V1_{t0}$$
$$V2_t = S2 \times r_b \times V2_{t0}$$
$$V3_t = S3 \times r_b \times V3_{t0}$$
$$V4_t = S4 \times r_b \times V4_{t0}$$
$$V5_t = S5 \times r_b \times V5_{t0}$$
$$V6_t = S6 \times r_b \times V6_{t0} \qquad (52)$$

The above mentioned, S1, S2, S1, S2, S5, S6, are as follows;

Pushing each of the keys $12a$ to $12f$ generates a signal "+1";

Pushing each of the keys 12A to 12F generates a signal "−1";

Releasing each of the keys $12a$ to $12f$, 12A to 12F generates a signal "0".

Since the keys except 12A and 12c are released in this example, the actuating signals are as follows;

$$V2_t=0, V4_t=0, V5_t=0, V6_t=0.$$

(a-2); "The position and the attitude of the tool handling robot 2 obtained prior to the beginning of the manual teaching operations" are computed by using "the joint variables of the tool handling robot 2" obtained prior to receiving "the actuating signals" as follows;

"The joint variables, $\theta_{1-0}$, $\theta_{2-0}$, $\theta_{3-0}$, $\theta_{4-0}$, $\theta_{5-0}$, $\theta_{6-0}$, of the tool handling robot 2" obtained prior to receiving the present actuating signals" are red out from the read-write memory 19bt (ST94).

(a-3); When a preset infinitesimal time interval $\Delta T$, e.g., one-twentieth of a second, elapses since "the present actuating signals" were generated (ST95), "i" is set to "0" (ST96), i.e., the time $\Delta t_{-i}$ is set to "0".

Figure 26:
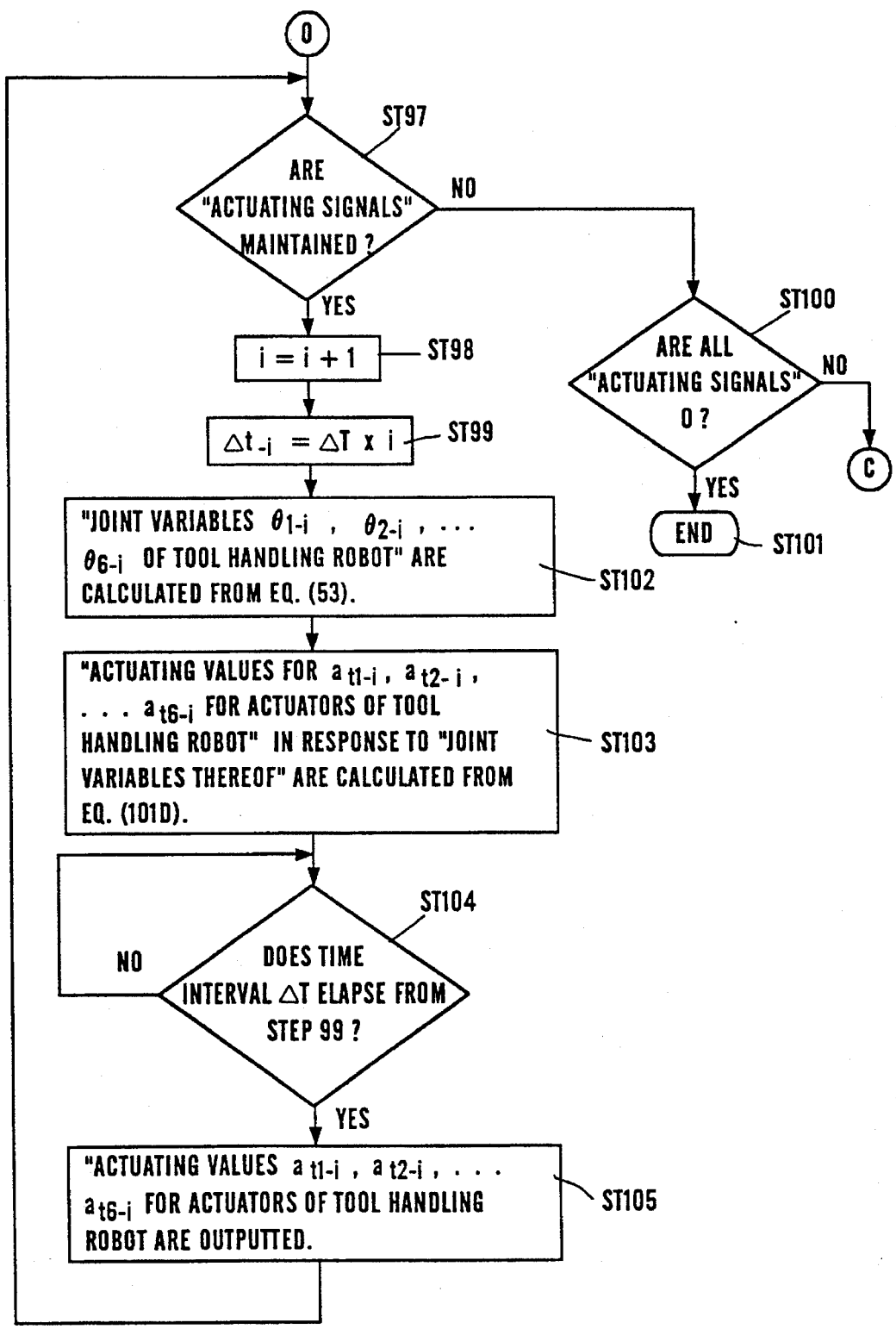
FIG. 26 is a flow chart of "the sole-acting each axis mode of the manual operation" by the tool handling robot continued from O of FIG. 25.

(b): The control of the second step processor 4Tb is executed as follows;

Whether pushing the keys 12A and 12c are continued for the preset time interval $\Delta T$ is discriminated (ST97 in FIG. 26). When "the present actuating signals" have been maintained, a preset infinitesimal time interval $\Delta T$ is added to the time $\Delta t_{-i}$ (ST98), and the execution at the third step processor 4Tc is controlled after the time $\Delta t_{-i}$ is replaced to $\Delta t_{-i+1}$ (ST99). When all of the keys 12A and 12c have already released in the middle of the preset time interval (ST100), i.e., when "all present actuating signals" have vanished, a termination signal is transmitted to the commander 4f for terminating control, see FIG. 8 (ST101). When some of the keys have been released or changed to different ones in the middle of the preset time interval, i.e., when the keys $12a$ and 12D have been pushed instead of the keys 12 A and 12c (ST100), the repetition from the step 1 is controlled in response to "new actuating signals".

(c): The control of the third step processor 4Tc is executed in response to the completion of controlling the second step processor 4Tb as follows, including substantially the control of the fourth step processor 4Td;

"The joint variables, $\theta_{1-i}$, $\theta_{2-i}$, $\theta_{3-i}$, $\theta_{4-i}$, $\theta_{5-i}$, $\theta_{6-i}$, of the tool handling robot 2 after the time $\Delta t_{-i}$, i.e., after $\Delta T \times i$" are calculated by the following equation (53) (ST102).

$$\theta_{1-i} = \theta_{1-0} + V1_t \times \Delta t_{-i}$$
$$\theta_{2-i} = \theta_{2-0} + V2_t \times \Delta t_{-i}$$
$$\theta_{3-i} = \theta_{3-0} + V3_t \times \Delta t_{-i}$$
$$\theta_{4-i} = \theta_{4-0} + V4_t \times \Delta t_{-i}$$
$$\theta_{5-i} = \theta_{5-0} + V5_t \times \Delta t_{-i}$$
$$\theta_{6-i} = \theta_{6-0} + V6_t \times \Delta t_{-i} \qquad (53)$$

(d): The control of the fifth step processor 4Te is executed in response to the blanket completion of the third step and the fourth step as follows;

The unity of "each actuating values for actuators" of the tool handling robot 2 have been stored in the control equipment 4 as $R_{t1}$, $R_{t2}$, $R_{t3}$, $R_{t4}$, $R_{t5}$, $R_{t6}$. "The actuating values, $a_{t1-i}$, $a_{t2-i}$, $a_{t3-i}$, $a_{t4-i}$, $a_{t5-i}$, $a_{t6-i}$, for the actuators 17T of the tool handling robot 2" are calculated by the following equation (101D) in response to "the joint variables, $\theta_{1-i}$, $\theta_{2-i}$, $\theta_{3-i}$, $\theta_{4-i}$, $\theta_{5-i}$, $\theta_{6-i}$, of the tool handling robot 1 after the time $\Delta t_{-i}$" calculated in the step 102 (ST103).

$$a_{t1-i} = \theta_{1-i}/R_{t1}$$
$$a_{t2-i} = \theta_{2-i}/R_{t2}$$
$$a_{t3-i} = \theta_{3-i}/R_{t3}$$
$$a_{t4-i} = \theta_{4-i}/R_{t4}$$
$$a_{t5-i} = \theta_{5-i}/R_{t5}$$
$$a_{t6-i} = \theta_{6-i}/R_{t6} \qquad (101D)$$

The equation (101D) is the same as the equation (101).

And in response, the control signal, $a_{t1-i}$, $a_{t2-i}$, $a_{t3-i}$, $a_{t4-i}$, $a_{t5-i}$, $a_{t6-i}$, of the actuators are supplied to the surbo-driver 15T, see FIG. 8, for the tool handling robot 2 just after the time $\Delta T \times i$ since the control of the step 99 (ST104, ST105). Thereafter, the control is returned to the step 97 for executing the control of the second step and succeeding step thereto.

After the step 105, the manipulation of "the position and the attitude of the tool $2n$" are executed by the actuators $17T_1$, $17T_2$, $17T_3$, $17T_4$, $17T_5$, $17T_6$, see FIG. 7, of the tool handling robot 2.

(6) The control of "the sole-acting each axis mode of the manual operation" of the workpiece handling robot 1 manipulating "the desired position and the desired attitude of the workpiece $1m$" in the absolute coordinates system 51 is described below. In such a case, a positioner less than 3 degrees of freedom type is also available to the workpiece handling robot 1, the following description relates to the control of a manipulator of 6 degrees of freedom type.

"The workpiece handling robot" is selected by the robot changing switch 7, "the each axis mode of the manual operation" is chosen by the movement changing switch 8 and "the sole-acting mode of the manual operation" is designated by the mode changing switch 9 of the teaching pendant 3. Moreover, a desired rate, e.g., 0.5, which is indicated as "$r_c$", is designated by the rate changing switch 10.

Pushing the desired keys, e.g., 12A and 12d, the control of the sole-acting each axis mode of the manual operation until the keys are released is as follows;

(a); The control of the first step processor 4Wa is executed as (a-1) to (a-3) mentioned after.

The control equipment 4 receives the actuating signals generated by the keys 12A and 12D (ST1 in FIG. 9). As the mode changing switch 9 is "off" (ST2), the movement changing switch 8 is "off" (ST57) and a robot changing switch 7 is "on" (ST92 in FIG. 25), the procedure is led to the step 106 in response to "the sole-acting mode signal", "the each axis mode signal" and "the robot signal selecting the workpiece handling robot".

(a-1); The rotating velocities of the joint 1a, 1b, 1c, 1d, 1e and 1f of the workpiece handling robot 1 are calculated as follows;

The velocity components, $V1_w$, $V2_w$, $V3_w$, $V4_w$, $V5_w$, $V6_w$, are computed by the following equations (1C) similar to eq. (1A) in response to the "actuating signals", S1, S2, S3, S4, S5, S6, generated by the keys 12A and 12d, the designated "rate" $r_c$ and the preset maximum values, $V1_{w0}$, $V2_{w0}$, $V3_{w0}$, $V4_{w0}$, $V5_{w0}$, $V6_{w0}$, memorized in the velocity table for the each axis mode of the manual operation of the workpiece handling robot 1 (ST106).

$$V1_w = S1 \times r_c \times V1_{w0}$$
$$V2_w = S2 \times r_c \times V2_{w0}$$
$$V3_w = S3 \times r_c \times V3_{w0}$$
$$V4_w = S4 \times r_c \times V4_{w0}$$
$$V5_w = S5 \times r_c \times V5_{w0}$$
$$V6_w = S6 \times r_c \times V6_{w0} \qquad (1C)$$

The above mentioned S1, S2, S1, S2, S5, S6, are as follows;

Pushing each of the keys 12a to 12f generates a signal "+1";

Pushing each of the keys 12A to 12F generates a signal "−1";

Releasing each of the keys 12a to 12f, 12A to 12F generates a signal "0".

Since the keys except 12b and 12d are released in this example, the actuating signals are as follows;

$$V2_w = 0, V3_w = 0, V5_w = 0, V6_w = 0.$$

(a-2); "The position and the attitude of the workpiece handling robot 1" obtained prior to the beginning of the manual teaching operations" and are computed using "the joint variables of the workpiece handling robot 1" obtained prior to receiving "the actuating signals" as follows;

"The joint variables, $\phi_{1-0}$, $\phi_{2-0}$, $\phi_{3-0}$, $\phi_{4-0}$, $\phi_{5-0}$, $\phi_{6-0}$, of the workpiece handling robot 1" obtained prior to receiving the present actuating signals" are red out from the read-write memory 19bw (ST107).

(a-3); When a preset infinitesimal time interval ΔT, e.g., one-twentieth of a second, elapses since "the present actuating signals" were generated (ST108), "i" is set to "0" (ST209), i.e., the time $\Delta t_{-i}$ is set to "0".

Figure 27:
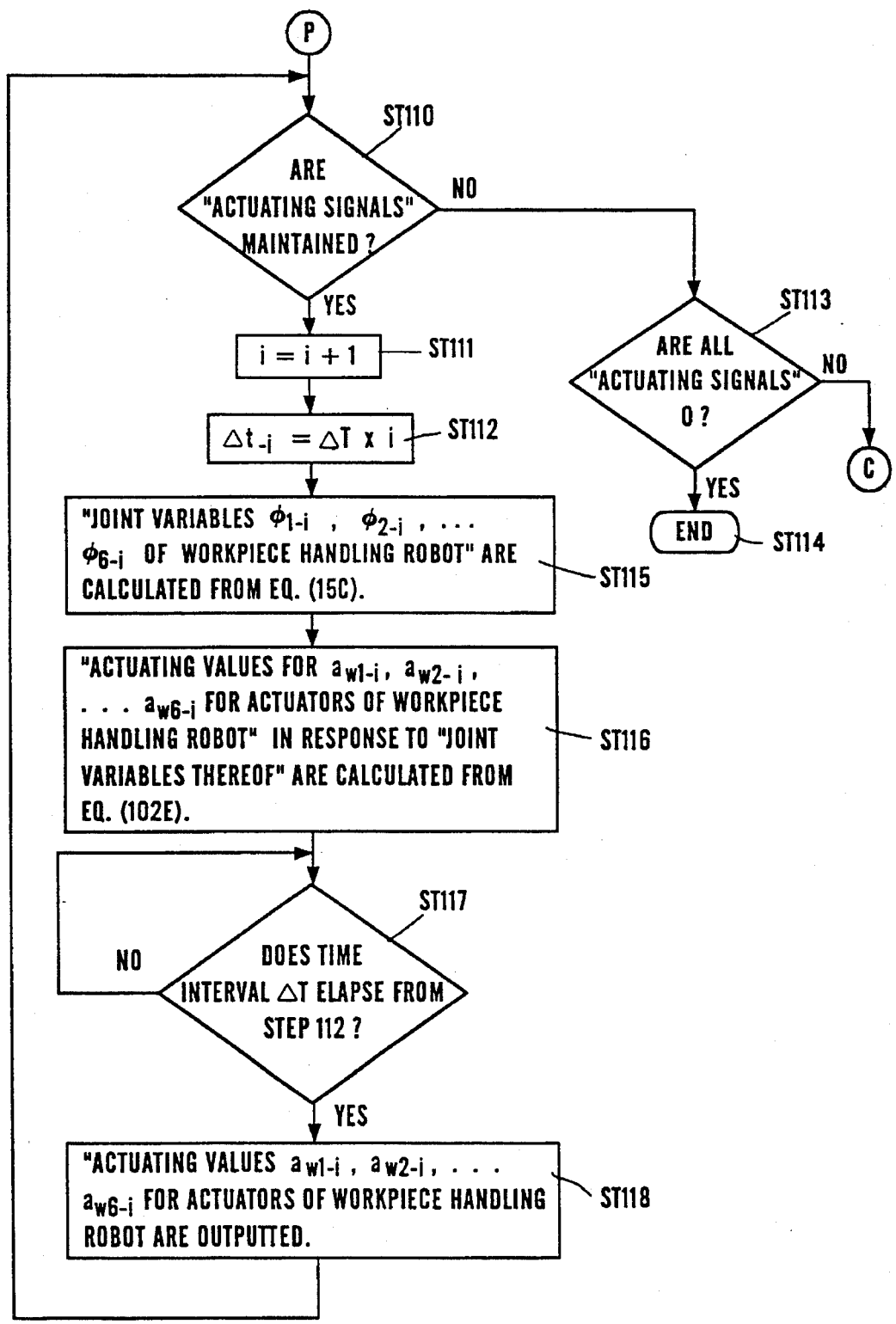
FIG. 27 is a flow chart of "the sole-acting each axis mode of the manual operation" by the workpiece handling robot continued from P of FIG. 25.
Figure 28A:
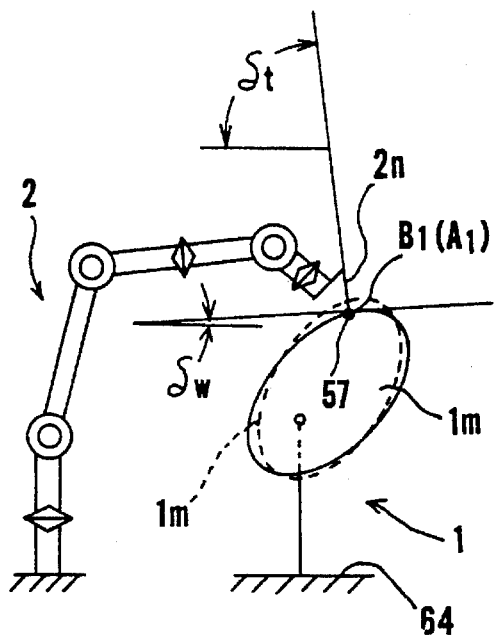
FIGS. 28(a), 28(b), 28(c) and 28(d) are brief drawings of the prior art of the manipulation by "the sole-acting mode of the manual operation" of the workpiece handling robot and/or the tool handling robot.
Figure 28B:
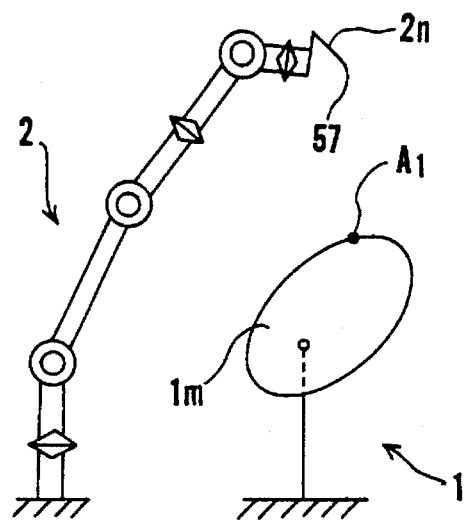
Figure 28C:
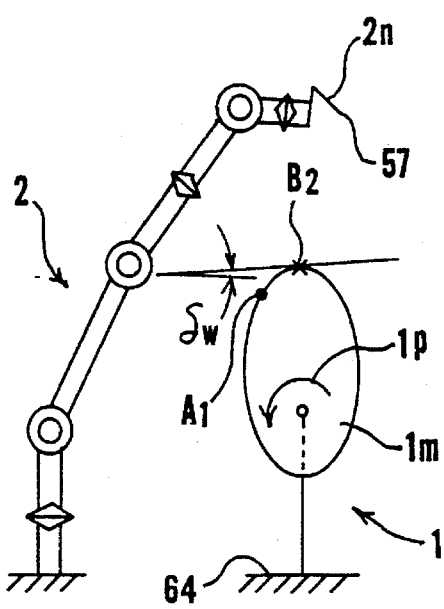
Figure 28D:
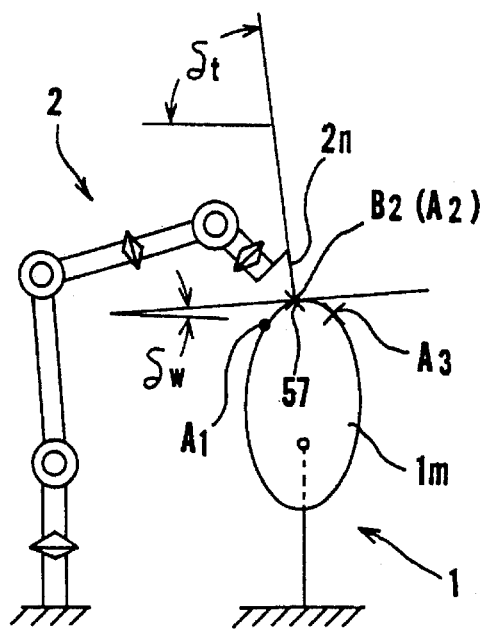
Figure 29A:
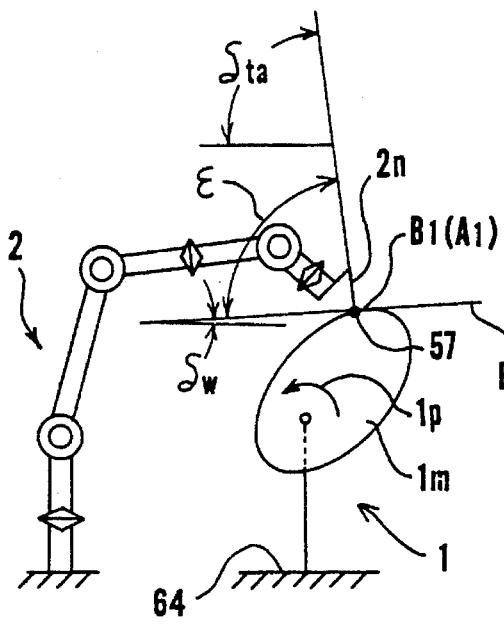
FIGS. 29(a), 29(b), 29(c) and 29(d) are brief drawings of the prior art of the the manipulation by "the sole-acting mode of the manual operation" and/or by "the co-acting mode of the manual operation" of the workpiece handling robot and/or the tool handling robot.
Figure 29B:
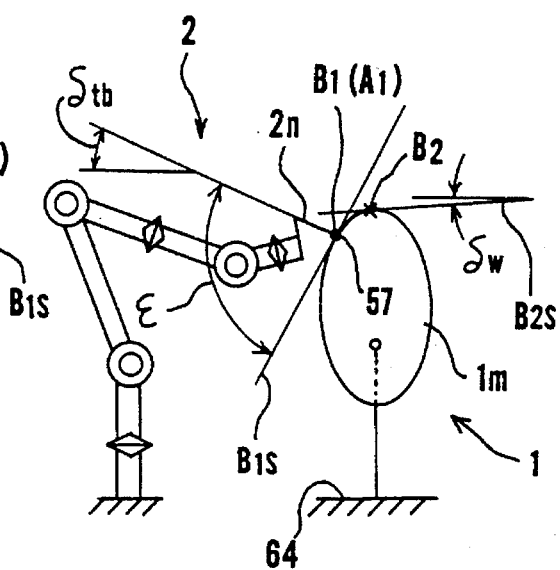
Figure 29C:
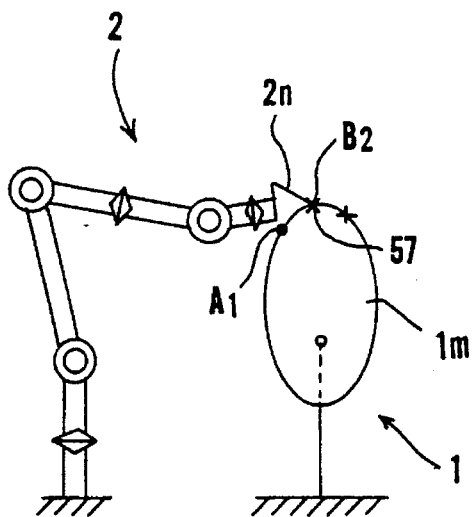
Figure 29D:
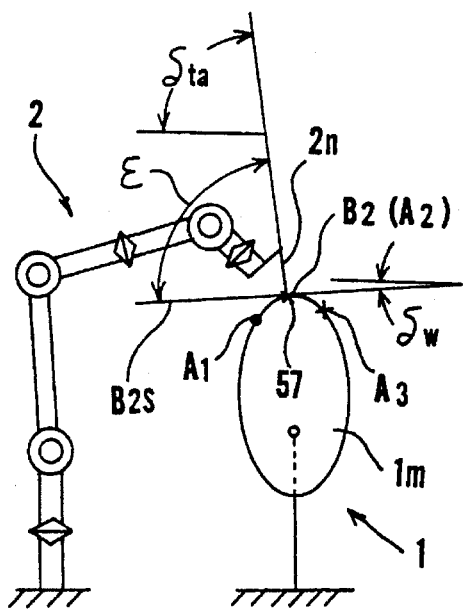

(b): The control of the second step processor 4Wb is executed as follows;

Whether pushing the keys 12A and 12d are continued for the preset time interval ΔT is discriminated (ST110 in FIG. 27). When "the present actuating signals" have been maintained, a preset infinitesimal time interval ΔT is added to the time $\Delta t_{-i}$ (ST111), and the execution at the third step processor 4Wc is controlled after the time $\Delta t_{-i}$ is replaced to $\Delta t_{-i+1}$ (ST112). When all of the keys 12A and 12d have already released in the middle of the preset time interval (ST113), i.e., when "all present actuating signals" have vanished, a termination signal is transmitted to the commander 4f for terminating control, see FIG. 8 (ST114). When some of the keys have been released or changed to different ones in the middle of the preset time interval, i.e., when the keys 12a and 12D have been pushed instead of the keys 12A and 12d (ST113), the repetition from the step 1 is controlled in response to "new actuating signals".

(c): The control of the third step processor 4Wc is executed in response to the completion of controlling the second step processor 4Wb as follows, including substantially the control of the fourth step processor 4Wd;

"The joint variables, $\phi_{1-i}$, $\phi_{2-i}$, $\phi_{3-i}$, $\phi_{4-i}$, $\phi_{5-i}$, $\phi_{6-i}$, of the workpiece handling robot 1 after the time $\Delta t_{-i}$, i.e., after ΔT×i" are calculated by the following equation (15C) (ST115).

$$\phi_{1-i} = \phi_{1-0} + V1_w \times \Delta t_{-i}$$
$$\phi_{2-i} = \phi_{2-0} + V2_w \times \Delta t_{-i}$$
$$\phi_{3-i} = \phi_{3-0} + V3_w \times \Delta t_{-i}$$
$$\phi_{4-i} = \phi_{4-0} + V4_w \times \Delta t_{-i}$$
$$\phi_{5-i} = \phi_{5-0} + V5_w \times \Delta t_{-i}$$
$$\phi_{6-i} = \phi_{6-0} + V6_w \times \Delta t_{-i} \qquad (15C)$$

(d): The control of the fifth step processor 4Te is executed in response to the blanket completion of the third step and the fourth step as follows:

The unity of "each actuating values for actuators" of the workpiece handling robot 1 have been stored in the control equipment 4 as $R_{w1}$, $R_{w2}$, $R_{w3}$, $R_{w4}$, $R_{w5}$, $R_{w6}$. "The actuating values, $a_{w1-i}$, $a_{w2-i}$, $a_{w3-i}$, $a_{w4-i}$, $a_{w5-i}$, $a_{w6-i}$, for the actuators 17T of the workpiece handling robot 1" are calculated by the following equation (102E) in response to "the joint variables, $\phi_{1-i}$, $\phi_{2-i}$, $\phi_{3-i}$, $\phi_{4-i}$, $\phi_{5-i}$, $\phi_{6-i}$, of the tool handling robot 1 after the time $\Delta t_{-i}$" calculated in the step 115 (ST116).

$$a_{w1-i} = \phi_{1-i}/R_{w1}$$
$$a_{w2-i} = \phi_{2-i}/R_{w2}$$
$$a_{w3-i} = \phi_{3-i}/R_{w3}$$
$$a_{w4-i} = \phi_{4-i}/R_{w4}$$
$$a_{w5-i} = \phi_{5-i}/R_{w5}$$
$$a_{w6-i} = \phi_{6-i}/R_{w6} \qquad (102E)$$

This equation (101D) is the same as equation (101).

And in response, the control signal, $a_{w1-i}$, $a_{w2-i}$, $a_{w3-i}$, $a_{w4-i}$, $a_{w5-i}$, $a_{w6-i}$, of the actuators are supplied to the surbo-driver 15W, see FIG. 8, for the workpiece handling robot 1 just after the time ΔT×i since the control of the step 112 (ST117, ST118). Thereafter, the control is returned to the step 110 for executing the control of the second step and succeeding step thereto.

After the step 118, the manipulation of "the position and the attitude of the workpiece 1m" are executed by the actuators $17W_1$, $17W_2$, $17W_3$, $17W_4$, $17W_5$, $17W_6$, see FIG. 7, of the workpiece handling robot 1.

By such manipulation of "the position and the attitude of the workpiece 1m", the control to position the workpiece 1m at the state of FIG. 13(a) and the control to position the workpiece 1m at the state of FIG. 17(a).

What is claimed is:

1. A teaching control device for manual operations of an industrial robotic system, the robotic system having a workpiece handling robot for manipulating a position and an attitude of a workpiece and a tool handling robot for manipulating a position and an attitude of a tool processing of said workpiece, said teaching control device comprising:

(a) designating means of a sole-action/co-action for supplying a mode signal to designate either
      (i) a sole-acting mode of the manual operation of said robotic system wherein manipulation of the position and the attitude of the workpiece by said workpiece handling robot are performed independently of the manipulation of the position and the attitude of the tool by said tool handling robot, or
      (ii) a co-acting mode of the manual operation wherein the manipulation of the position and the attitude of the tool by said tool handling robot are coordinated with an interdependent on the manipulation of the position and the attitude of the workpiece by said workpiece handling robot;
   (b) selecting means of a handling robot for supplying a robot signal to select either the workpiece handling robot or the tool handling robot;
   (c) teaching key means for generating actuating signals to change the position and the attitude of said workpiece or the position and the attitude of said tool;
   (d) control means for controlling the co-acting mode of the manual operations of said robotic system in response to the co-acting signal supplied by said designating means, the robot signal selecting the workpiece handling robot supplied by said selecting means and the actuating signals generated by said teaching key means, said control means comprising a computer for performing the following steps;
      (i) receiving a co-acting mode signal, robot signal and actuating signals, computing the previous position and the previous attitude of the workpiece in the absolute coordinates system, an attitude of the tool against the ground and a relative position of the tool against the workpiece in response to joint variables of the workpiece handling robot and the joint variables of the tool handling robot obtained just before receiving said actuating signals;
      (ii) controlling an execution of a calculating step in response to said actuating signals maintained for a preset time interval, controlling a repetition of said computing step in response to new actuating signals when said actuating signals has already changed during said preset time interval or controlling a termination of said co-acting mode of the manual operation in response to an absence of said actuating signals during said preset time interval;
      (iii) calculating the position and the attitude of said workpiece after a preset time interval in response to said actuating signals and said previous position and previous attitude of the workpiece in the absolute coordinates system obtained by said computing step and calculating the position and the attitude of the tool after a preset time interval in response to said attitude of the tool against the ground obtained by said computing step, said relative position of the tool against the workpiece obtained by said computing step and said position and attitude of the workpiece after a preset time interval;
      (iv) calculating the joint variables of the workpiece handling robot after a preset time interval in response to said position and attitude of the workpiece after a preset time interval obtained by said calculating step and calculating the joint variables of the tool handling robot after a preset time interval in response to said position and attitude of the tool after a preset time interval obtained by said calculating step; and
      (v) calculating actuating values for the actuators of the workpiece handling robot in response to said joint variables of the workpiece handling robot after a preset time interval and calculating the actuating values for the actuators of the tool handling robot, and simultaneously and independently supplying control signals of the actuating values for the actuators of the workpiece handling robot and control signals of the actuating values for the actuators of the tool handling robot, and further commanding a repetition of above said steps (i)–(v).

2. The teaching control device for manual operations according to claim 1, wherein:

said actuating signals are signals commanding for the linear motion of the workpiece along each axis of cartesian coordinates and for a revolution of the workpiece around each axis thereof.

3. The teaching control device for manual operations according to claim 1, wherein:

said actuating signals are signals commanding for a rotation of each joint of the workpiece handling robot.

* * * * *